United States Patent
Rhee et al.

(10) Patent No.: US 11,561,763 B2
(45) Date of Patent: Jan. 24, 2023

(54) ELECTRONIC DEVICE FOR PROCESSING MULTI-MODAL INPUT, METHOD FOR PROCESSING MULTI-MODAL INPUT AND SERVER FOR PROCESSING MULTI-MODAL INPUT

(71) Applicant: Samsung Electronics Co., Ltd., Suwon-si (KR)

(72) Inventors: In Jong Rhee, Seongnam-si (KR); Ji Min Lee, Suwon-si (KR); Sang Ki Kang, Suwon-si (KR); Han Jun Ku, Suwon-si (KR); Sung Pa Park, Seoul (KR); Jang Seok Seo, Suwon-si (KR); In Wook Song, Seoul (KR); Won Ick Ahn, Yongin-si (KR); Kyoung Gu Woo, Seoul (KR); Ji Soo Yi, Seoul (KR); Chang Kyun Jeon, Suwon-si (KR); Ho Jun Jaygarl, Hwaseong-si (KR); Il Hwan Choi, Yongin-si (KR); Yoo Jin Hong, Seongnam-si (KR); Ji Hyun Kim, Suwon-si (KR); Jae Yung Yeo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/332,185

(22) Filed: May 27, 2021

(65) Prior Publication Data
US 2021/0286589 A1 Sep. 16, 2021

Related U.S. Application Data

(63) Continuation of application No. 16/259,669, filed on Jan. 28, 2019, now Pat. No. 11,023,201, which is a
(Continued)

(30) Foreign Application Priority Data

Nov. 28, 2016 (KR) ........................ 10-2016-0159704

(51) Int. Cl.
*G06F 3/16* (2006.01)
*G10L 15/26* (2006.01)
(Continued)

(52) U.S. Cl.
CPC ............ *G06F 3/167* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS 5,748,974 A    5/1998  Johnson
8,239,206 B1   8/2012  Lebeau et al.
(Continued)

FOREIGN PATENT DOCUMENTS

CN   102004624 A   4/2011
CN   103488384 A   1/2014
(Continued)

OTHER PUBLICATIONS

Ivan the K, "I Bought Echo, Amazon's Voice-Controlled Speaker That Talks to You Like Siri and Plays Music, and I Like It," Dec. 16, 2014, https://www.businessinsider.com/amazon-echo-review-2014-12.*

(Continued)

*Primary Examiner* — Ryan Barrett
(74) *Attorney, Agent, or Firm* — Jefferson IP Law, LLP

(57) ABSTRACT

An electronic device is provided. The electronic device includes a housing, a touchscreen display exposed through a first portion of the housing, a microphone disposed at a second portion of the housing, a speaker disposed at a third portion of the housing, a memory disposed inside the housing, a processor disposed inside the housing, and elec-
(Continued)

trically connected to the display, the microphone, the speaker, and the memory. The memory is configured to store a plurality of application programs, each of which includes a graphic user interface (GUI).

20 Claims, 41 Drawing Sheets

Related U.S. Application Data continuation of application No. 15/824,331, filed on Nov. 28, 2017, now Pat. No. 10,191,718.

(51) Int. Cl.
*G06F 9/451* (2018.01)
*G06F 3/04817* (2022.01)
*G06F 3/0482* (2013.01)
*G06F 3/0488* (2022.01)
*G10L 15/18* (2013.01)
*G10L 15/22* (2006.01)
*G10L 15/30* (2013.01)
*H04R 1/02* (2006.01)

(52) U.S. Cl.
CPC .......... *G06F 3/04817* (2013.01); *G06F 9/451* (2018.02); *G10L 15/1815* (2013.01); *G10L 15/22* (2013.01); *G10L 15/26* (2013.01); *G10L 15/30* (2013.01); *H04R 1/028* (2013.01); *G10L 2015/223* (2013.01)

(56) References Cited

U.S. PATENT DOCUMENTS

| | | |
|---|---|---|
| 8,595,642 B1 | 11/2013 | Lagassey |
| 8,660,849 B2 | 2/2014 | Gruber et al. |
| 8,670,979 B2 | 3/2014 | Gruber et al. |
| 8,706,503 B2 | 4/2014 | Cheyer et al. |
| 8,731,939 B1 | 5/2014 | Lebeau et al. |
| 8,731,942 B2 | 5/2014 | Cheyer et al. |
| 8,799,000 B2 | 8/2014 | Guzzoni et al. |
| 8,892,446 B2 | 11/2014 | Cheyer et al. |
| 8,903,716 B2 | 12/2014 | Chen et al. |
| 8,930,191 B2 | 1/2015 | Gruber et al. |
| 8,942,986 B2 | 1/2015 | Cheyer et al. |
| 8,963,983 B2 | 2/2015 | Ho |
| 9,117,447 B2 | 8/2015 | Gruber et al. |
| 9,275,411 B2 | 3/2016 | Mengibar |
| 9,318,108 B2 | 4/2016 | Gruber et al. |
| 9,548,050 B2 | 1/2017 | Gruber et al. |
| 9,569,090 B2 | 2/2017 | Seong et al. |
| 9,894,460 B1 | 2/2018 | Lebeau et al. |
| 10,147,422 B2 | 12/2018 | Mengibar |
| 10,283,118 B2 | 5/2019 | Mengibar |
| 10,582,355 B1 | 3/2020 | Lebeau et al. |
| 10,803,862 B2 | 10/2020 | Jang et al. |
| 10,832,674 B2 | 11/2020 | Jaygarl et al. |
| 2002/0033844 A1 | 3/2002 | Levy et al. |
| 2006/0106614 A1 | 5/2006 | Mowatt et al. |
| 2006/0184370 A1 | 8/2006 | Kwak et al. |
| 2008/0228496 A1 | 9/2008 | Yu et al. |
| 2008/0243501 A1 | 10/2008 | Hafsteinsson et al. |
| 2008/0270128 A1 | 10/2008 | Lee et al. |
| 2010/0050133 A1 | 2/2010 | Nishihara et al. |
| 2012/0016678 A1 | 1/2012 | Gruber et al. |
| 2012/0035925 A1 | 2/2012 | Friend et al. |
| 2012/0239396 A1 | 9/2012 | Johnston et al. |
| 2012/0245944 A1 | 9/2012 | Gruber et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0111348 A1 | 5/2013 | Gruber et al. |
| 2013/0111487 A1 | 5/2013 | Cheyer et al. |
| 2013/0117022 A1 | 5/2013 | Chen et al. |
| 2013/0158980 A1 | 6/2013 | Landry et al. |
| 2013/0185074 A1 | 7/2013 | Gruber et al. |
| 2013/0185081 A1 | 7/2013 | Cheyer et al. |
| 2013/0317823 A1 | 11/2013 | Mengibar |
| 2013/0325484 A1 | 12/2013 | Chakladar et al. |
| 2014/0173032 A1 | 6/2014 | Kruglick |
| 2014/0250106 A1 | 9/2014 | Shapira et al. |
| 2014/0278419 A1* | 9/2014 | Bishop .................... G06F 3/167 704/249 |
| 2014/0281896 A1 | 9/2014 | Wiitala et al. |
| 2015/0004943 A1 | 1/2015 | Park |
| 2015/0100621 A1 | 4/2015 | Pan |
| 2015/0160919 A1 | 6/2015 | Kim et al. |
| 2015/0278182 A1 | 10/2015 | Nicholas et al. |
| 2015/0324334 A1 | 11/2015 | Lee et al. |
| 2016/0010848 A1 | 1/2016 | Vanko et al. |
| 2016/0012820 A1 | 1/2016 | Mun et al. |
| 2016/0034253 A1 | 2/2016 | Bang et al. |
| 2016/0104484 A1 | 4/2016 | Chakladar et al. |
| 2016/0132205 A1 | 5/2016 | Ramakrishnan et al. |
| 2016/0140960 A1 | 5/2016 | Chae |
| 2016/0180848 A1 | 6/2016 | Mengibar |
| 2016/0277813 A1 | 9/2016 | Pizzo et al. |
| 2017/0031652 A1 | 2/2017 | Kam et al. |
| 2017/0084274 A1 | 3/2017 | Kim et al. |
| 2017/0103755 A1 | 4/2017 | Jeon et al. |
| 2017/0133009 A1 | 5/2017 | Cho et al. |
| 2017/0160883 A1 | 6/2017 | Yuan |
| 2017/0178626 A1 | 6/2017 | Gruber et al. |
| 2017/0301350 A1 | 10/2017 | Mengibar |
| 2017/0364242 A1 | 12/2017 | Bhageria et al. |
| 2018/0150280 A1 | 5/2018 | Rhee et al. |
| 2018/0285070 A1* | 10/2018 | Yoon .................... G06F 3/0484 |
| 2020/0051562 A1 | 2/2020 | Lee et al. |

FOREIGN PATENT DOCUMENTS

| | | |
|---|---|---|
| CN | 103492993 A | 1/2014 |
| CN | 105808200 A | 7/2016 |
| EP | 3 010 015 A1 | 4/2016 |
| EP | 3 612 925 | 10/2018 |
| EP | 3 652 734 B1 | 5/2022 |
| JP | 08-235185 A | 9/1996 |
| KR | 10-2013-0080380 A | 7/2013 |
| KR | 10-2013-0081176 A | 7/2013 |
| KR | 10-2016-0016530 A | 2/2016 |
| KR | 10-2016-0062594 A | 6/2016 |
| KR | 10-2016-0095418 A | 8/2016 |
| WO | 2007/052884 A1 | 5/2007 |
| WO | 2011/088053 A2 | 7/2011 |
| WO | 2018/194268 A1 | 10/2018 |
| WO | 2019/039834 A1 | 2/2019 |

OTHER PUBLICATIONS

Korean Office Action dated Jul. 20, 2010, issued in Korean Patent Application No. 10-2016-0159704.
Denzel, "Sending Keystrokes to Other Apps with Windows API and C#," Feb. 1, 2013, https://dzone.com/articles/sending-keys-other-apps.
Korean Office Action dated Apr. 23, 2019, issued in Korean Patent Application No. 10-2019-0041267.
Shankland, "Google lets you launch Android camera by voice command," https://www.cnet.com/news/google-lets-you-launch-android-camera-by-voice-command/, Mar. 20, 2014.
Guarino, "Review: VoiceSnap allows you to control your iOS camera remotely with voice commands," https://9to5mac .com/20 14/05/31 /review-voicesnap-allows-you-to-control-your -i os-camera-remotely-with-voi ce-com mands-giveaway/, May 31, 2014.
Purewal, "The complete l ist of Si ri commands," https ://web .archive .org/web/20 1604131917 56/https :1/www .cnet.com/ how-to/the-complete-list-of-siri-commands/, Apr. 12, 2016.
Johnson, "Google Assistant can now share photos, search podcasts, and make notes with third-party apps," https ://venturebeat.com/20

(56) References Cited

OTHER PUBLICATIONS

19/12/06/google-assistant-can-now-share-photos-search-podcasts-and-make-notes-with-third-party-apps, Dec. 6, 2019.
Graham, "The Current State of Telephone Links," https://css-tricks.com/the-current-state-of-telephone-links/, Feb. 23, 2016.
Rich, "iPad and iPhone Tips and Tricks, Seventh Edition," Que Publishing, Oct. 30, 2017.
Guidry, "Application Lifecycles," https://web.archive.org/web/20110101000220/http://eagle.phys.utk.edu/guidry/android/applicationLifecycles.html, Jan. 1, 2011.
Summons to Oral Proceedings dated Feb. 22, 2022, issued in European Application No. 17197272.2.
Indian Office Action dated Dec. 9, 2021, issued in Indian Application No. 201917025153.
Chinese Office Action dated Jun. 29, 2022, issued in Chinese Application No. 201711203805.6.
Summons to Oral Proceedings dated Sep. 15, 2022, issued in Application No. 17 197 272.2.
Preliminary Opinion dated Nov. 28, 2022, issued in European Application No. 17197272.2.

\* cited by examiner

ELECTRONIC DEVICE FOR PROCESSING MULTI-MODAL INPUT, METHOD FOR PROCESSING MULTI-MODAL INPUT AND SERVER FOR PROCESSING MULTI-MODAL INPUT

CROSS-REFERENCE TO RELATED APPLICATION(S)

This application is a continuation application of prior application Ser. No. 16/259,669, filed on Jan. 28, 2019, which is a continuation application of prior application Ser. No. 15/824,331, filed on Nov. 28, 2017, which has issued as U.S. Pat. No. 10,191,718 on Jan. 29, 2019 and is based on and claims priority under 35 U.S.C. § 119(a) of a Korean patent application number 10-2016-0159704, filed on Nov. 28, 2016, in the Korean Intellectual Property Office, the disclosure of which is incorporated by reference herein in its entirety.

TECHNICAL FIELD

The present disclosure relates to an electronic device for processing a multi-modal input, which is used to receive various inputs of a user. More particularly, the present disclosure relates to a method for processing the multi-modal input, and a server for processing the multi-modal input.

BACKGROUND

In addition to an input scheme using a keyboard or a mouse, an electronic device has recently supported various input schemes such as a voice input and the like according to the related art. For example, the electronic device such as a smartphone or a tablet personal computer (PC) may recognize a voice input of a user in a state where a voice recognition service is executed and may execute an action corresponding to the voice input or may provide the result found depending on the voice input.

Nowadays, the voice recognition service is being developed based on a technology processing a natural language. The technology processing the natural language refers to a technology that grasps the intent of a user's utterance and provides the user with the result suitable for the intent.

The above information is presented as background information only to assist with an understanding of the present disclosure. No determination has been made, and no assertion is made, as to whether any of the above might be applicable as prior art with regard to the present disclosure.

SUMMARY

Since a voice recognition service provides only the result based on a user input when recognizing and processing a user voice according to the related art, the voice recognition service may process only the simple user input such as performing a program and may not process the user input utilized to perform a plurality of applications according to the related art.

In the case where the user enters a voice including insufficient information, the voice recognition service may not recognize the user voice due to the insufficient information and may not recognize the entire user input according to the related art. For example, in the case where it is difficult for the voice recognition service to grasp the intent of the user by using only the utterance of the user, the voice recognition service may grasp optimal intent by using an additional utterance of the user or information of a terminal. After the intent of the user is determined, the voice recognition service may perform a service (e.g., searching, performing an application) or a task suitable for the grasped intent. If a user repeatedly receives a request for the additional utterance after the first utterance of the user, it is difficult for the user to grasp the intent of the request for the additional utterance. In addition, if the user repeatedly receives the request when the voice recognition service is initially performed, the user will perceive that it is difficult to use the service.

It is difficult for the voice recognition service, which provides the result in response to a voice input (instruction), to provide other input means. For example, the user may utilize the various input means such as a keyboard and a mouse or a touch input. However, since an interface of the voice recognition service is mainly composed of the input/output of a voice, it is difficult for the user to utilize the input means other than the voice.

Aspects of the present disclosure are to address at least the above-mentioned problems and/or disadvantages and to provide at least the advantages described below. Accordingly, an aspect of the present disclosure is to provide a voice input processing method being an input means for integrally functioning with an input means (e.g., a keyboard, a mouse, a touch input, or the like) in addition to a voice input.

Accordingly, another aspect of the present disclosure is to provide a method that processes a natural language through an integrated interface based on various input means.

Accordingly, another aspect of the present disclosure is to provide an interface and a system that are capable of receiving an additional input of a user while performing a service or a task corresponding to the first utterance of a user.

In accordance with an aspect of the present disclosure, an electronic device is provided. The electronic device includes a housing, a touchscreen display exposed through a first portion of the housing, a microphone disposed at a second portion of the housing, a speaker disposed at a third portion of the housing, a memory disposed inside the housing, a processor disposed inside the housing, and electrically connected to the display, the microphone, the speaker, and the memory. The memory is configured to store a plurality of application programs, each of which includes a graphic user interface (GUI). The memory is further configured to store instructions that, when executed, cause the processor to control the microphone to receive an utterance from a user, to generate or receive text data based on the utterance, to select one of the applications programs, based at least partly on the text data, to launch the selected application program, to control to display the GUI of the selected application program on the display, to control to display at least part of a sequence of automatically providing an input into the GUI on the display, based at least partly on the text data, to cause the selected application program to perform an operation that utilizes at least one parameter, using the input as the at least one parameter, and to control to display a result of the operation on the display.

In accordance with an aspect of the present disclosure, an electronic device is provided. The electronic device includes a housing, a touchscreen display exposed through a first portion of the housing, a microphone disposed at a second portion of the housing, a speaker disposed at a third portion of the housing, a memory disposed inside the housing, a processor disposed inside the housing, and electrically connected to the display, the microphone, and the speaker, and the memory. The memory is configured to store a first plurality of application programs and a second plurality of application programs, wherein each of the first and second plurality of application programs includes a GUI. The memory is further configured to store instructions that, when executed, cause the processor to control the microphone to receive an utterance from a user, to generate or receive text data based on the utterance, to select a first application program from the first plurality of application programs, based at least partly on the text data, to launch the selected first application program, to control to display the GUI of the selected first application program on the display, to cause the selected first application program to perform a first operation that utilizes at least one first parameter, based at least partly on the text data, while displaying at least part of a sequence of performing the first operation on the display, to control to display a result of the first operation on the display, after displaying the result, to control to display one or more identifiers on the display, based at least partly on the text data, each of the identifiers represents a respective one of the second plurality of application programs, to receive a selection of one of the identifiers from the user via the display or the microphone, to select a second application program from the second plurality of application programs, based on the received selection, and to cause the selected second application program to perform a second operation that utilizes at least one second parameter, using at least part of the result of the first operation.

In accordance with an aspect of the present disclosure, an electronic device is provided. The electronic device includes a housing, a touchscreen display exposed through a first portion of the housing, a microphone disposed at a second portion of the housing, a speaker disposed at a third portion of the housing, a memory disposed inside the housing, a processor disposed inside the housing, and electrically connected to the display, the microphone, the speaker, and the memory. The memory is configured to store a plurality of application programs, each of which includes a GUI. The memory is further configured to store instructions that, when executed, cause the processor to control the microphone to receive a verbal request from a user, to generate or receive text data based on the request, to select one of the applications programs, based at least partly on the text data, to determine a portion of an operation that can be performed automatically on the selected application program, using the text data, to launch the selected application program, to control to display the GUI of the selected application program on the display, to control to display at least part of a sequence of automatically performing the portion of the operation, based at least partly on the text data, without completing the operation, to receive a user input via the display or microphone, and to cause the application program to complete the operation, using the received user input.

In accordance with an aspect of the present disclosure, a voice input processing method is provided. The method includes receiving an utterance from a user via a microphone, generating or receiving text data based on the utterance, selecting one application program based at least partly on the text data, launching the selected application program, displaying a GUI of the selected application program on a display, displaying at least part of a sequence of automatically providing an input into the GUI on the display, based at least partly on the text data, causing the selected application program to perform an operation that utilizes at least one parameter, using the input as the at least one parameter, and displaying a result of the operation on the display.

In accordance with an aspect of the present disclosure, a server is provided. The server includes a voice input is configured to receive an utterance of a user from an external electronic device, to generate text data based on the received utterance of the user, to generate intent of the utterance and a parameter for performing the intent based on the text data, to determine a path rule including a sequence of an operation of an application program of the external electronic device based on the intent and the parameter, and to transmit the path rule to the external electronic device. The path rule includes the operation of the application program of the external electronic device and the parameter for performing the operation.

According to various embodiments of the present disclosure, an electronic device recognizing user's utterance to operate an app may recognize the user's utterance to grasp user intent and may determine an action for accomplishing a purpose according to the grasped intent to execute the app stepwise, thereby providing a user with the same user interface (UI) as an UI for performing a touch input.

According to various embodiments of the present disclosure, an action (e.g., the execution of an app), which is capable of being processed, may be stepwise executed by using an insufficient user input in the case where the user input includes insufficient information, and an additional input may be received from a user to execute the remaining actions, thereby providing a service according to user intent.

Besides, a variety of effects directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
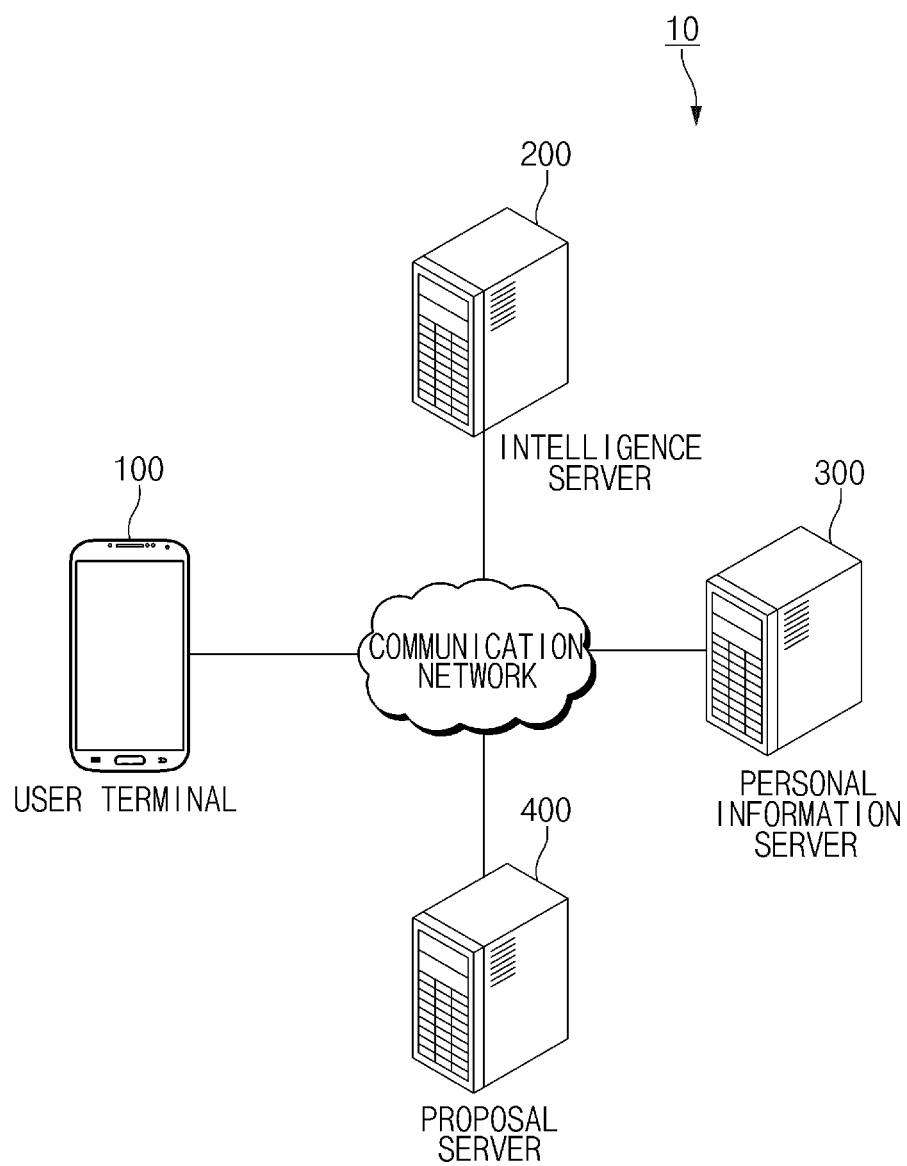
FIG. 1 is a view illustrating an integrated intelligent system, according to various embodiments of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have," "may have," "include" and "comprise," or "may include" and "may comprise" used herein indicate existence of corresponding features (e.g., elements such as numeric values, functions, operations, or components) but do not exclude presence of additional features.

In this disclosure, the expressions "A or B," "at least one of A or/and B," or "one or more of A or/and B," and the like may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used in this disclosure may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a view illustrating an integrated intelligent system, according to various embodiments of the present disclosure.

Referring to FIG. 1, an integrated intelligent system 10 may include a user terminal 100 (e.g., an electronic device 3401 of FIG. 34), an intelligence server 200, a personal information server 300, and a proposal server 400.

The user terminal 100 may provide a service for a user through an application (app) (or an application program) (e.g., an alarm app, a message app, a picture (gallery) app, or the like) stored in the user terminal 100. For example, the user terminal 100 may execute and operate other app through an intelligence app (or a voice recognition app) stored in the user terminal 100. The other app may be executed through the intelligence app of the user terminal 100 and a user input for performing a task may be received. For example, the user input may be received through a physical button, a touch pad, a voice input, or the like. According to an embodiment, various types of terminal devices (or an electronic device), which are connected with Internet, such as a mobile phone, a smartphone, PDA, a notebook computer, and the like may correspond to the user terminal 100.

According to an embodiment, the user terminal 100 may receive the utterance of a user as a user input. The user terminal 100 may receive the utterance of the user and may generate an instruction for operating an app based on the utterance of the user. As such, the user terminal 100 may operate the app by using the instruction.

The intelligence server 200 may receive a voice input of the user from the user terminal 100 over a communication network and may change the voice input of the user to text data. In another embodiment, the intelligence server 200 may generate (or select) a path rule based on the text data. The path rule may include information about an action (or an operation) for performing the function of an app and information about a parameter utilized to perform the action. In addition, the path rule may include the sequence of the action of the app. The user terminal 100 may receive the path rule, may select an application depending on the path rule, and may execute an action included in the path rule in the selected application.

Generally, the term "path rule" of the present disclosure may indicate, but is not limited to, a sequence of states in which an electronic device performs the task requested by the user. In other words, the path rule may include information about the sequence of the states. For example, the task may be a certain action that the intelligence app provides. The task may include the generation of a schedule, the transmission of a picture to a desired opponent, or the provision of weather information. The user terminal 100 may perform the task by sequentially having at least one or more states (e.g., an operating state of the user terminal 100).

According to an embodiment, the path rule may be provided or generated by an artificial intelligent (AI) system. The artificial intelligent system may be a rule-based system, or may be a neural network-based system (e.g., a feedforward neural network (FNN) or a recurrent neural network (RNN)). Alternatively, the artificial intelligent system may be a combination of the above-described systems or may be different from the above-described system. According to an embodiment, the path rule may be selected from a set of predefined path rules or may be generated in real time in response to a user request. For example, the artificial intelligent system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, on a display. According to another embodiment, the user terminal 100 may execute the action and may not display the result obtained by executing the action on the display. For example, the user terminal 100 may execute a plurality of actions and may display only the result of a part of the plurality of actions on the display. For example, the user terminal 100 may display only the result, which is obtained by executing the last action, on the display. According to another embodiment, the user terminal 100 may display the result, which is obtained by executing the action in response to a user input (e.g., a voice, a touch, or the like of the user), on the display.

The personal information server 300 may include a database in which user information is stored. For example, the personal information server 300 may receive the user information (e.g., context information, information about the execution of an app, or the like) from the user terminal 100 and may store the user information in the database. The intelligence server 200 may be used to generate a path rule associated with the user input after receiving the user information from the personal information server 300 over the communication network. According to an embodiment, the user terminal 100 may receive the user information from the personal information server 300 over the communication network, and may use the user information as information for managing the database.

The proposal server 400 may include a database storing information about a function in a terminal, introduction of an application, or a function to be provided. For example, the proposal server 400 may include a database associated with a function that a user utilizes by receiving the user information of the user terminal 100 from the personal information server 300. The user terminal 100 may receive information about the function to be provided from the proposal server 400 over the communication network and may provide the information to the user.

According to an embodiment, the integrated intelligent system 10 may receive the user's utterance as the user input via the user terminal 100, may generate a path rule based on the user input via the intelligence server 200, and may execute an action of an app of the user terminal 100 depending on the received path rule. According to another embodiment, the user terminal 100 may include all or part of functions of the intelligence server 200, the personal information server 300, and the proposal server 400. For example, the user terminal 100 may generate the path rule based on the user input and may operate the app. According to another embodiment, the intelligence server 200, the personal information server 300, and the proposal server 400 may be implemented with one or more external devices.

Figure 2:
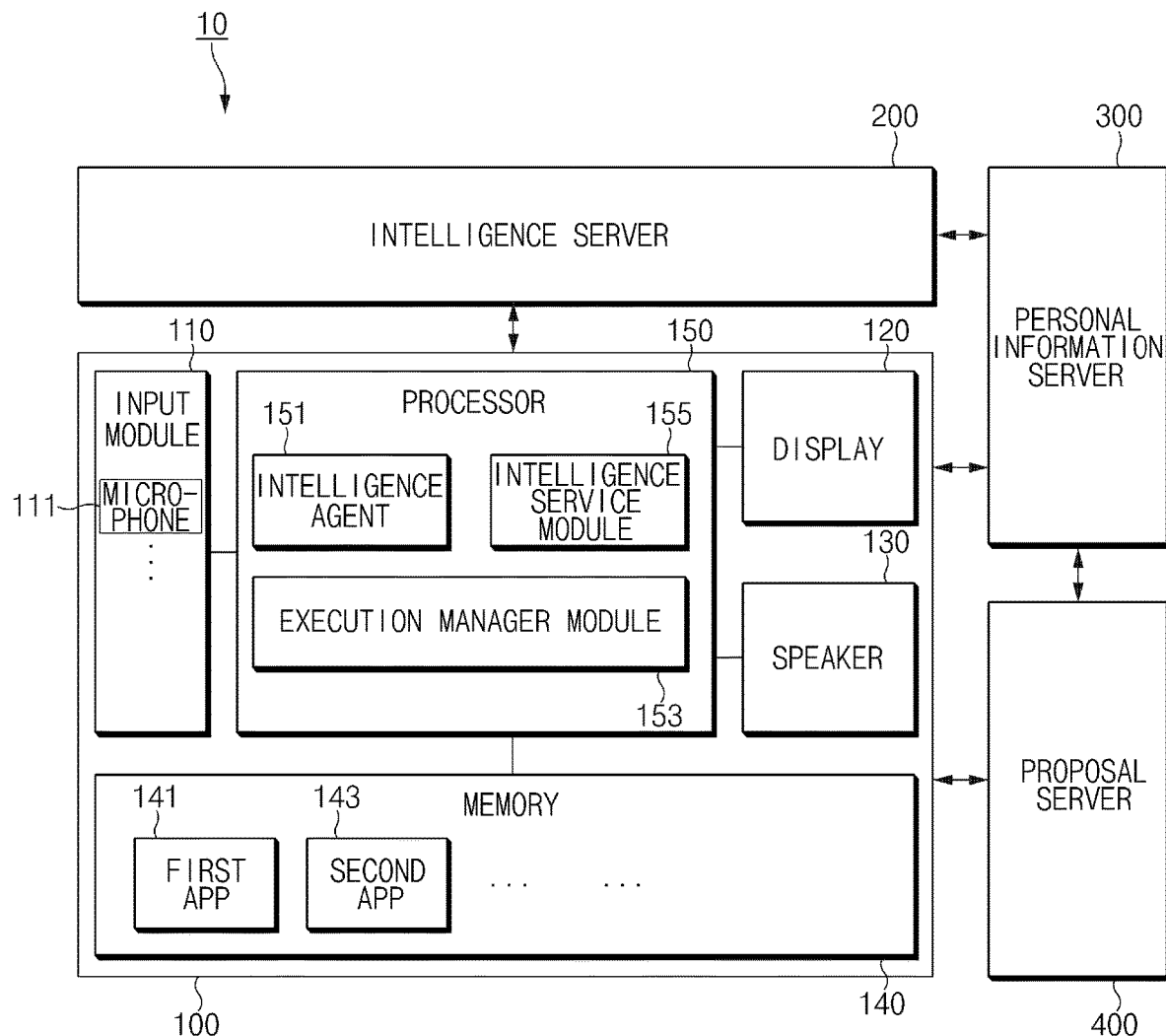
FIG. 2 is a block diagram illustrating a user terminal of an integrated intelligent system, according to an embodiment of the present disclosure.

FIG. 2 is a block diagram illustrating a user terminal of an integrated intelligent system, according to an embodiment of the present disclosure.

The integrated intelligent system 10 may include the user terminal 100, the intelligence server 200, the personal information server 300, and the proposal server 400.

Figure 34:
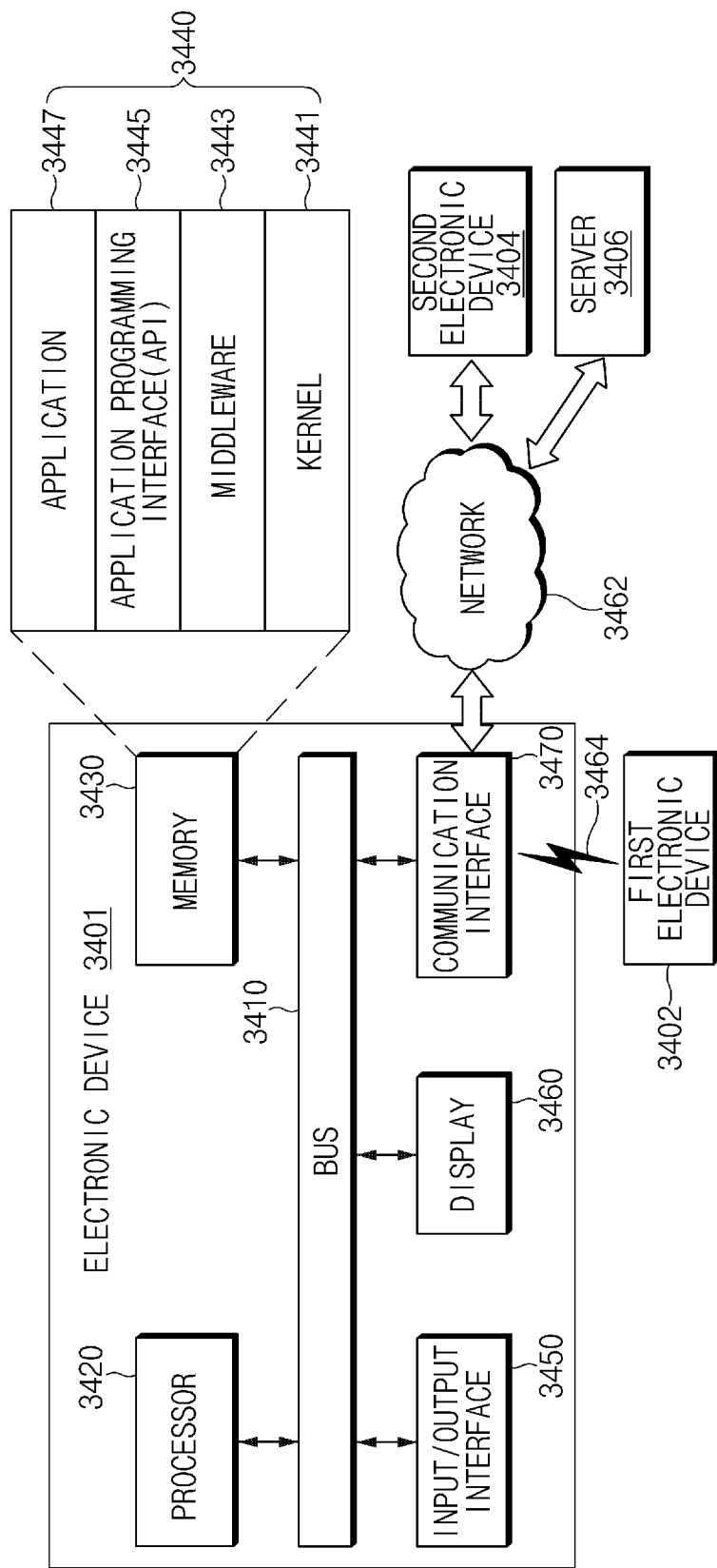
FIG. 34 illustrates an electronic device in a network environment system, according to various embodiments of the present disclosure.

Referring to FIG. 2, the user terminal 100 may include an input module 110, a display 120 (e.g., a display 3460 of FIG. 34), a speaker 130, a memory 140 (e.g., a memory 3430 of FIG. 34), and a processor 150 (e.g., a processor 3420 of FIG. 34). The user terminal 100 may further include a housing, and elements of the user terminal 100 may be seated inside the housing or may be disposed on the housing. The user terminal 100 may further include a communication circuit disposed inside the housing. The user terminal 100 may transmit or receive data (or information) to or from an external server (e.g., the intelligence server 200) via the communication circuit.

According to an embodiment, the input module 110 may receive a user input from a user. For example, the input module 110 may receive the user input from the connected external device (e.g., a keyboard or a headset). For another example, the input module 110 may include a touchscreen (e.g., a touchscreen display) coupled to the display 120. For another example, the input module 110 may include a hardware key (or a physical key) disposed inside the user terminal 100 (or the housing of the user terminal 100).

According to an embodiment, the input module 110 may include a microphone 111 capable of receiving the utterance of the user as a voice signal. For example, the input module 110 may include a speech input system and may receive the utterance of the user as a voice signal via the speech input system. For example, the microphone may be exposed through a part (e.g., a first portion) of the housing.

According to an embodiment, the display 120 may display at least one of an image, a video, or an execution screen of an application. For example, the display 120 may display a graphic user interface (GUI) of an app. According to an embodiment, the display 120 may be a touchscreen display including a touch panel. According to an embodiment, the display 120 may be exposed to a part (e.g., a second portion) of the housing.

According to an embodiment, the speaker 130 may output the voice signal. For example, the speaker 130 may output the voice signal generated in the user terminal 100 to the outside. According to an embodiment, the speaker 130 may be exposed to a part (e.g., a third portion) of the housing.

According to an embodiment, the memory 140 may store a plurality of apps 141 and 143. For example, each of the plurality of apps 141 and 143 may be a program for performing a function corresponding to the user input. According to an embodiment, the memory 140 may include a nonvolatile memory (e.g., a Flash memory, a hard disk, or the like) and a volatile memory (e.g., a random access memory (RAM)), and the plurality of apps 141 and 143 may be stored in the nonvolatile memory and may be executed after being loaded to the volatile memory.

According to an embodiment, the memory 140 may include a database capable of storing information utilized to recognize the user input. For example, the memory 140 may include a log database capable of storing log information. For another example, the memory 140 may include a persona database capable of storing user information.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store information.

According to an embodiment, the processor 150 may include an intelligence agent 151, an execution manager module 153, and an intelligence service module 155. In an embodiment, the processor 150 may drive the intelligence agent 151, the execution manager module 153, and the intelligence service module 155 by executing instructions stored in the memory 140. For example, the intelligence agent 151, the execution manager module 153, and the intelligence service module 155 may be a framework (or an application framework) stored in the memory 140. The functions of the intelligence agent 151, the execution manager module 153, and the intelligence service module 155 may be implemented by the processor 150. In other words, various modules described in various embodiments of the present disclosure may be implemented by hardware or by software. In various embodiments of the present disclosure, it is understood that actions executed by the intelligence agent 151, the execution manager module 153, and the intelligence service module 155 are actions executed by the processor 150.

The intelligence agent 151 may generate an instruction for operating an app based on the voice signal received as the user input. The execution manager module 153 may select, launch, and operate the apps 141 and 143 stored in the memory 140 depending on the generated instruction from the intelligence agent 151. The intelligence service module 155 may manage the information of the user and may process the user input by using the information of the user.

According to an embodiment, the processor 150 may operate depending on the instruction stored in the memory 140. For example, after the instruction stored in the memory 140 is executed, the processor 150 may control the user terminal 100.

Figure 3:
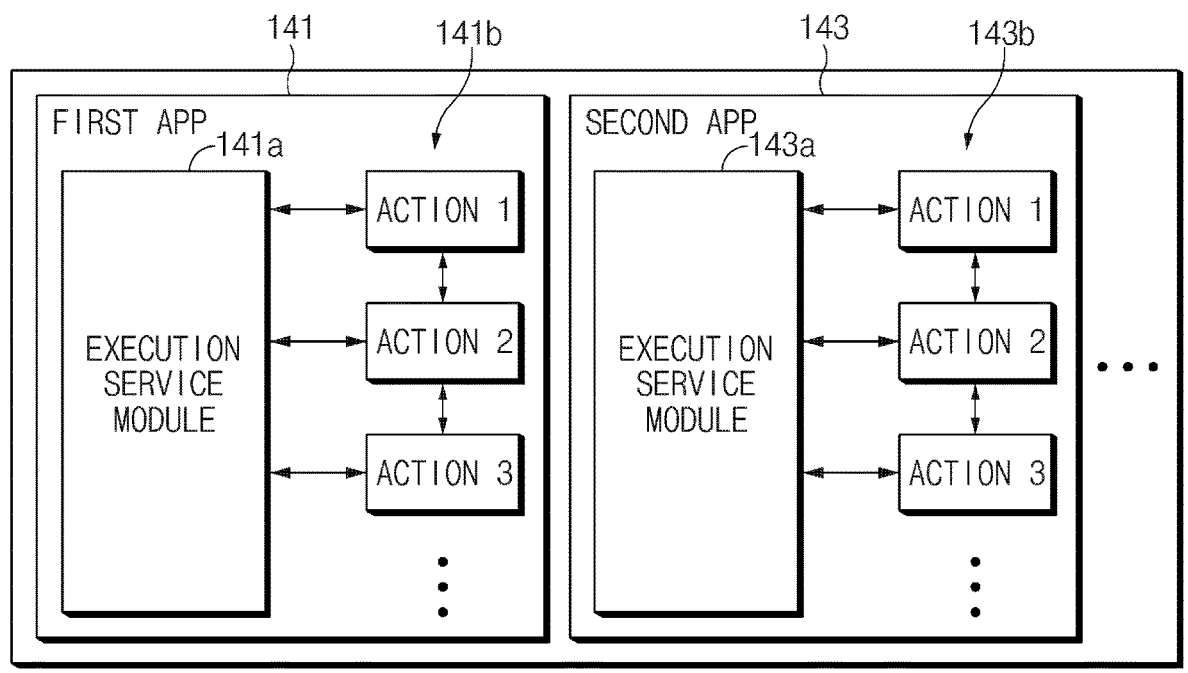
FIG. 3 is a block diagram illustrating that an application (app) stored in a memory of a user terminal operates after being loaded, according to an embodiment of the present disclosure.

FIG. 3 is a block diagram illustrating that an app stored in a memory of a user terminal operates after being loaded, according to an embodiment of the present disclosure.

Referring to FIG. 3, the memory 140 may store a plurality of apps 141 and 143, and the plurality of apps 141 and 143 may operate after being loaded. For example, the plurality of apps 141 and 143 stored in the memory 140 may operate after being loaded by the execution manager module 153. The plurality of apps 141 and 143 may include execution service modules 141a and 143a performing a function and a plurality of actions (or unit actions) 141b and 143b. The execution service modules 141a and 143a may be generated by the execution manager module 153 of the processor 150 and then may execute the plurality of actions 141b and 143b. In other words, the execution service modules 141a and 143a may be activated by the execution manager module 153, and then may execute the plurality of actions 141b and 143b.

According to an embodiment, when the actions 141b and 143b of the apps 141 and 143 are executed, an execution state screen according to the execution of the actions 141b and 143b may be displayed on the display 120. For example, the execution state screen may be a screen in a state where the actions 141b and 143b are completed. For another example, the execution state screen may be a screen in a state where the execution of the actions 141b and 143b is in partial landing (e.g., in the case where a parameter utilized for the actions 141b and 143b is not input).

According to an embodiment, the execution service modules 141a and 143a and the plurality of the actions 141b and 143b of the apps 141 and 143 may be implemented with, for example, a program language. In other words, the plurality of apps 141 and 143 may be implemented with a program language or a code for executing a service and a plurality of actions.

According to an embodiment, the execution service modules 141a and 143a may execute the actions 141b and 143b depending on a path rule. For example, the execution service modules 141a and 143a may be generated by the execution manager module 153, may receive an execution request from the execution manager module 153 depending on the path rule, and may execute the actions 141b and 143b depending on the execution request. If the execution of the actions 141b and 143b is completed, the execution service modules 141a and 143a may transmit completion information to the execution manager module 153.

According to an embodiment, in the case where the plurality of the actions 141b and 143b are respectively executed in the apps 141 and 143, the plurality of the actions 141b and 143b may be sequentially executed. If the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the completion information to the execution manager module 153. Here, it is understood that opening an arbitrary action is to change a state of the arbitrary action to an executable state or to prepare the execution of the action. In other words, if the arbitrary action is not opened, the corresponding action may not be executed. If the completion information is received, the execution manager module 153 may transmit the execution request associated with the next action (e.g., action 2 of the first app 141 or action 2 of the second app 143) to the execution service modules 141a and 143a. According to an embodiment, in the case where the plurality of apps 141 and 143 are executed, the plurality of apps 141 and 143 may be sequentially executed. For example, if receiving the completion information after the execution of the last action of the first app 141 is completed, the execution manager module 153 may transmit the execution request of the first action of the second app 143 to the execution service module 143a.

According to an embodiment, in the case where the plurality of the actions 141b and 143b are executed in the apps 141 and 143, a result screen according to the execution of each of the plurality of the actions 141b and 143b may be displayed on the display 120. According to an embodiment, only a part of a plurality of result screens according to the execution of each of the plurality of the actions 141b and 143b may be displayed on the display 120.

According to an embodiment, the memory 140 may store an app (e.g., a voice recognition app) operating in conjunction with the intelligence agent 151. The app operating in conjunction with the intelligence agent 151 may receive and process the utterance of the user as a voice signal. According to an embodiment, the app operating in conjunction with the intelligence agent 151 may be operated by a specific input (e.g., an input through a hardware key, an input through a touchscreen, or a specific voice input) input via the input module 110.

Figure 4:
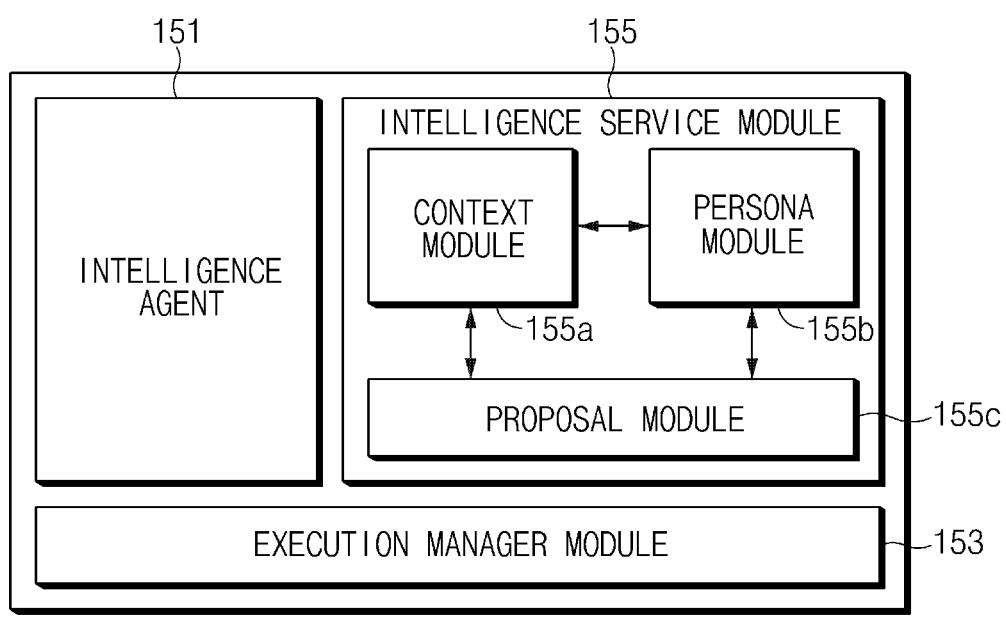
FIG. 4 is a block diagram illustrating a processor of a user terminal, according to an embodiment of the present disclosure.

FIG. 4 is a block diagram illustrating a processor of a user terminal, according to an embodiment of the present disclosure.

Referring to FIG. 4, the processor 150 may include the intelligence agent 151, the execution manager module 153, and the intelligence service module 155.

The intelligence agent 151 may transmit a user input received via the input module 110 to the intelligence server 200 and may process the user input via the intelligence server 200.

According to an embodiment, before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, and an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may recognize the user input and may adjust the volume of the user input so as to be suitable to process the recognized user input. According to an embodiment, the intelligence agent 151 may execute all the pre-processing elements for performance. However, in another embodiment, the intelligence agent 151 may execute a part of the pre-processing elements to operate at low power.

According to an embodiment, the intelligence agent 151 may include a wake up recognition module recognizing a call of a user. The wake up recognition module may recognize a wake up instruction of the user. In the case where the wake up recognition module receives the wake up instruction, the wake up recognition module may activate the intelligence agent 151 for receiving the user input. In the case where the wake up recognition module receives the wake up instruction, the wake up recognition module may execute the intelligence agent 151 for receiving the user input. According to an embodiment, the wake up recognition module of the intelligence agent 151 may be implemented with a low-power processor (e.g., a processor included in an audio codec).

According to an embodiment, the intelligence agent 151 may include a voice recognition module for performing the user input. The intelligence agent 151 may recognize the user input for executing an action in an app through the voice recognition module. For example, the voice recognition module may recognize a limited user (voice) input (e.g., an utterance such as "click" for executing a capture action when a camera app is being executed) for executing an action such as the wake up instruction in the apps 141 and 143. For example, the voice recognition module recognizing the limited user input may have a high voice recognition rate because being robust to an ambient noise. For another example, the voice recognition module may recognize a plurality of user (voice) inputs (e.g., "play," "stop," "next song," and the like in a music playing app) for executing an action in an app while assisting the intelligence server 200. For example, the voice recognition module for recognizing the user input while assisting the intelligence server 200 may recognize and rapidly process a user instruction processed in the user terminal 100. According to an embodiment, the voice recognition module for executing the user input of the intelligence agent 151 may be implemented in an application processor.

According to an embodiment, the voice recognition module (including the voice recognition module of a wake up module) of the intelligence agent 151 may recognize the user input by using an algorithm for recognizing a voice. For example, the algorithm for recognizing the voice may be at least one of a hidden markov model (HMM) algorithm, an artificial neural network (ANN) algorithm, and a dynamic time warping (DTW) algorithm.

According to an embodiment, the intelligence agent 151 may change the voice input of the user to text data. For example, the intelligence agent 151 may transmit the voice of the user to the intelligence server 200 and may receive the text data corresponding to the voice of the user from the intelligence server 200. As such, the intelligence agent 151 may display the text data on the display 120.

According to an embodiment, the intelligence agent 151 may receive a path rule from the intelligence server 200. According to an embodiment, the intelligence agent 151 may transmit the path rule to the execution manager module 153.

According to an embodiment, the intelligence agent 151 may transmit an execution result log according to the path rule received from the intelligence server 200 to the intelligence service module 155, and the transmitted execution result log may be accumulated and managed in preference information of the user of a persona module 155b.

The execution manager module 153 may receive the path rule from the intelligence agent 151 to execute the apps 141 and 143 and may cause the apps 141 and 143 to execute the actions 141b and 143b included in the path rule. For example, the execution manager module 153 may transmit instruction information for executing the actions 141b and 143b to the apps 141 and 143 and may receive completion information of the actions 141b and 143b from the apps 141 and 143.

According to an embodiment, the execution manager module 153 may transmit the instruction information for executing the actions 141b and 143b of the apps 141 and 143 between the intelligence agent 151 and the apps 141 and 143. The execution manager module 153 may bind the apps 141 and 143 to be executed depending on the path rule and may transmit the instruction information of the actions 141b and 143b included in the path rule to the apps 141 and 143. For example, the execution manager module 153 may sequentially transmit the actions 141b and 143b included in the path rule to the apps 141 and 143 and may sequentially execute the actions 141b and 143b of the apps 141 and 143 depending on the path rule.

According to an embodiment, the execution manager module 153 may manage execution states of the actions 141b and 143b of the apps 141 and 143. For example, the execution manager module 153 may receive information about the execution states of the actions 141b and 143b from the apps 141 and 143. For example, in the case where the execution states of the actions 141b and 143b are in partial landing (e.g., in the case where a parameter utilized for the actions 141b and 143b is not input), the execution manager module 153 may transmit information about the partial landing to the intelligence agent 151. The intelligence agent 151 may make a request for an input of information (e.g., parameter information) to the user by using the received information. For another example, in the case where the execution state of the actions 141b and 143b are in an operating state, the intelligence agent 151 may receive an utterance from the user. The execution manager module 153 may transmit information about the apps 141 and 143 being executed and the execution states of the apps 141 and 143 to the intelligence agent 151. The intelligence agent 151 may receive parameter information of the utterance of the user via the intelligence server 200 and may transmit the received parameter information to the execution manager module 153. The execution manager module 153 may change a parameter of each of the actions 141b and 143b to a new parameter by using the received parameter information.

According to an embodiment, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to an embodiment, the execution manager module 153 may receive a plurality of path rules. The execution manager module 153 may select a plurality of path rules based on the utterance of the user. According to an embodiment, the execution manager module 153 may specify one app 141 executing some actions 141b based on the utterance of the user, and may not specify the other app 143 executing the rest actions 143b. For example, the action of the same app 141 (e.g., a gallery app) executing one action 141b may be executed after being determined, and the execution manager module 153 may receive a plurality of different path rules for executing different apps 143 (e.g., a message app or Telegram app) executing another action 143b or different actions (e.g., the transmission of a message, the search of message, an input of a message recipient, and the like). For example, the execution manager module 153 may execute the same actions 141b and 143b (e.g., the same successive actions 141b and 143b) of the plurality of path rules. In the case where the execution manager module 153 executes the same action, the execution manager module 153 may display a state screen for selecting the different apps 141 and 143 included in the plurality of path rules on the display 120.

Figure 5:
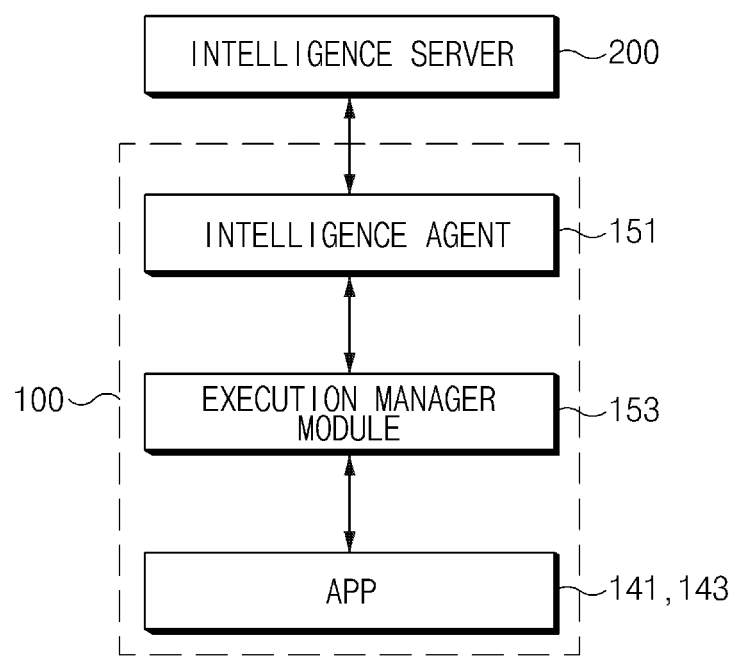
FIG. 5 is a block diagram illustrating that an intelligence agent processes a user input, according to an embodiment of the present disclosure.

FIG. 5 is a block diagram illustrating that an intelligence agent processes a user input, according to an embodiment of the present disclosure.

Referring to FIG. 5, if user's utterance is received, the intelligence agent 151 may transmit the user's utterance to the intelligence server 200. The intelligence server 200 may generate a path rule for operating the apps 141 and 143 by analyzing the received user's utterance and may transmit the generated path rule to the intelligence agent 151. The intelligence agent 151 may receive the path rule and may transmit the path rule to the execution manager module 153 for the purpose of executing the apps 141 and 143. The execution manager module 153 may receive the path rule, may generate the execution service modules 141a and 143a of the apps 141 and 143, and may request the generated execution service modules 141a and 143a to sequentially execute the actions 141b and 143b included in the path rule depending on the path rule. The apps 141 and 143 may execute the requested actions 141b and 143b and may transmit information about the execution states of the requested the actions 141b and 143b to the execution manager module 153. The result screen associated with the actions 141b and 143b executed in the apps 141 and 143 may be displayed on the display 120.

According to an embodiment, in the case where the apps 141 and 143 is selected and executed depending on the path rule, the processor 150 may display a graphic user interface of the apps 141 and 143 being executed on the display 120. According to an embodiment, in the case where the processor 150 operates an app depending on the path rule, the processor 150 may display an operating process of the apps 141 and 143 on the display 120.

The intelligence service module 155 may include a context module 155a, a persona module 155b, and a proposal module 155c.

The context module 155a may collect current states of the apps 141 and 143 from the apps 141 and 143. For example, the context module 155a may receive context information indicating the current states of the apps 141 and 143 and may collect the current states of the apps 141 and 143 through the received context information.

Figure 6:
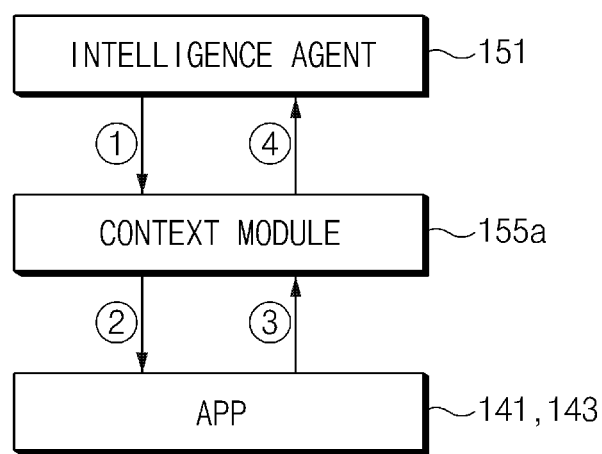
FIG. 6 is a block diagram illustrating that a context module of a processor collects a current state, according to an embodiment of the present disclosure.

FIG. 6 is a block diagram illustrating that a context module of a processor collects a current state, according to an embodiment of the present disclosure.

Referring to FIG. 6, if receiving a context request from the intelligence agent 151 (①), the context module 155a may make a request for context information indicating current states of the apps 141 and 143 to the apps 141 and 143 (②). According to an embodiment, the context module 155a may receive the context information from the apps 141 and 143 (③) and may transmit the context information to the intelligence agent 151 (④).

According to an embodiment, the context module 155a may receive pieces of context information from the apps 141 and 143. For example, the context information may be information about the most recently executed apps 141 and 143. For another example, the context information may be information (e.g., in the case where a user watches a picture through a gallery app, information about the corresponding picture) about the current states in the apps 141 and 143.

According to an embodiment, the context module 155*a* may receive context information indicating a current state of the user terminal 100 from a device platform as well as the apps 141 and 143. The context information may include general context information, user context information, and device context information.

The general context information may include general information of the user terminal 100. After data is received via a sensor hub of the device platform or the like, the general context information may be verified through an internal algorithm. For example, the general context information may include information about current time and space. For example, the information about the current time and space may include information about current time and a current location of the user terminal 100. The current time may be verified through the time on the user terminal 100, and the information about the current location may be verified through a global positioning system (GPS). For another example, the general context information may include information about physical motion. For example, the information about the physical motion may include information about walking, running, driving, or the like. The information about the physical motion may be verified through a motion sensor. In the case of the information about the driving, the driving may be verified through the motion sensor, and the boarding and parking may be verified by sensing Bluetooth connection in a vehicle. For another example, the general context information may include user activity information. For example, the user activity information may include information about commuting, shopping, travel, or the like. The user activity information may be verified by using information about a place where a user or an app registers in a database.

The user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule that the execution manager module 153 performed. For another example, the device information may include information about a battery. For example, the information about the battery may be verified through charging and discharging states of the battery. For another example, the device information may include information about the connected device and network. For example, the information about the connected device may be verified through a communication interface connected with the device.

The persona module 155*b* of FIG. 4 may manage personal information of the user utilizing the user terminal 100. For example, the persona module 155*b* may collect usage information and the execution result of the user terminal 100 and may manage the personal information of the user by using the collected usage information and the collected execution result of the user terminal 100.

Figure 7:
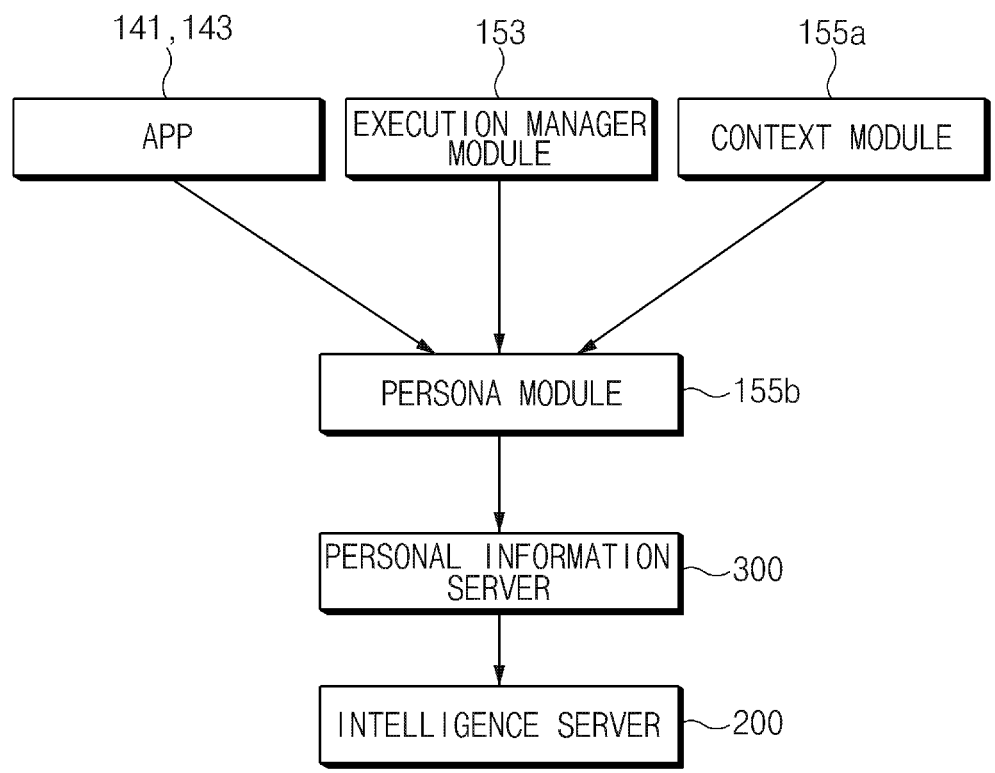
FIG. 7 is a block diagram illustrating that a persona module manages information of a user, according to an embodiment of the present disclosure.

FIG. 7 is a block diagram illustrating that a persona module manages information of a user, according to an embodiment of the present disclosure.

Referring to FIG. 7, the persona module 155*b* may receive information of the user terminal 100 from the apps 141 and 143, the execution manager module 153, and the context module 155*a*. The apps 141 and 143 and the execution manager module 153 may store information about the result obtained by executing the actions 141*b* and 143*b* of an app in an action log database. The context module 155*a* may store information about a current state of the user terminal 100 in a context database. The persona module 155*b* may receive the stored information from the action log database and the context database. For example, data stored in the action log database and the context database may be analyzed by an analysis engine and may be transmitted to the persona module 155*b*.

According to an embodiment, the persona module 155*b* may transmit information received from the apps 141 and 143, the execution manager module 153, and the context module 155*a* to the proposal module 155*c*. For example, the persona module 155*b* may transmit the data stored in the action log database and the context database to the proposal module 155*c*.

According to an embodiment, the persona module 155*b* may transmit the information received from the apps 141 and 143, the execution manager module 153, and the context module 155*a* to the personal information server 300. For example, the persona module 155*b* may periodically transmit the data, which is accumulated and stored in the action log database and the context database, to the personal information server 300.

According to an embodiment, the persona module 155*b* may transmit the data, which is stored in the action log database and the context database, to the proposal module 155*c*. User information generated by the persona module 155*b* may be stored in a persona database. The persona module 155*b* may periodically transmit the user information stored in the persona database to the personal information server 300. According to an embodiment, the information transmitted to the personal information server 300 by the persona module 155*b* may be stored in the persona database. The personal information server 300 may estimate user information utilized to generate a path rule of the intelligence server 200 by using the information stored in the persona database.

According to an embodiment, the user information estimated by using information transmitted by the persona module 155*b* may include profile information and preference information. The profile information and the preference information may be estimated through an account of the user and accumulated information.

The profile information may include personal information of the user. For example, the profile information may include population statistics information of the user. For example, the population statistics information may include gender, age, or the like of the user. For another example, the profile information may include life event information. For example, the life event information may be estimated by comparing log information with a life event model and may be strengthened by analyzing a behavior pattern. For another example, the profile information may include interest information. For example, the interest information may include shopping items of interest, interesting fields (e.g., sports, politics, and the like). For another example, the profile information may include activity area information. For example, the activity area information may include information about a house, a work place, or the like. The information about the activity area may include information about an area, the priority of which is recorded based on accumulated stay time and the number of visits as well as information about the location of a place. For another example, the profile information may include activity time information. For example, the activity time information may include information about a wakeup time, a commute time, a sleep time, or the like. The information about the commute time may be estimated by using the activity area information (e.g., information about a house and a work place). The information about the sleep time may be estimated through an unused time of the user terminal 100.

The preference information may include preference information of the user. For example, the preference information may include information about app preference. For example, the app preference may be estimated through a usage log (e.g., a time- and place-specific usage log) of an app. The app preference may be used to determine an app to be executed depending on a current state (e.g., time or place) of the user. For another example, the preference information may include information about contact preference. For example, the contact preference may be estimated by analyzing information about a contact frequency (e.g., a time- and place-specific contact frequency) of a contact. The contact preference may be used to determine contacts to be contacted depending on a current state (e.g., contacts for duplicate names) of the user. For another example, the preference information may include setting information. For example, the setting information may be estimated by analyzing information about setting frequency (e.g., a time- and place-specific frequency of setting a setting value) of a specific setting value. The setting information may be used to set a specific setting value depending on the current state (e.g., a time, a place, or a situation) of the user. For another example, the preference information may include place preference. For example, the place preference may be estimated through visit history (e.g., a time-specific visit history) of a specific place. The place preference may be used to determine a place to visit depending on the current state (e.g., time) of the user. For another example, the preference information may include instruction preference. For example, the instruction preference may be estimated through a usage frequency (e.g., a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

The proposal module 155c of FIG. 4 may estimate the intent of the user and may recommend an instruction to the user based on the intent of the user. For example, the proposal module 155c may recommend the instruction to the user depending on the current state (e.g., a time, a place, a situation, or an app) of the user.

Figure 8:
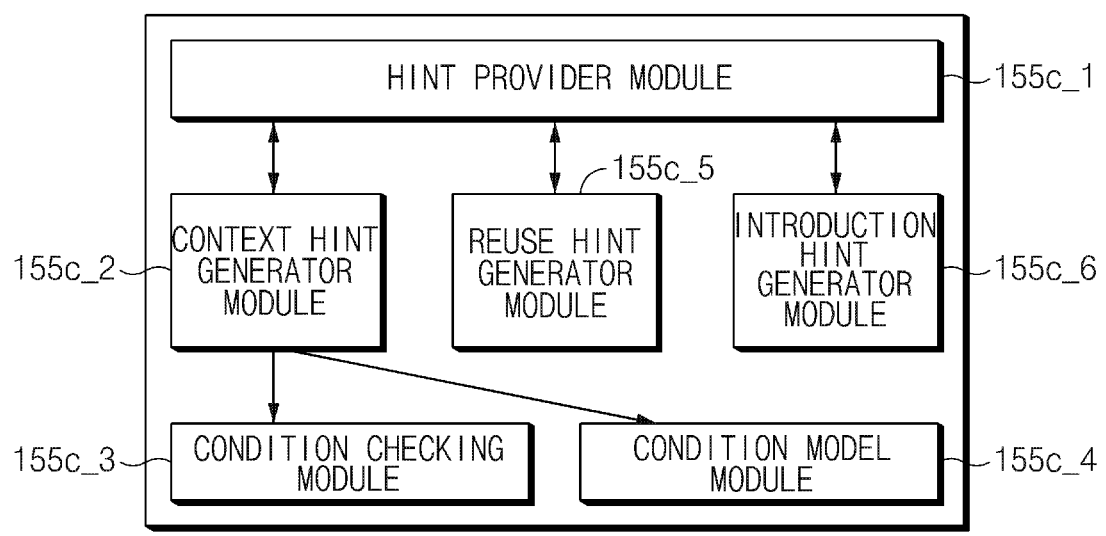
FIG. 8 is a block diagram illustrating a proposal module, according to an embodiment of the present disclosure.

FIG. 8 is a block diagram illustrating a proposal module, according to an embodiment of the present disclosure.

Referring to FIG. 8, the proposal module 155c may include a hint provider module 155c_1, a context hint generator module 155c_2, a condition checking module 155c_3, a condition model module 155c_4, a reuse hint generator module 155c_5, and an introduction hint generator module 155c_6.

According to an embodiment, the hint provider module 155c_1 may provide a user with a hint. For example, the hint provider module 155c_1 may receive the hint generated by the context hint generator module 155c_2, the reuse hint generator module 155c_5, and the introduction hint generator module 155c_6 and may provide the user with the hint.

The context hint generator module 155c_2 may generate a hint to be recommended depending on a current state through the condition checking module 155c_3 and the condition model module 155c_4. The condition checking module 155c_3 may receive information corresponding to the current state via the intelligence service module 155, and the condition model module 155c_4 may set a condition model by using the received information. For example, the condition model module 155c_4 may provide the user with a hint, which is likely to be used under the corresponding condition, in order of priority by grasping a time, a location, a situation, an app being executed, or the like at a point in time when the hint is provided to the user.

The reuse hint generator module 155c_5 may generate the hint to be recommended depending on a usage frequency. For example, the reuse hint generator module 155c_5 may generate the hint based on a usage pattern of the user.

According to an embodiment, the context hint generator module 155c_2 may generate the hint to be recommended depending on a current state through the condition checking module 155c_3 or the condition model module 155c_4. The condition checking module 155c_3 may receive information corresponding to the current state via the intelligence service module 155, and the condition model module 155c_4 may set a condition model by using the received information. For example, the condition model module 155c_4 may provide the user with a hint, which is likely to be used under the corresponding condition, in order of priority by grasping a time, a location, a situation, an app being executed, or the like at a point in time when the hint is provided to the user.

According to an embodiment, the reuse hint generator module 155c_5 may generate the hint to be recommended depending on the current state or depending on the usage frequency. For example, the reuse hint generator module 155c_5 may generate the hint based on the usage pattern of the user.

The introduction hint generator module 155c_6 may generate the hint for introducing a new function and a function, which is most frequently used by another user, to the user. For example, the hint for introducing the new function may include introduction (e.g., an operating method) associated with the intelligence agent 151.

According to another embodiment, the context hint generator module 155c_2, the condition checking module 155c_3, the condition model module 155c_4, the reuse hint generator module 155c_5, and the introduction hint generator module 155c_6 of the proposal module 155c may be included in the personal information server 300. For example, the hint provider module 155c_1 of the proposal module 155c may receive the hint from the context hint generator module 155c_2, the reuse hint generator module 155c_5, and the introduction hint generator module 155c_6 of the personal information server 300 and may provide the user with the received hint.

Figure 9:
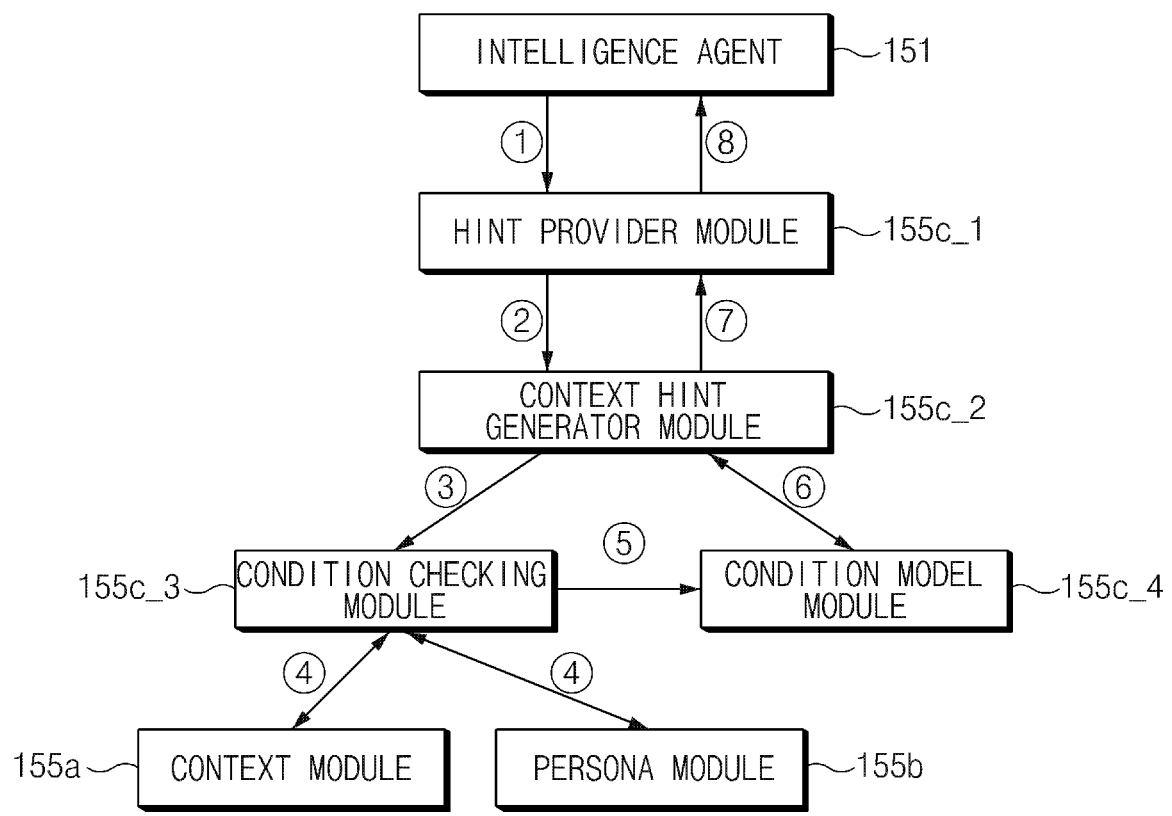
FIG. 9 is a diagram illustrating that a hint according to a specific situation of a context hint generator module of a proposal module is proposed, according to an embodiment of the present disclosure.

FIG. 9 is a diagram illustrating that a hint according to a specific situation of a context hint generator module of a proposal module is proposed, according to an embodiment of the present disclosure.

Referring to FIG. 9, if receiving a hint provision request from the intelligence agent 151 (①), the hint provider module 155c_1 may transmit a hint generation request to the context hint generator module 155c_2 (②). If receiving the hint generation request, the context hint generator module 155c_2 may receive information corresponding to a current state from the context module 155a and the persona module 155b (④) by using the condition checking module 155c_3 (③). The condition checking module 155c_3 may transmit the received information to the condition model module 155c_4 (⑤), and the condition model module 155c_4 may assign priority to a hint of hints provided to a user in order of high availability under a condition by using the information. The context hint generator module 155c_2 may verify the condition (⑥) and may generate the hint corresponding to the current state. The context hint generator module 155c_2 may transmit the generated hint to the hint provider module 155c_1 (⑦). The hint provider module 155c_1 may sort the hint depending on a specified rule and may transmit the hint to the intelligence agent 151 (⑧).

Table 1 below may represent a condition modeled depending on the current state and an utterance (or a hint) generated under the condition.

TABLE 1

| Utterance of user | Condition |
|---|---|
| Tell me the next schedule. | The next event is within 2 hours |
| Give me directions to the next appointment | The next event location is present & (1 hour before or on board) |
| Call a taxi going to the next appointment place | The next event location is present & (1 hour before or when not on board) |
| Search for vicinity of the next appointment place | The next event location is present & (an event schedule is before getting off work - that is, no working hours) |
| Give me directions to home | Leaving work & on board |
| Call me a taxi to get home | Leaving work & not on board |
| Give me directions to my workplace | Going to work & on board |
| Call a taxi to go to my workplace | Leaving work & not on board |
| How is the weather today? | After waking up |
| Show me today's schedule. | After waking up |
| Turn off all alarms | In the case where there is an alarm after waking up & during the morning (~12 o'clock) & within one hour |
| Set "do not disturb" | Before sleeping |
| How is the weather tomorrow | Before sleeping |
| Show me tomorrow's schedule. | Before sleeping |
| Set alarm | In the case where there is no alarm before sleeping & during the morning (~12 o'clock) |
| How is the weather next week | Before sleeping & Sunday |
| Show me the mail from VIP | In the case where there is an unread mail from VIP |
| Show me a new mail | In the case where there is a new mail |
| Show me a missed call | In the case where there are a plurality of missed calls |
| Make a call to (a phone number of the missed call) | In the case where there is a missed call |
| Show me a new message | In the case where there is a new message |
| Show me a voice mail | In the case where there is a voice mail. |

According to an embodiment, the hint provider module 155c_1 may generate a plurality of context hints and may designate the plurality of context hints to the priority depending on the specified rule. According to an embodiment, the hint provider module 155c_1 may provide the user with one, the priority of which is the highest, from among the plurality of context hints.

Figure 10:
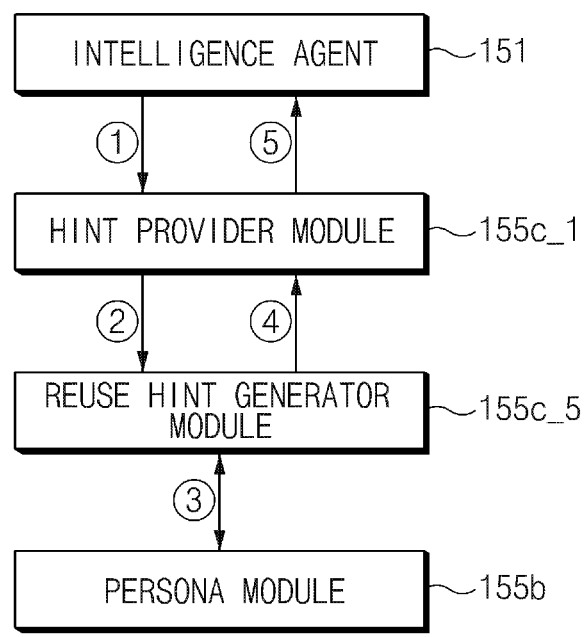
FIG. 10 is a diagram illustrating that a hint according to a usage frequency of a reuse hint generator module is proposed, according to an embodiment of the present disclosure.

FIG. 10 is a diagram illustrating that a hint according to a usage frequency of a reuse hint generator module is proposed, according to an embodiment of the present disclosure.

Referring to FIG. 10, if receiving a hint provision request from the intelligence agent 151 (①), the hint provider module 155c_1 may transmit a hint generation request to the reuse hint generator module 155c_5 (②). If receiving the hint generation request, the reuse hint generator module 155c_5 may receive user information from the persona module 155b (③). For example, the reuse hint generator module 155c_5 may receive a path rule included in preference information of a user of the persona module 155b, a parameter included in the path rule, an execution frequency of an app, and information about time and space in which the app is used. The reuse hint generator module 155c_5 may generate a hint corresponding to the received user information. The reuse hint generator module 155c_5 may transmit the generated hint to the hint provider module 155c_1 (④). The hint provider module 155c_1 may sort the hint and may transmit the hint to the intelligence agent 151 (⑤).

Figure 11:
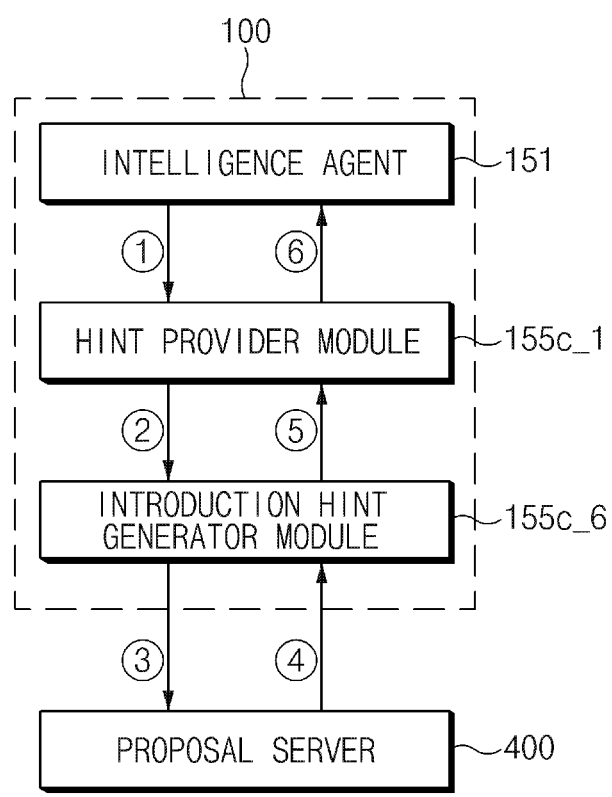
FIG. 11 is a diagram illustrating that an introduction hint generator module proposes a hint associated with a new function, according to an embodiment of the present disclosure.

FIG. 11 is a diagram illustrating that an introduction hint generator module proposes a hint associated with a new function, according to an embodiment of the present disclosure.

Referring to FIG. 11, if receiving a hint provision request from the intelligence agent 151 (①), the hint provider module 155c_1 may transmit a hint generation request to the introduction hint generator module 155c_6 (②). The introduction hint generator module 155c_6 may transmit an introduction hint provision request to the proposal server 400 (③) and may receive information about a function to be introduced from the proposal server 400 (④). For example, the proposal server 400 may store the information about the function to be introduced, and a hint list associated with the function to be introduced may be updated by a service operator. The introduction hint generator module 155c_6 may transmit the generated hint to the hint provider module 155c_1 (⑤). The hint provider module 155c_1 may sort the hint and may transmit the hint to the intelligence agent 151 (⑥).

Table 2 below may represent an example associated with the function to be introduced and an app (or a hint) corresponding to the example.

TABLE 2

| Application | Introduction contents |
|---|---|
| Gallery | Make a collage |
| Secure folder | Keep important data in a secure folder. |
| Theme | Would you like to switch to the new theme? |
| Telephone | You may automatically record calls. |
| Message | Would you like to set message wallpaper? |
| Internet | You may change the default search engine. |
| S note | Take a memo by S note easily. |
| Camera | You may store location information in photos/videos. |
| S health | Measure a heart rate by S health |

As such, the proposal module 155c may provide a user with a hint generated by the context hint generator module 155c_2, the reuse hint generator module 155c_5, and the introduction hint generator module 155c_6. For example, the proposal module 155c may display the generated hint in an app operating the intelligence agent 151 and may receive an input for selecting the hint from the user through the app.

Figure 12:
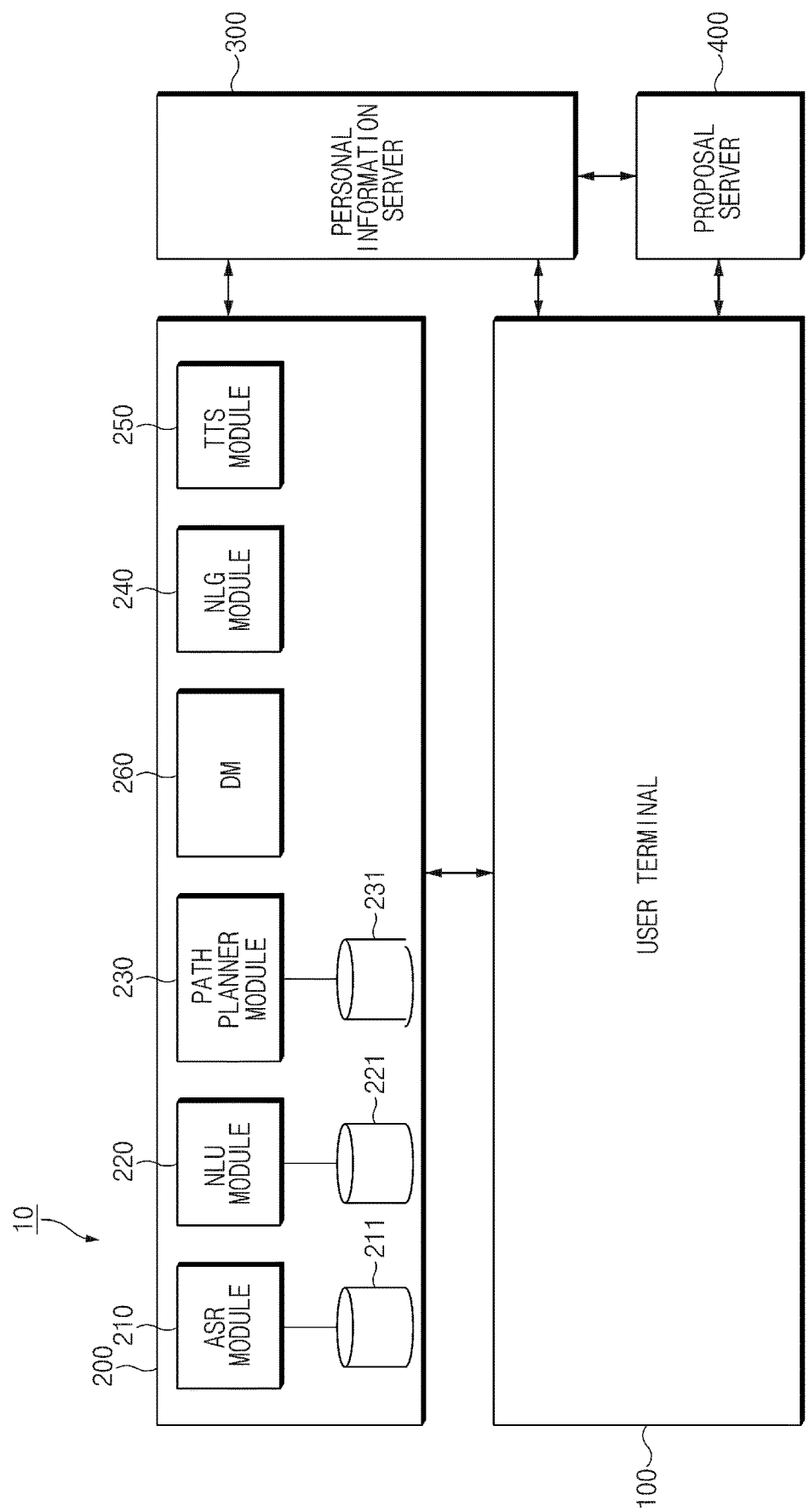
FIG. 12 is a block diagram illustrating an intelligence server of an integrated intelligent system, according to an embodiment of the present disclosure.

FIG. 12 is a block diagram illustrating an intelligence server of an integrated intelligent system, according to an embodiment of the present disclosure.

Referring to FIG. 12, the intelligence server 200 may include an automatic speech recognition (ASR) module 210, a natural language understanding (NLU) module 220, a path planner module 230, a natural language generator (NLG) module 240, a text to speech (TTS) module 250, and a dialogue manager (DM) module 260. According to an embodiment, the intelligence server 200 may include a communication circuit, a memory, and a processor. The processor may drive the ASR module 210, the NLU module 220, the path planner module 230, the NLG module 240, the TTS module 250, and the DM module 260 by executing an instruction stored in the memory. The intelligence server 200 may transmit or receive data (or information) to or from an external electronic device (e.g., the user terminal 100) through the communication circuit.

The ASR module 210, the NLU module 220, and the path planner module 230 of the intelligence server 200 may generate a path rule.

According to an embodiment, the ASR module 210 may change the user input received from the user terminal 100 to text data. For example, the ASR module 210 may include an utterance recognition module. The utterance recognition module may include an acoustic model and a language model. For example, the acoustic model may include information associated with vocalization, and the language model may include unit phoneme information and information about a combination of unit phoneme information. In addition, the utterance recognition module may select a part of the unit phoneme information or may assign weight to a part of the unit phoneme information, based on an ambient situation (e.g., a location information, ambient device information, or the like), a usage condition (e.g., an app state, previous query history, or the like), or the like. The utterance recognition module may change the utterance of the user to text data by using the information associated with the vocalization and the unit phoneme information. For example, the information about the acoustic model and the language model may be stored in an automatic voice recognition database 211.

According to an embodiment, the intelligence server 200 may further include a speaker recognition module. The speaker recognition module may recognize a speaker by analyzing the utterance of the user based on user information stored in a database. The speaker recognition module may generate a speaker recognition model based on the utterance first entered by the user and may store the generated speaker recognition model in the database. According to an embodiment, the speaker recognition module may determine whether a speaker registered in the speaker recognition model is correct, based on the speaker recognition model. For example, in the case where the speaker recognition module determines that the registered speaker is correct, all functions corresponding to the user input may be performed. For another example, in the case where it is determined that an unregistered speaker is correct, only the limited function of the user input may be performed. According to an embodiment, the speaker recognition module may be used as a method (wakeup recognition) for activating voice recognition. For example, the speaker recognition module may determine that the registered speaker voice is correct, and may perform the voice recognition or natural language processing on the registered speaker voice.

According to an embodiment, the NLU module 220 may grasp user intent by performing syntactic analysis and semantic analysis. The syntactic analysis may divide the user input into syntactic units (e.g., words, phrases, morphemes, and the like) and may determine what syntactic element the divided units have. The semantic analysis may be performed by using semantic matching, rule matching, formula matching, or the like. As such, the NLU module 220 may obtain a domain, intent, and a parameter (or a slot) utilized for the user input to express the intent.

For example, the NLU module 220 may grasp the user intent by respectively matching the domain, the intent, and the parameter to cases by using the matching rule included in a rule-based algorithm.

According to an embodiment, the path planner module 230 may generate a path rule by using the user intent grasped from the NLU module 220. Below, the details about the path planner module 230 will be described in detailed.

According to an embodiment, the natural language generator module NLG 240 may change specified information to a text form. The information changed to the text form may be in the form of a natural language utterance. For example, the specified information may be information about an additional input, information for guiding the completion of an action corresponding to the user input, or information for guiding the additional input of the user (e.g., feedback information about the user input). The information changed to the text form may be displayed on the display 120 after being transmitted to the user terminal 100 or may be changed to a voice form after being transmitted to the TTS module 250.

According to an embodiment, the TTS module 250 may change information of the text form to information of a voice form. The TTS module 250 may receive the information of the text form from the NLG module 240, may change the information of the text form to the information of a voice form, and may transmit the information of the voice form to the user terminal 100. The user terminal 100 may output the information of the voice form to the speaker 130.

According to an embodiment, the DM module 260 may determine whether the user intent grasped by the NLU module 220 is clear. For example, the DM module 260 may determine whether the user intent is clear, based on whether the information of a parameter is sufficient. The DM module 260 may determine whether the parameter grasped by the NLU module 220 is enough to perform a task. According to an embodiment, in the case where the user intent is not clear, the DM module 260 may perform feedback for making a request for information to the user. For example, the DM module 260 may perform the feedback for making a request for information about the parameter for grasping the user intent.

According to an embodiment, the DM module 260 may include a content provider module. In the case where the content provider module executes an action based on the intent and the parameter grasped by the NLU module 220, the content provider module may generate the result obtained by performing a task corresponding to the user input. According to an embodiment, the DM module 260 may transmit the result generated by the content provider module as the response to the user input to the user terminal 100.

Figure 13:
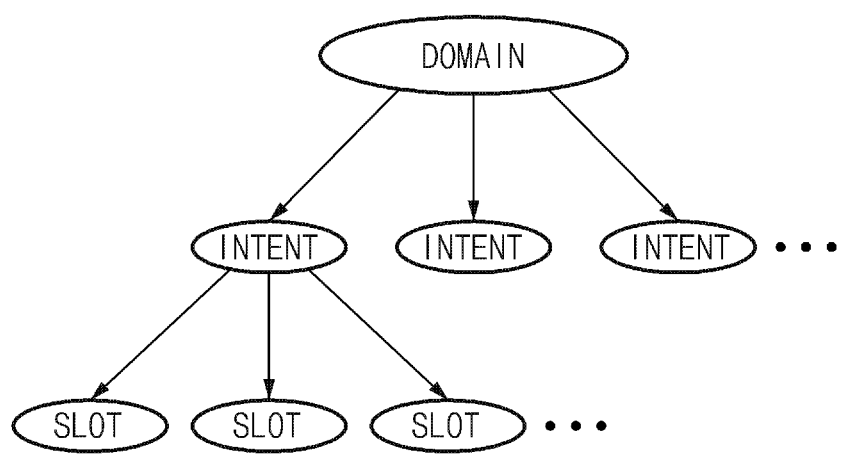
FIG. 13 is a diagram illustrating a natural language understanding method of a natural language understanding (NLU) module, according to an embodiment of the present disclosure.

FIG. 13 is a diagram illustrating a natural language understanding method of an NLU module according to an embodiment of the present disclosure.

Referring to FIG. 13, the NLU module 220 may grasp user intent by using a matching rule divided into a domain, intent, and a slot (or a parameter). For example, the one domain (e.g., an alarm) may include a plurality of intent (e.g., alarm settings, alarm cancellation, and the like), and one intent may include a plurality of rules (e.g., a time, the number of iterations, an alarm sound, and the like). For example, the plurality of rules may include one or more parameters. For example, the matching rule may be stored in a natural language recognition database 221.

According to an embodiment, the NLU module 220 may grasp the meaning of words extracted from a user input by using linguistic features (e.g., grammatical elements) such as morphemes, phrases, and the like and may determine the user intent by matching the meaning of the grasped words to the rules. For example, the NLU module 220 may grasp the user intent by calculating how many words extracted from the user input are included, by using information about rules included in each of the domain and the intent. According to an embodiment, the NLU module 220 may determine a parameter of the user input by using the words for grasping the intent. According to an embodiment, the NLU module 220 may determine the user intent by using the natural language recognition database 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the natural language recognition database 221. According to an embodiment, the ASR module 210 as well as the NLU module 220 may recognize the voice of the user with reference to the PLM stored in the natural language recognition database 221.

According to an embodiment, the NLU module 220 may determine the next action based on the user intent grasped through the DM module 260. The DM module 260 may determine whether the user intent is clear. The DM module 260 may determine whether the parameter grasped by the NLU module 220 is enough to perform a task. According to an embodiment, in the case where the user intent is not clear, the DM module 260 may perform feedback for making a request for information to the user. For example, the DM module 260 may perform the feedback for making a request for information about the parameter for grasping the user intent.

According to an embodiment, the path planner module 230 may generate (or select) a path rule based on the intent of the user input and information about a parameter. For example, the path planner module 230 may generate one path rule or a plurality of path rules corresponding to the intent of the user input and the parameter. For example, the path rule generated by the path planner module 230 may include a plurality of actions with respect to one app or may include a plurality of actions with respect to a plurality of apps. The parameter utilized to express (or grasp) the intent may include information utilized for actions of the apps 141 and 143. The path rule generated by the path planner module 230 may include information about a plurality of actions utilized to perform the function of an app and information about a plurality of parameters utilized for the plurality of actions.

According to an embodiment, the path planner module 230 may determine a path rule by mapping the intent of the user input and the parameter to a path rule set including a plurality of path rules. For example, the path rule set, that is, the plurality of path rules may be stored in a path rule database 231 in the table form, and the table of the plurality of path rules may be designated by a developer.

According to another embodiment, the path planner module 230 may determine the path rule by using a plurality of apps according to the intent of the user input and the parameter and the functions of the plurality of apps. For example, the path planner module 230 may divide the functions of the plurality of apps according to the intent of the user input and the parameter into a plurality of unit actions utilized to perform the function. Each of the divided plurality of unit actions may be implemented in a form of ontology or a graph model depending on an execution sequence according to the intent of the user input. In other words, the path planner module 230 may store the path rule set including a plurality of path rules implemented in the form of the ontology or the graph model.

Figure 14:
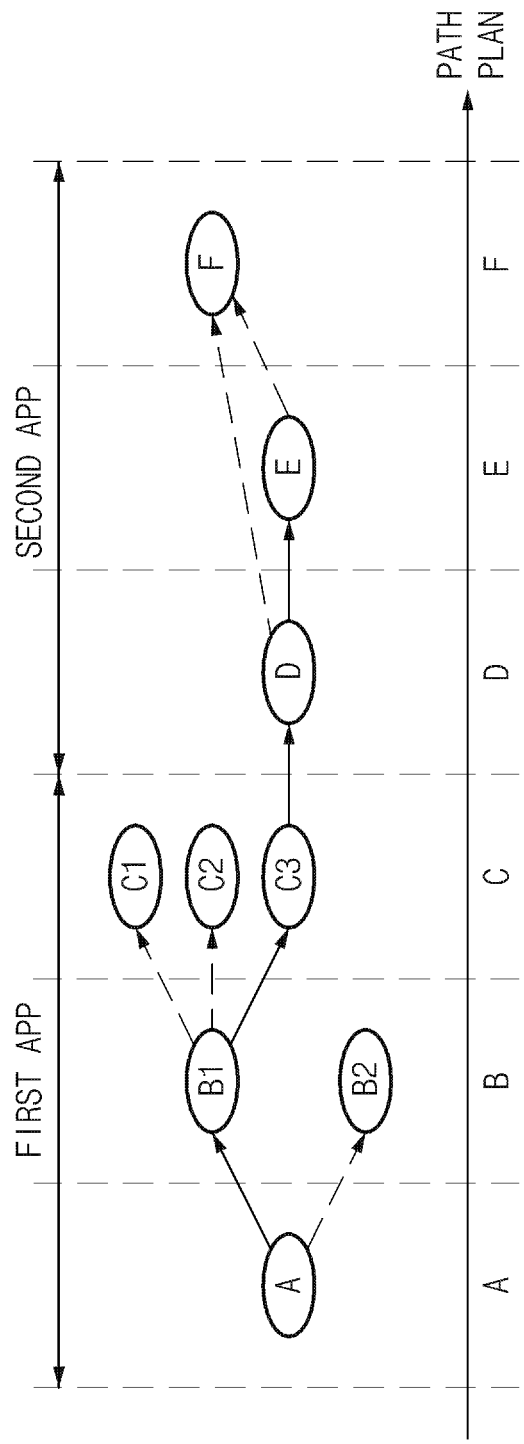
FIG. 14 is a diagram illustrating a path rule generating method of a path planner module, according to an embodiment of the present disclosure.

FIG. 14 is a diagram illustrating a path rule generating method of a path planner module, according to an embodiment of the present disclosure.

Referring to FIG. 14, the path planner module 230 may divide the function of an app into unit actions (e.g., state A to state F) and may store the divided unit actions in the path rule database 231. For example, the path planner module 230 may store a path rule set including a plurality of path rules A-B1-C1, A-B1-C2, A-B1-C3-D-F, and A-B1-C3-D-E-F, which are divided into unit actions, in the path rule database 231.

According to an embodiment, the path rule database 231 of the path planner module 230 may store the path rule set for performing the function of an app. The path rule set may include a plurality of path rules each of which includes a plurality of actions. Each of the plurality of path rules may include the plurality of actions that are sequentially arranged. According to an embodiment, the plurality of path rules implemented in a form of ontology or a graph model may be stored in the path rule database 231.

According to an embodiment, the path planner module 230 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, in the case where there is no path rule completely matched to the user input, the path planner module 230 may transmit a plurality of rules to the user terminal 100. For example, the path planner module 230 may select a path rule (e.g., A-B1) partly corresponding to the user input. The path planner module 230 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the path planner module 230 may select one of a plurality of path rules based on an additional input of the user terminal 100 and may transmit the selected one path rule to the user terminal 100. For example, the path planner module 230 may select one path rule (e.g., A-B1-C3-D-F) of the plurality of path rules (e.g. A-B1-C1, A-B1-C2, A-B1-C3-D-F, and A-B1-C3-D-E-F) depending on the user input (e.g., an input for selecting C3) additionally entered to the user terminal 100 and may transmit the selected one path rule to the user terminal 100.

According to another embodiment, the path planner module 230 may determine the user intent and the parameter corresponding to the user input (e.g., an input for selecting C3) additionally entered by the user terminal 100 through the NLU module 220 and may transmit the intent of a user and the parameter to the user terminal 100. The user terminal 100 may select one path rule (e.g., A-B1-C3-D-F) of the plurality of path rules (e.g., A-B1-C1, A-B1-C2, A-B1-C3-

D-F, and A-B1-C3-D-E-F) based on the transmitted intent and the transmitted parameter.

As such, the user terminal 100 may complete the actions of the apps 141 and 143 based on the selected one path rule.

Figure 15:
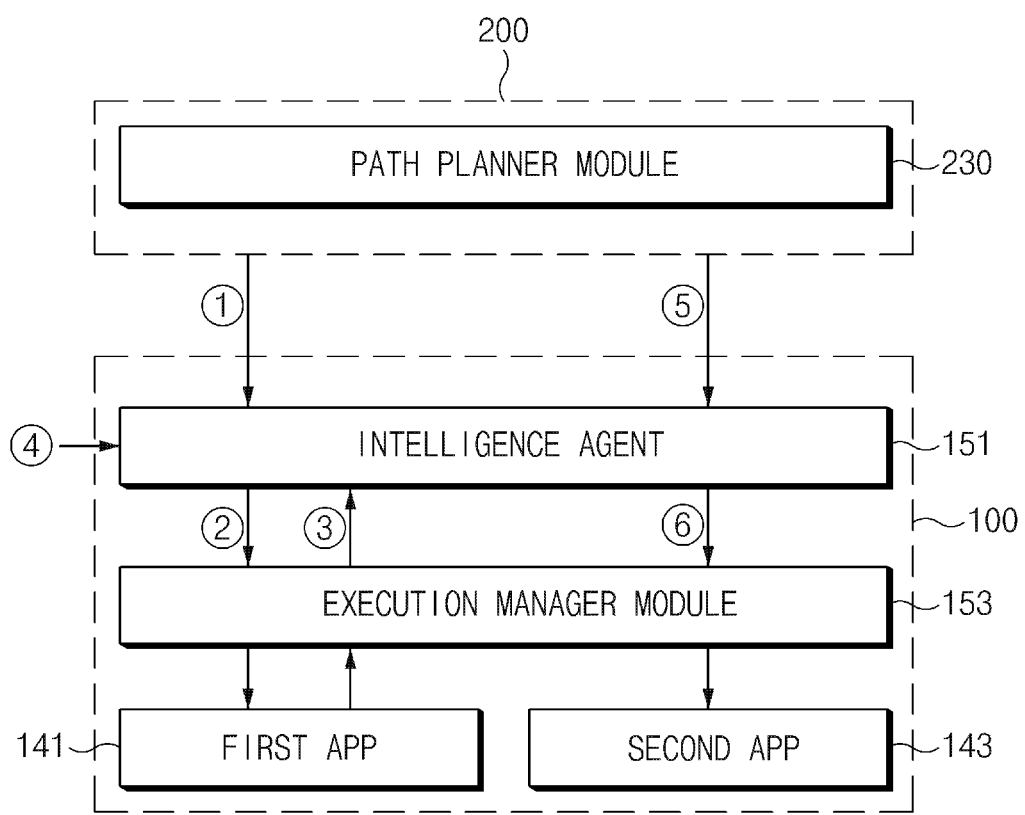
FIG. 15 is a block diagram illustrating that a path rule of a path planner module is generated, according to an embodiment of the present disclosure.

FIG. 15 is a block diagram illustrating that a path rule of a path planner module is generated, according to an embodiment of the present disclosure.

Referring to FIG. 15, in the case where a user input, information of which is insufficient, is received by the intelligence server 200, the path planner module 230 may generate a path rule partly corresponding to the received user input. The path planner module 230 may transmit the partly corresponding path rule to the intelligence agent 151 (①). The intelligence agent 151 may receive the path rule may transmit the partly corresponding path rule to the execution manager module 153 (②). The execution manager module 153 may execute the first app 141 depending on the path rule. While executing the first app 141, the execution manager module 153 may transmit information about an insufficient parameter to the intelligence agent 151 (③). The intelligence agent 151 may make a request for an additional input to a user by using the information about the insufficient parameter. If the additional input is received by the user (④), the intelligence agent 151 may transmit the user input to the intelligence server 200. The path planner module 230 may generate a path rule to be added, based on the intent of the user input additionally entered and parameter information and may transmit the added path rule to the intelligence agent 151 (⑤). The intelligence agent 151 may transmit the path rule to the execution manager module 153 (⑥) for the purpose of executing the second app 143.

Figure 16:
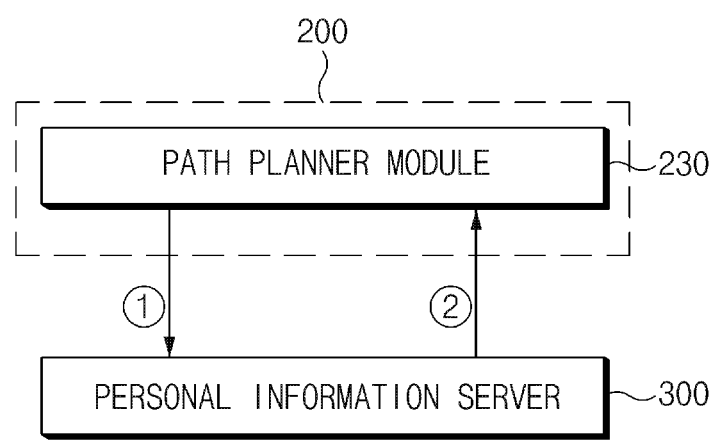
FIG. 16 is a diagram illustrating that a path planner module uses user information stored in a personal information server, according to an embodiment of the present disclosure.

FIG. 16 is a diagram illustrating that a path planner module uses user information stored in a personal information server, according to an embodiment of the present disclosure.

Referring to FIG. 16, in the case where a user input, a portion of information of which is missed, is received by the intelligence server 200, the path planner module 230 may transmit a user information request to the personal information server 300. The personal information server 300 may transmit information about a user, which enters the user input stored in a persona database, to the path planner module 230. The path planner module 230 may select a path rule corresponding to the user input, in which an action is partly missed, by using the user information.

As such, even though the user input, a portion of information of which is missed is received by the intelligence server 200, the path planner module 230 may determine a path rule corresponding to the user input, by requesting the missed information to receive an additional input or by using user information.

According to an embodiment, Table 3 attached below may represent a form of a path rule associated with a task that a user requests.

TABLE 3

| Path rule ID | State | parameter |
| --- | --- | --- |
| Gallery_101 | pictureView(25) | NULL |
| | searchView(26) | NULL |
| | searchViewResult(27) | Location, time |
| | SearchEmptySelectedView(28) | NULL |

TABLE 3-continued

| Path rule ID | State | parameter |
| --- | --- | --- |
| | SearchSelectedView(29) | ContentType, selectall |
| | CrossShare(30) | anaphora |

Referring to Table 3, a path rule that is generated or selected by an intelligence server (the intelligence server 200 of FIG. 1) depending on the user's utterance (e.g., "share a picture") may include at least one state 25, 26, 27, 28, 29 or 30. For example, the at least one state (e.g., one operating state of a terminal) may correspond to at least one of the picture application execution PicturesView 25, the picture search function execution SearchView 26, the search result display screen output SearchViewResult 27, the search result display screen output, in which a picture is non-selected, SearchEmptySelectedView 28, the search result display screen output, in which at least one picture is selected, SearchSelectedView 29, or the share application selection screen output CrossShare 30.

In an embodiment, parameter information of the path rule may correspond to at least one state. For example, the search result display screen output, in which at least one picture is selected, 29 may be included in the state.

The task (e.g., "share a picture!") that the user requests may be performed depending on the execution result of the path rule including the sequence of the states 25, 26, 27, 28, and 29.

Figure 17A:
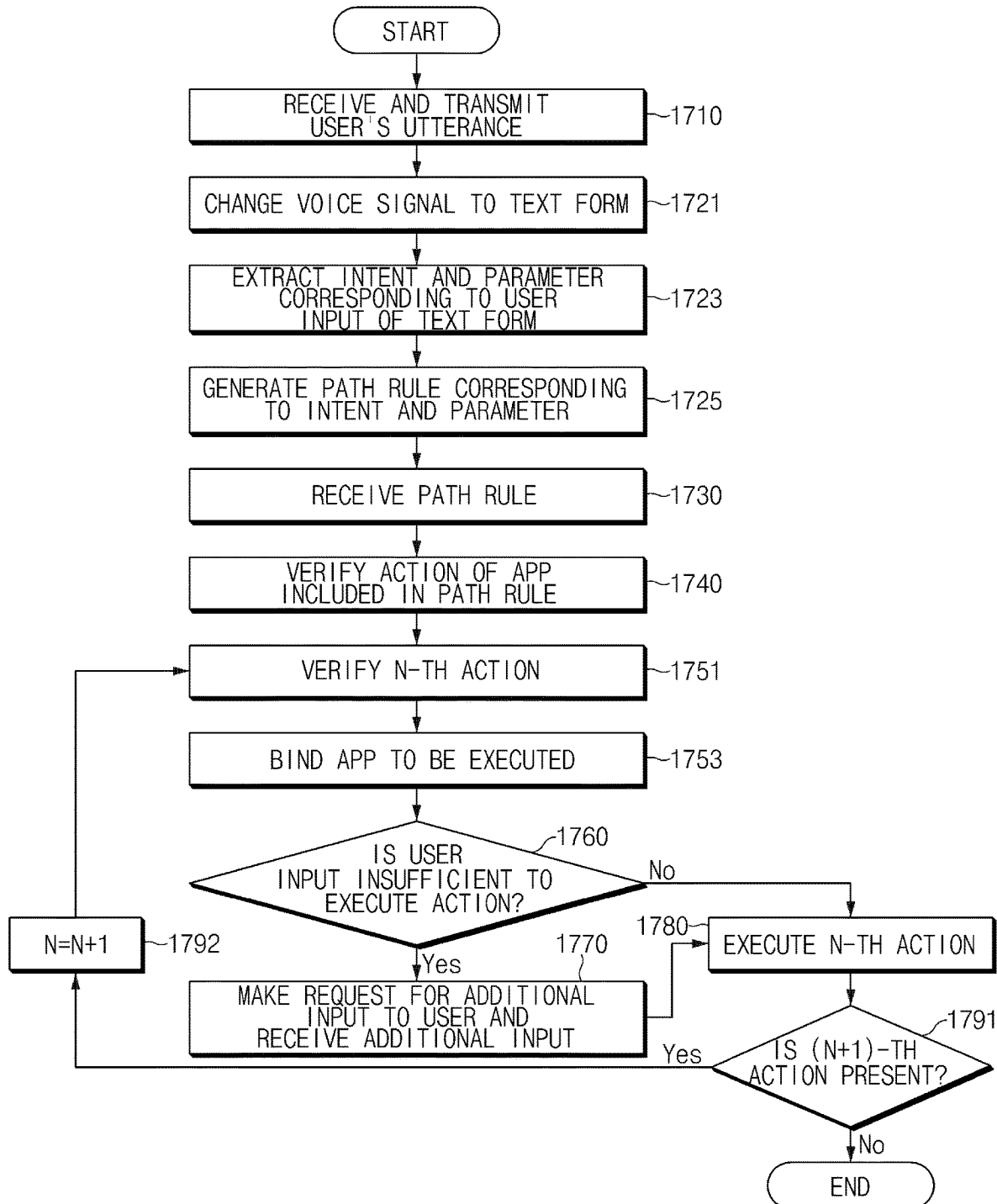
FIGS. 17A and 17B are flowcharts illustrating a user input processing method of an integrated intelligent system, according to an embodiment of the present disclosure.
Figure 17B:
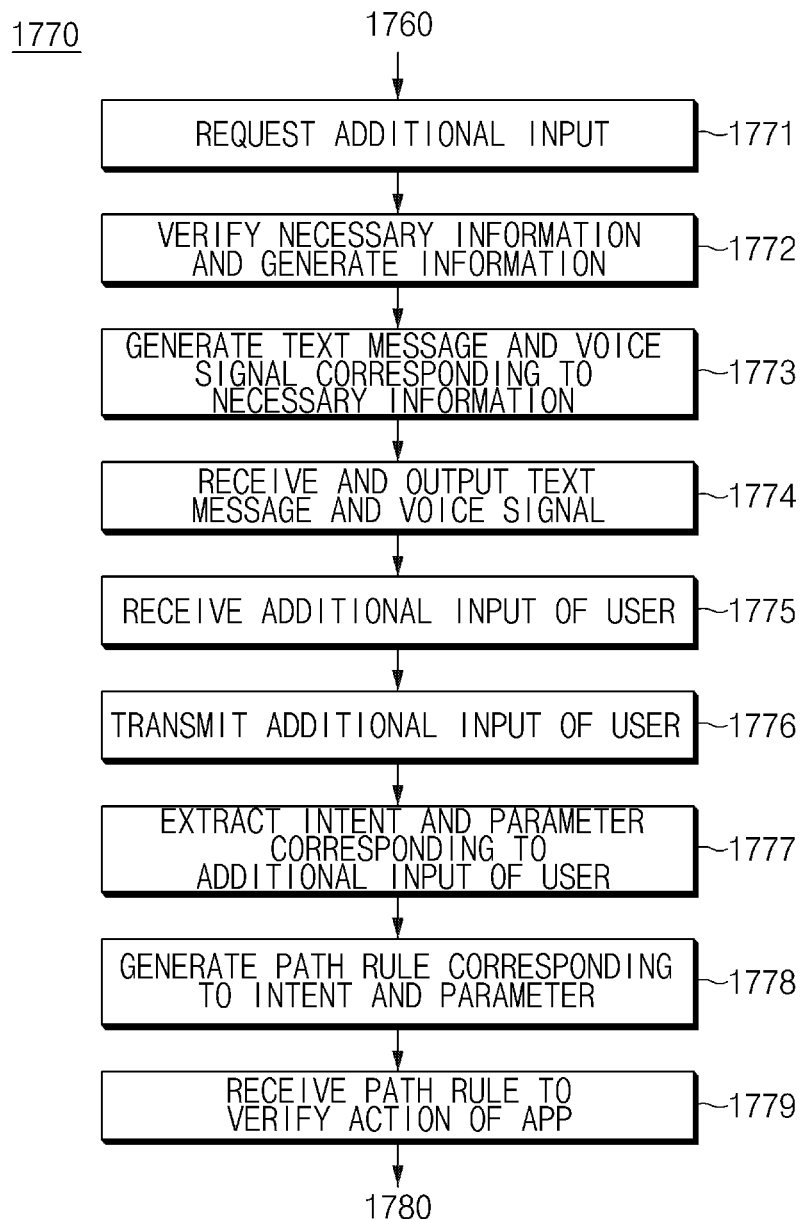

FIGS. 17A and 17B are flowcharts illustrating a user input processing method of an integrated intelligent system, according to an embodiment of the present disclosure.

Referring to FIG. 17A, the user terminal 100 and the intelligence server 200 may execute the action of an app by processing a user voice. In the actions of the user terminal 100 and the intelligence server 200 to be described below, some of the above-mentioned actions may be omitted or the sequence of the above-mentioned actions may be changed.

According to an embodiment, in operation 1710, the user terminal 100 (e.g., the intelligence agent 151) may receive user's utterance and may transmit the received user's utterance to the intelligence server 200.

According to an embodiment, in operation 1721, the intelligence server 200 (e.g., the ASR module 210) may change a user input of a voice signal to a text form.

According to an embodiment, in operation 1723, the intelligence server 200 (e.g., the NLU module 220) may extract intent and a parameter corresponding to the user input changed to the text form.

According to an embodiment, in operation 1725, the intelligence server 200 (e.g., the path planner module 230) may generate a path rule corresponding to the intent and the parameter.

According to an embodiment, in operation 1730, the user terminal 100 (e.g., the intelligence agent 151) may receive the path rule from the intelligence server 200.

According to an embodiment, in operation 1740, the user terminal 100 (e.g., the execution manager module 153) may verify the action of an app corresponding to the path rule.

According to an embodiment, in operation 1751, the user terminal 100 (e.g., the execution manager module 153) may verify the N-th (e.g., N=1) action of the app.

According to an embodiment, in operation 1753, the user terminal 100 (e.g., the execution manager module 153) may bind the app to be executed depending on the path rule.

According to an embodiment, in operation 1760, the user terminal 100 (e.g., the execution manager module 153 and the execution service modules 141*a* and 143*a*) may determine whether a user input is insufficient to execute the action of the app.

According to an embodiment, in the case where the user input is insufficient to execute the action of the app, in operation 1770, the user terminal 100 (e.g., the execution manager module 153 and the execution service modules 141*a* and 143*a*) may make a request for an additional input to the user and may receive the additional input.

According to an embodiment, in the case where the user input is enough to execute the action of the app, in operation 1780, the user terminal 100 (e.g., the execution manager module 153 and the execution service modules 141*a* and 143*a*) may execute the N-th action.

According to an embodiment, in operation 1791, the user terminal 100 (e.g., the execution manager module 153) may determine whether the (N+1)-th action is present. In the case where there is no (N+1)-th action, the execution manager module 153 may end the execution of the app.

According to an embodiment, in the case where the (N+1)-th action is present, in operation 1792, the user terminal 100 (e.g., the execution manager module 153 and the execution service modules 141*a* and 143*a*) may generate a new N by adding "1" to an existing N (N=N+1). As such, the user terminal 100 may execute the (N+1)-th action.

Referring to FIG. 17B, the user terminal 100 and the intelligence server 200 may process an additional input of a user.

According to an embodiment, in operation 1771, the user terminal 100 (e.g., the intelligence agent 151) may transmit information for requesting an additional input, which is necessary to execute the action of an app with regard to an insufficient input, to the intelligence server 200.

According to an embodiment, in operation 1772, the intelligence server 200 (e.g., the DM module 260) may verify information corresponding to the necessary additional input and may generate the necessary information.

According to an embodiment, in operation 1773, the intelligence server 200 (e.g., the NLG module 240 and the TTS module 250) may generate a text message and a voice signal corresponding to the necessary information.

According to an embodiment, in operation 1774, the user terminal 100 (e.g., the intelligence agent 151) may receive the text message and the voice signal from the intelligence server 200. The user terminal 100 may display the text message on the display 120. The user terminal 100 may output the voice signal through the speaker 130.

According to an embodiment, in operation 1775, the user terminal 100 (e.g., the intelligence agent 151) may receive the additional input from the user. For example, the additional input of the user may include a voice input, a touch input, a text input, or the like.

According to an embodiment, in operation 1776, the user terminal 100 (e.g., the intelligence agent 151) may transmit the additional input of the user to the intelligence server 200.

According to an embodiment, in operation 1777, the intelligence server 200 (e.g., the NLU module 220) may extract intent and a parameter corresponding to the additional input.

According to an embodiment, in operation 1778, the intelligence server 200 (e.g., the path planner module 230) may generate a path rule corresponding to the intent and the parameter.

According to an embodiment, in operation 1779, the user terminal 100 may receive the path rule to verify the action of the app. The user terminal 100 may execute the verified action of the app.

As such, the user terminal 100 and the intelligence server 200 may process the user input to execute the action of the app.

Figure 18:
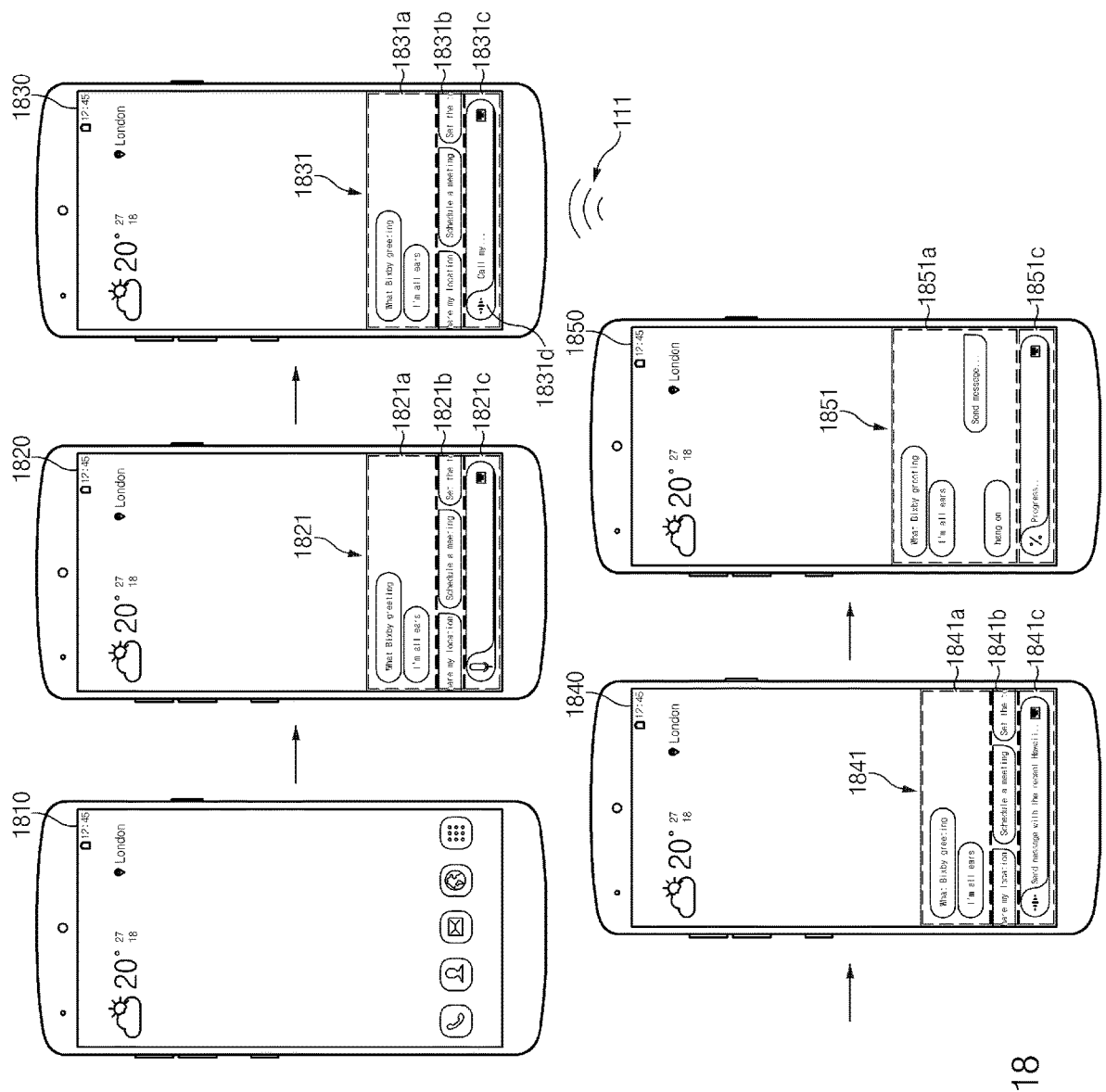
FIG. 18 is a view illustrating a screen in which an integrated intelligent system service is performed by a user terminal, according to an embodiment of the present disclosure.

FIG. 18 is a view illustrating a screen in which an integrated intelligent system service is performed by a user terminal, according to an embodiment of the present disclosure.

Referring to FIG. 18, according to an embodiment, the user terminal 100 may receive a user voice. For example, the user terminal 100 may display a voice recognition user interface (UI) for receiving the user voice on the display 120. According to another embodiment, the user terminal 100 may receive a touch of a user or a text input. For example, the user terminal 100 may display a GUI for receiving the touch input of the user or an integrated intelligent service UI including a user key pad on the display 120.

According to an embodiment, in screen 1810, the user terminal 100 may receive a specific input for recognizing the user voice. For example, the user terminal 100 may receive a specific input for recognizing the user voice in a state where an app is not executed. Afterwards, the specific input will be described in detail.

According to an embodiment, in screen 1820, if receiving the specific input, the user terminal 100 may display the integrated intelligent service UI 1821 on the display 120. For example, the integrated intelligent service UI 1821 may include a dialogue box area 1821*a* for interaction, an instruction hint area 1821*b*, and a display area 1821*c* in which the recognized voice is displayed. According to an embodiment, in the case where the user terminal 100 is ready to receive a voice input, the integrated intelligent service UI 1821 may display an indicator (e.g., a microphone icon) for providing notification that a user input is capable of being received in a part of the display area 1821*c*.

According to an embodiment, in screen 1830, the user terminal 100 may receive the user voice as the user input via the microphone 111. For example, in a state where the integrated intelligent service UI 1831 including the dialogue box area 1831*a*, the instruction hint area 1831*b*, and the display area 1831*c* is displayed on the display 120, the user may enter the user voice by clicking a voice input icon (e.g., a display for providing notification that the user input is capable of being received). According to an embodiment, in the case where the voice input is received, the indicator (e.g., an input icon 1831*d*) indicating that an input is being entered may be displayed in a part of the display area 1831*c*.

According to an embodiment, in screen 1840, the user terminal 100 may transmit the received user input to the intelligence server 200 and may change the received user input to a text corresponding to the user input. In a state where the integrated intelligent service UI 1841 including the dialogue box area 1841*a*, the instruction hint area 1841*b*, and the display area 1841*c* is displayed on the display 120, the user terminal 100 may display the user input changed to the text on the display area 1831*c*. According to an embodiment, when the user input is displayed on the display area 1831*c*, the user terminal 100 may receive a revision input from the user and may revise the displayed user input. For example, the user may revise a part of the user input displayed on the display 120.

According to an embodiment, in screen 1850, the user terminal 100 may display a state, where the intelligence server 200 processes the user input, on the display 120. For example, the user terminal 100 may display a processing state (e.g., hang on, progress, or the like) of the intelligence server 200 in a dialogue box area 1851*a* for interaction and an area 1851*c* in which the recognized voice is capable of being displayed.

According to an embodiment, the user terminal 100 may include a plurality of modes for recognizing the user voice. For example, as described above, in the case where the user terminal 100 displays the integrated intelligent service UI on the display 120 (e.g., command mode), the user terminal 100 may execute an action corresponding to the user input. For another example, in the case where the user enters a text in a specific area (e.g., a dictation mode), the user terminal 100 may enter the user input changed to the text in the specific area. For another example, in the case where the user enters a message in a chat app (e.g., a chat mode), the user terminal 100 may enter the user input changed to the text in a box. For another example, in the case where the user continuously enters an utterance (e.g., a continuous command mode), the user terminal 100 may execute an action corresponding to the continuously entered user input. For example, the user terminal 100 may divide the continuously entered user input into sentence units and may transmit the sentence units to the intelligence server 200. The user terminal 100 may receive a path rule corresponding to the continuously entered user input from the intelligence server 200 to execute an action. In a state where the user continuously clicks a voice recognition button of the integrated intelligent service UI 1821, the user may enter a continuous utterance to the user terminal 100. Alternatively, the user may enter the continuous utterance to the user terminal 100 by clicking the voice recognition button of the integrated intelligent service UI 1821 upon starting the utterance and by clicking the voice recognition button of the integrated intelligent service UI 1821 again upon ending the utterance.

Figure 19:
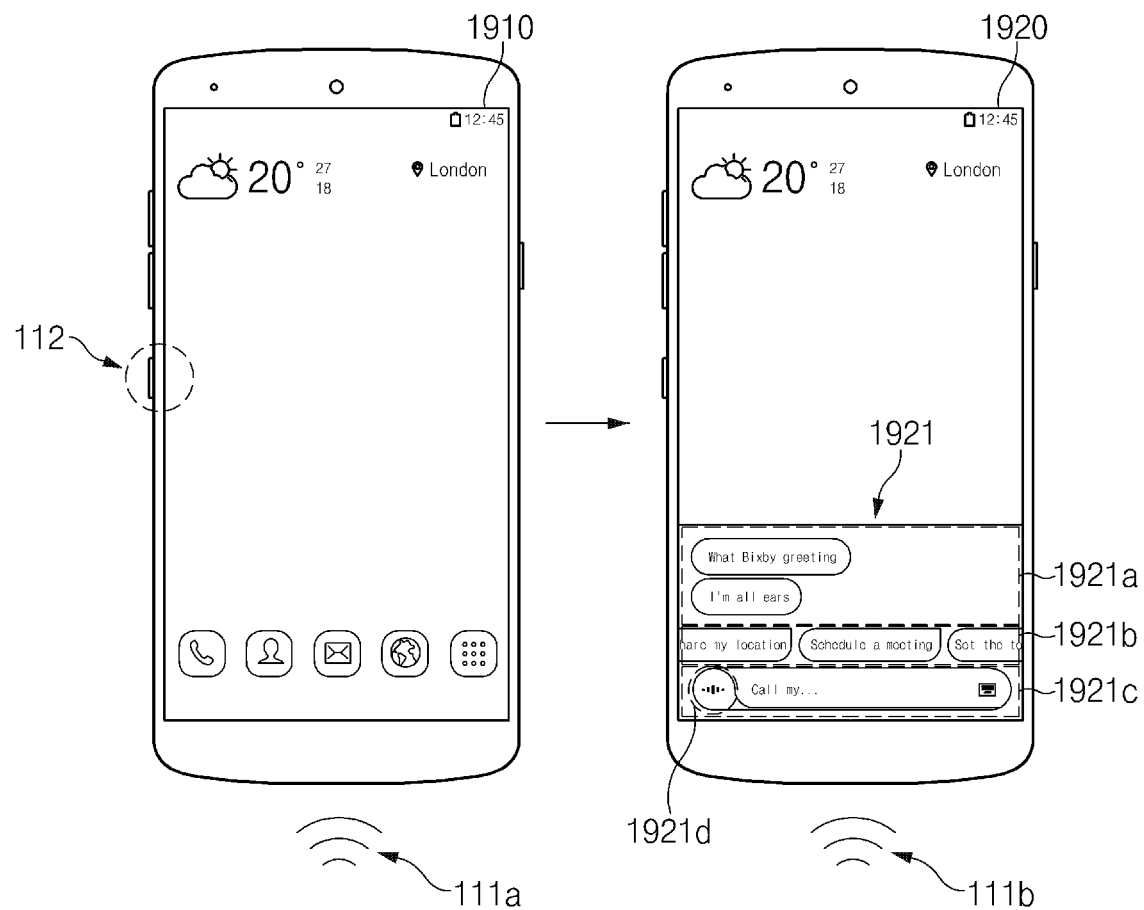
FIG. 19 is a view illustrating that a user terminal receives an input for recognizing a voice, according to an embodiment of the present disclosure.

FIG. 19 is a view illustrating that a user terminal receives an input for recognizing a voice, according to an embodiment of the present disclosure.

Referring to FIG. 19, the user terminal 100 may receive an input for recognizing the voice of a user.

According to an embodiment, in screen 1910, the user terminal 100 may receive the input for recognizing the voice through a hardware key 112. In the case where the user terminal 100 receives the input through the hardware key 112, the user terminal 100 may display an integrated intelligent service UI 1921 on the display 120. The integrated intelligent service UI 1921 may include a dialogue box area 1921*a*, an instruction hint area 1921*b*, and a display area 1921*c*. For example, the user may touch a voice recognition button 1921*d* of the integrated intelligent service UI 1921 to enter the voice 111*a* in a state where the integrated intelligent service UI 1921 is displayed on the display 120. For another example, the user may enter the voice 111*a* while continuously pressing the hardware key 112 pressed to display the integrated intelligent service UI 1921 on the display 120.

According to an embodiment, in screen 1920, the user terminal 100 may receive the input for recognizing the voice through the microphone 111. In the case where a specified voice (e.g., wake up!) 111*b* is entered through the microphone 111, the user terminal 100 may display the integrated intelligent service UI 1921 on the display 120. For example, the user may touch the voice recognition button 1921*d* of the integrated intelligent service UI 1921 to enter the voice in a state where the integrated intelligent service UI 1921 is displayed on the display 120.

As such, the user terminal 100 may receive the voice from the user by receiving the input for recognizing the voice.

Figure 20:
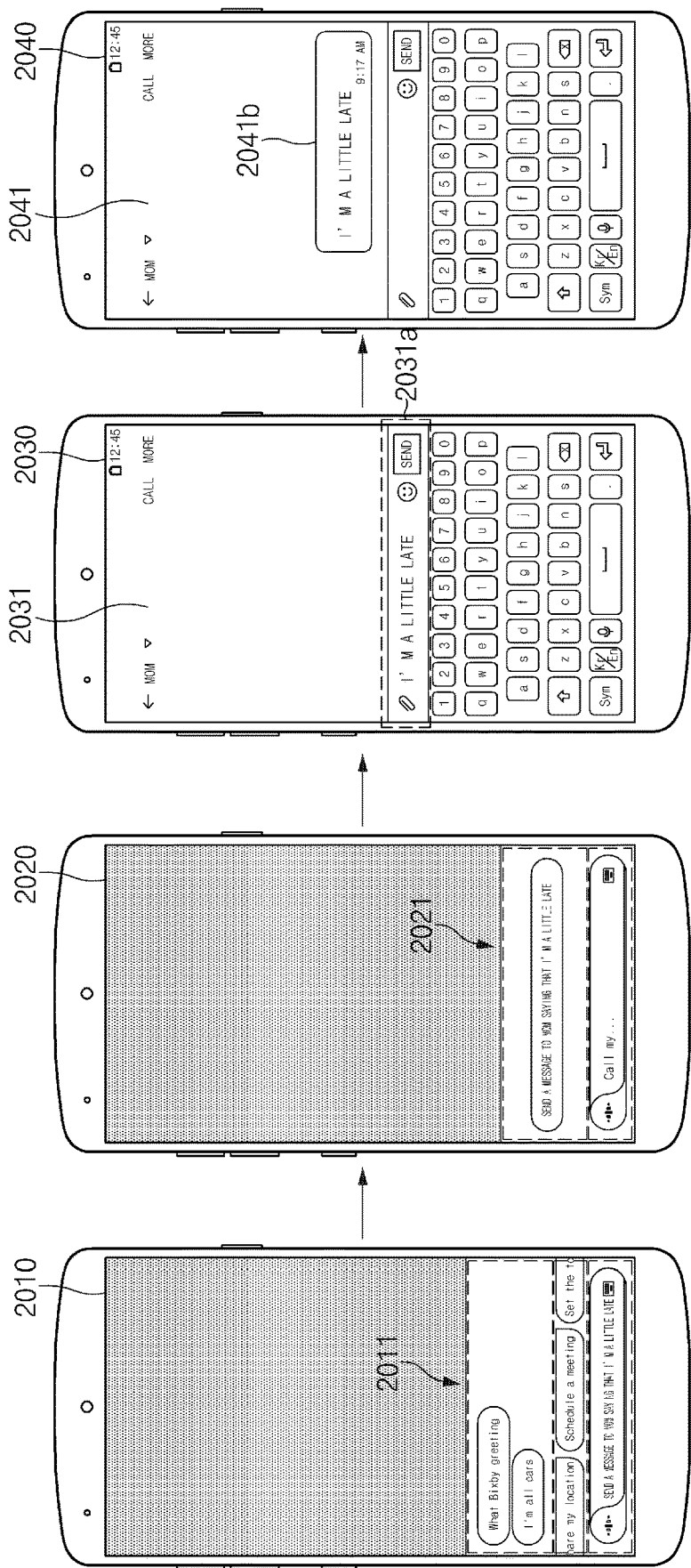
FIG. 20 is a view illustrating a case where one app is executed by a user terminal, according to an embodiment of the present disclosure.

FIG. 20 is a view illustrating a case where one app is executed by a user terminal, according to an embodiment of the present disclosure.

Referring to FIG. 20, the intelligence agent 151 may receive a user input to execute one app 122.

According to an embodiment, the intelligence agent 151 may receive the user input to execute one app.

For example, the user may enter "send a message to mom saying that I'm a little late." The user input may be processed through the intelligence server 200. As the processing result, a path rule including information about states corresponding to an action of executing a message app, an action of displaying a dialogue box with mom, an action of entering a text, and an action of transmitting a message and information about a parameter utilized to execute the actions may be generated. As such, the user terminal 100 may receive the path rule and may execute an action depending on the path rule.

According to an embodiment, in screen 2010, the user terminal 100 may display an integrated intelligent service UI 2011 on the display 120.

According to an embodiment, in screen 2020, the user terminal 100 may receive a user voice as the user input and may recognize the user voice as a text form. For example, the user terminal 100 may recognize "send a message to mom saying that I'm a little late" as a text form through the integrated intelligent service UI 2021.

According to an embodiment, in screen 2030, the user terminal 100 may execute a message app, may execute a dialogue box, and may enter a message. For example, the user terminal 100 may execute a dialogue box with mom 2031 of a message app and may enter a message "I'm a little late" in a message input area 2031*a*.

According to an embodiment, in screen 2040, the user terminal 100 may transmit a message. For example, the user terminal 100 may transmit a message 2041*b* "I'm a little late" and may display the message 2041*b* in a dialogue box with mom 2041.

As such, the user terminal 100 may recognize the user voice as a text (screen 2010 and screen 2020), may automatically execute the action of an app depending on the path rule corresponding to the user input (screen 2030), and may transmit a message (screen 2040).

Figure 21:
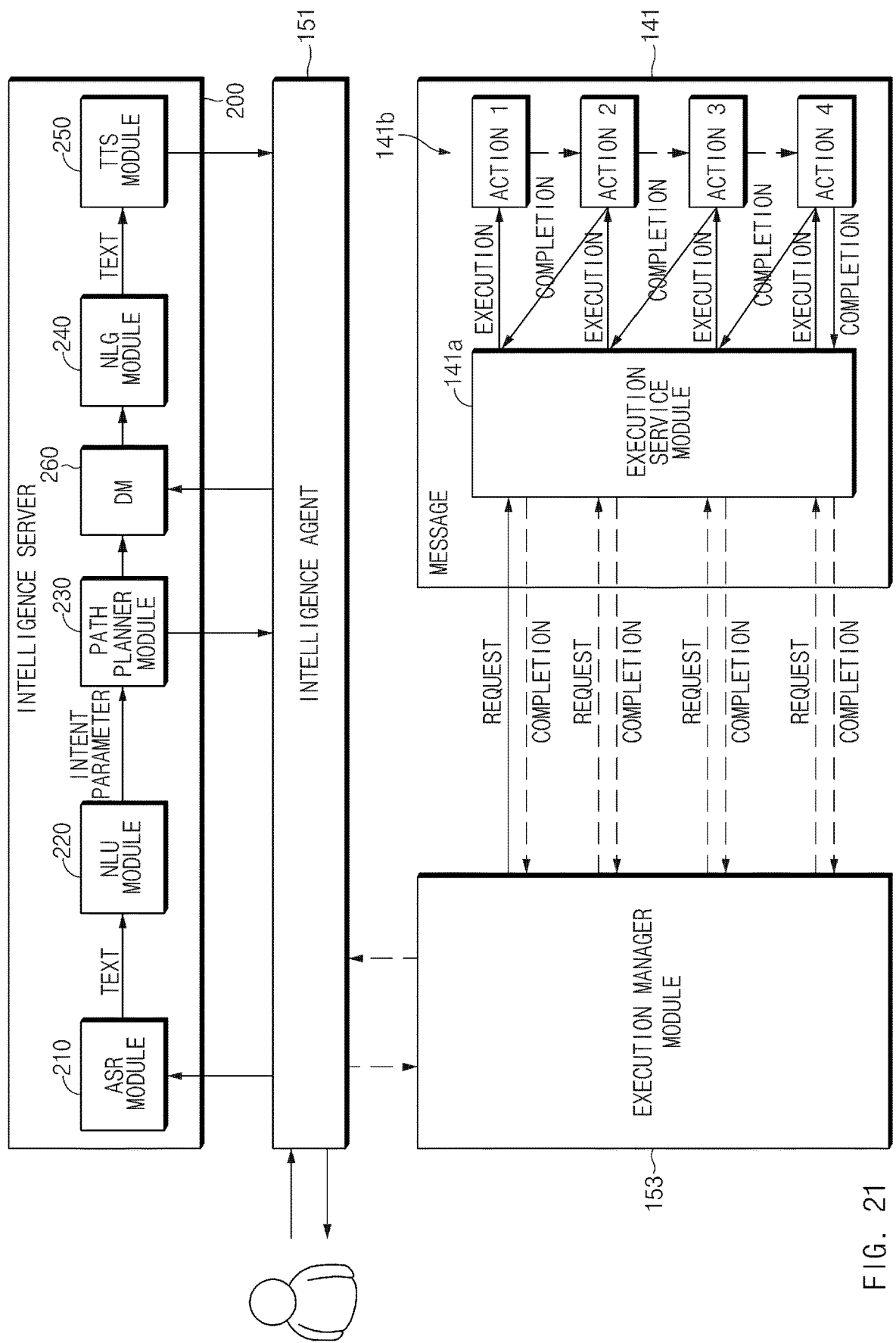
FIG. 21 is a view illustrating a case where one app is executed by a user terminal, according to an embodiment of the present disclosure.

FIG. 21 is a view illustrating a case where one app is executed by a user terminal, according to an embodiment of the present disclosure.

Referring to FIG. 21, if a user enters a user input "send a message to mom saying that I'm a little late" in the user terminal 100, the intelligence agent 151 may transmit the user input to the intelligence server 200. The intelligence server 200 may generate a path rule through the ASR module 210, the NLU module 220, and the path planner module 230 and may transmit the path rule to the user terminal 100, and the intelligence agent 151 may obtain the path rule. While the user input is processed by the intelligence server 200, the user terminal 100 may display "the user input is being processed" on the display 120. In addition, the intelligence agent 151 may receive a user input recognized as a text form from the ASR module 210 and may display the user input on the display 120.

According to an embodiment, the intelligence agent 151 may provide the path rule to the execution manager module 153.

The execution manager module 153 may transmit a signal for making a request for the action 141*b* to the execution service module 141*a* depending on four actions (first to fourth actions) corresponding to the path rule. If one action is completed, the signal for making the request for the action 141*b* may be transmitted. If receiving a signal for making a request for the first action of the first app 141, the execution service module 141*a* may execute the first action. If the first action is completed, the execution service module 141*a* may open the second action of the first app 141 and may transmit completion information to the execution manager module 153. If receiving the completion information, the execution manager module 153 may transmit a signal for requesting the second action. If the execution manager module 153 receives the completion information after the fourth action of the first app 141 is completed, the execution manager module 153 may transmit path rule completion information to the intelligence server 200. The intelligence server 200 may notify the user that the action 141*b* is completed, through the NLG module 240 and the TTS module 250. As such, as illustrated in FIG. 20, the execution manager module 153 may cause four actions (the first to fourth actions) corresponding to the path rule to be sequentially executed.

Figure 22:
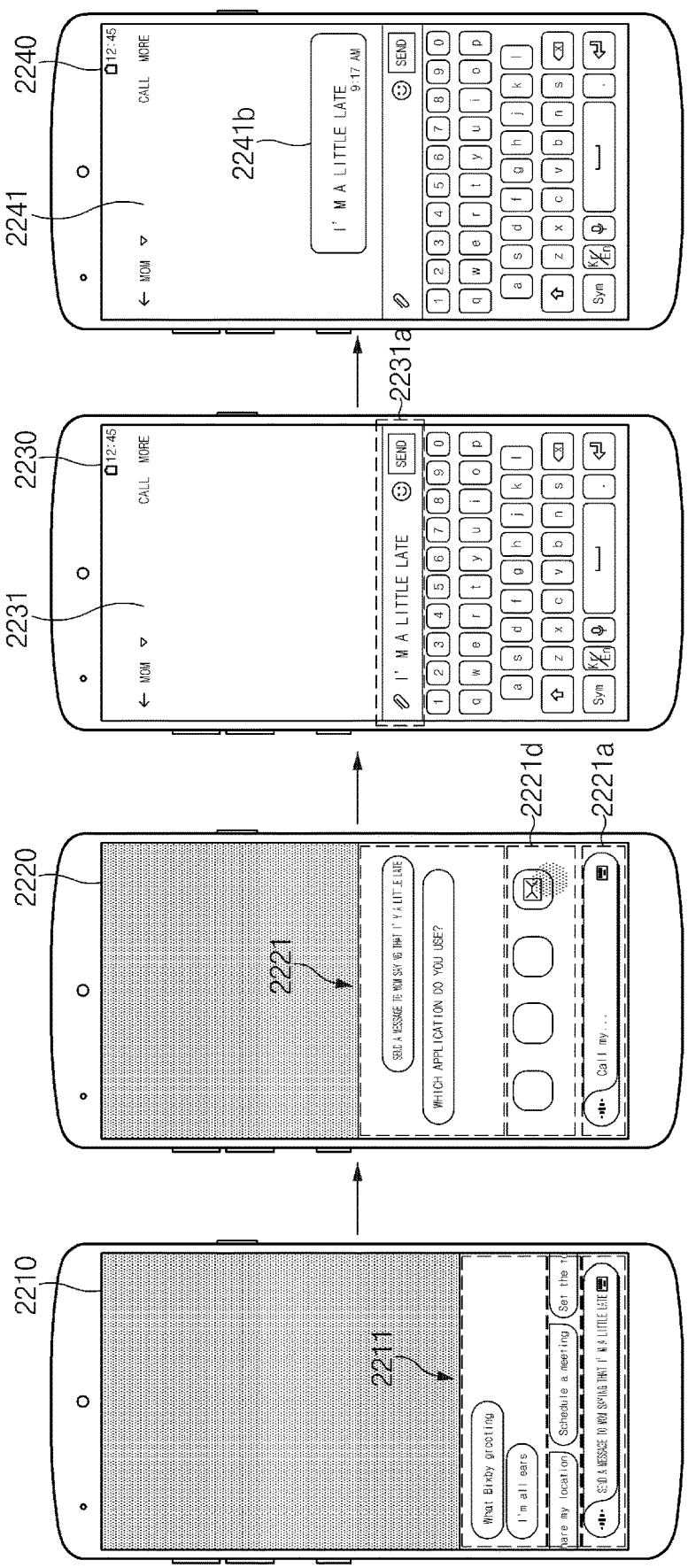
FIGS. 22 and 23 are views illustrating a case where a portion of information is insufficient in a process for executing one app of a user terminal, according to an embodiment of the present disclosure.
Figure 23:
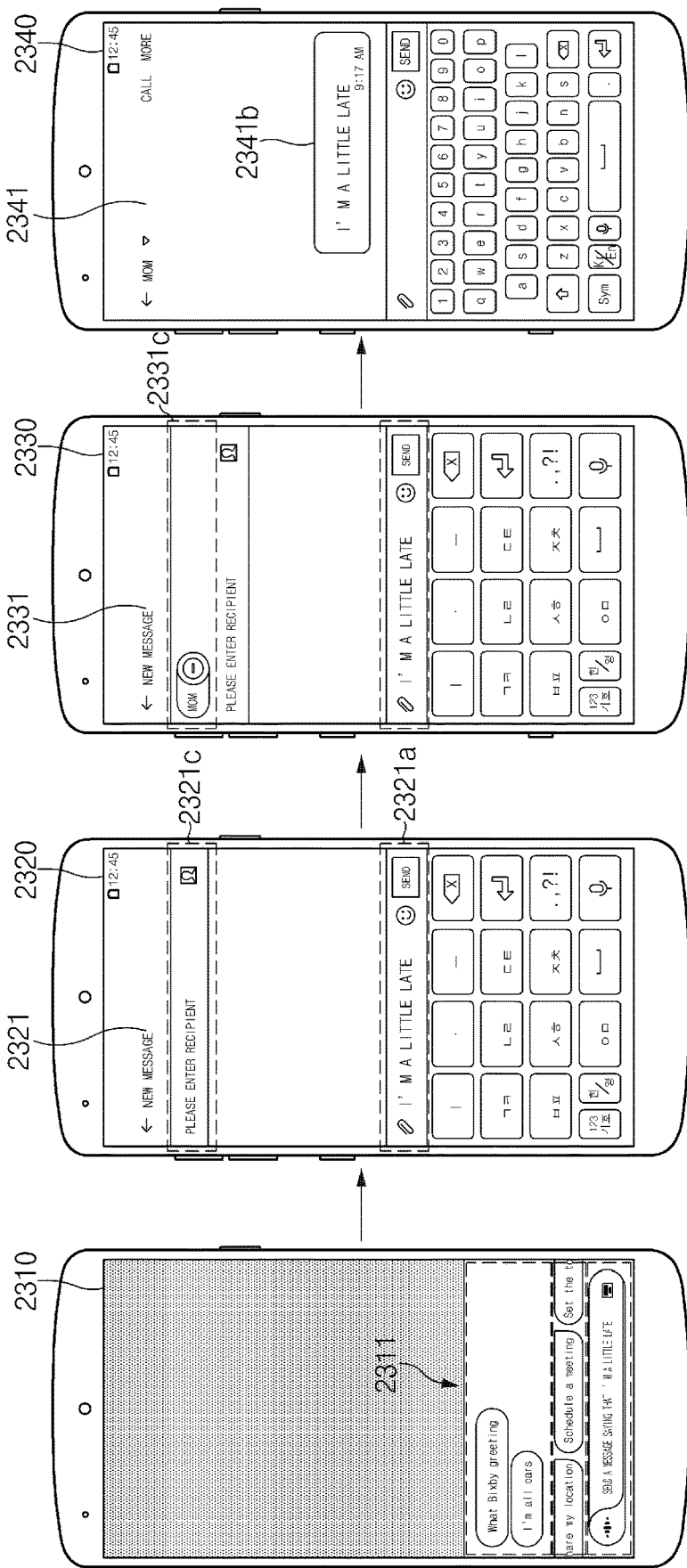

FIGS. 22 and 23 are views illustrating a case where a portion of information is insufficient in a process for executing one app of a user terminal, according to an embodiment of the present disclosure.

Referring to FIGS. 22 and 23, in the case where a portion of information of the received user input is insufficient, the user terminal 100 may make a request for an additional input to a user.

According to an embodiment, in screen 2210, the user terminal 100 may receive a user input "send a message to mom saying that I'm a little late." The user terminal 100 may display the user input in an integrated intelligent service UI 2211. Since the user terminal 100 has various channels or means (e.g., short message service (SMS), application, e-mail, and the like) for transmitting a message, whether to transmit the message through any channel or means may not be defined in the user input.

According to an embodiment, in screen 2220, the user terminal 100 may make a request for an additional input to the user, with regard to whether to send the message to the user by any app. For example, the user terminal 100 may display "which application do you use?" in a dialogue box area 2221*a* of an integrated intelligent service UI 2221. In addition, the user terminal 100 may output information corresponding to the display to the speaker 130.

According to an embodiment, the user terminal 100 may display a plurality of identifiers, each of which represents an app, in a selection area 2221*d* of the app. For example, the identifier may be in the form of an icon, a symbol, an image, or a text. For example, the user may select the touched one by touching one of the plurality of identifiers displayed in the selection area 2221*d* of the app. For another example, the user may select one identifier through an utterance for specifying one of the plurality of identifiers.

According to an embodiment, in screen 2230, the user terminal 100 may execute a message app corresponding to the selected identifier and may display a message "I'm a little late" in a message input area 2231*a* of a dialogue box with mom 2231.

According to an embodiment, in screen 2240, the user terminal 100 may transmit a message 2241*b* "I'm a little late" and may display a dialogue box with mom 2241.

As such, the user terminal 100 may recognize a user voice as a text, and a state for selecting an app may be displayed on the display 120. The user terminal 100 may automatically execute the action of the selected app depending on a path rule corresponding to the user input to transmit the message.

According to another embodiment, the user may enter "send a message saying that I'm a little late." The user input may lack information about whom the user sends the message.

According to an embodiment, in screen 2310, the user terminal 100 may receive the user input "send a message saying that I'm a little late." The user terminal 100 may display an integrated intelligent service UI 2311 on the display 120.

According to an embodiment, in screen 2320, the user terminal 100 may make a request for an additional input to the user with regard to whether to transmit the message to anyone. For example, the user terminal 100 may execute a message app and may enter a message in a message input area 2321*a* of a dialogue box 2321 of the message app. Furthermore, the user terminal 100 may be in a state where a recipient is capable of being selected in an area 2321*c* for entering the recipient. The user not only may select a recipient by a touch input but also may place a cursor in the area 2321*c* for entering the recipient of a message app to directly enter the recipient by a keyboard (or a virtual keyboard).

According to an embodiment, in screen 2330, the user terminal 100 may display the selected word of "mom" in the area 2331*c* of a dialogue box 2331 of the message app for entering the recipient.

According to an embodiment, in screen 2340, the user terminal 100 may display a message 2341*b* "I'm a little late" in a dialogue box with mom 2341.

As such, the user terminal 100 may recognize the user voice as a text, and a state where the recipient is selected may be displayed on the display 120. The user terminal 100 may automatically execute the action of an app depending on a path rule corresponding to the user input and may transmit the message to the selected recipient.

Figure 24A:
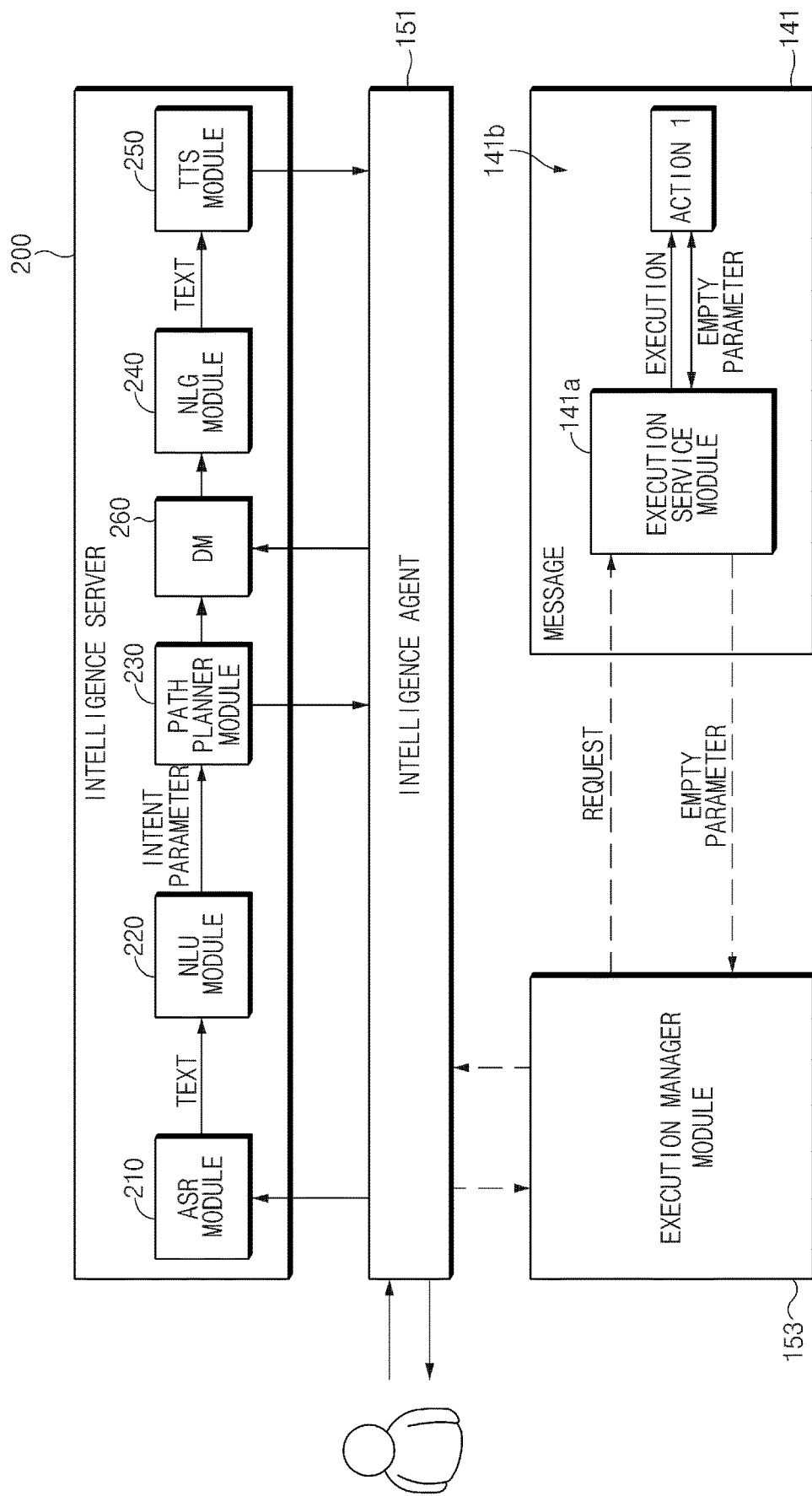
FIGS. 24A, 24B, and 24C are views illustrating a case where a portion of information is insufficient in a process for executing one app of a user terminal, according to an embodiment of the present disclosure.
Figure 24B:
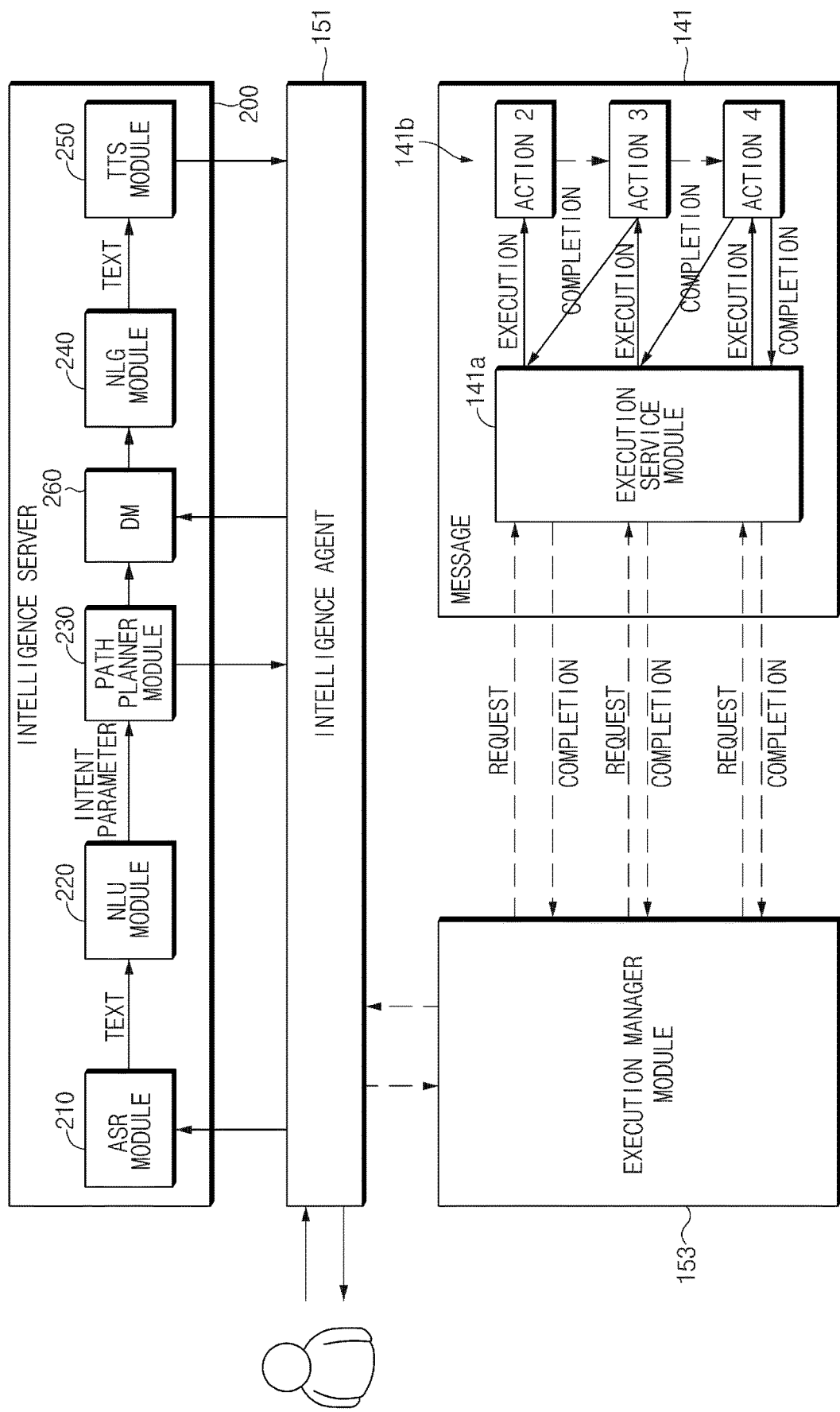
Figure 24C:
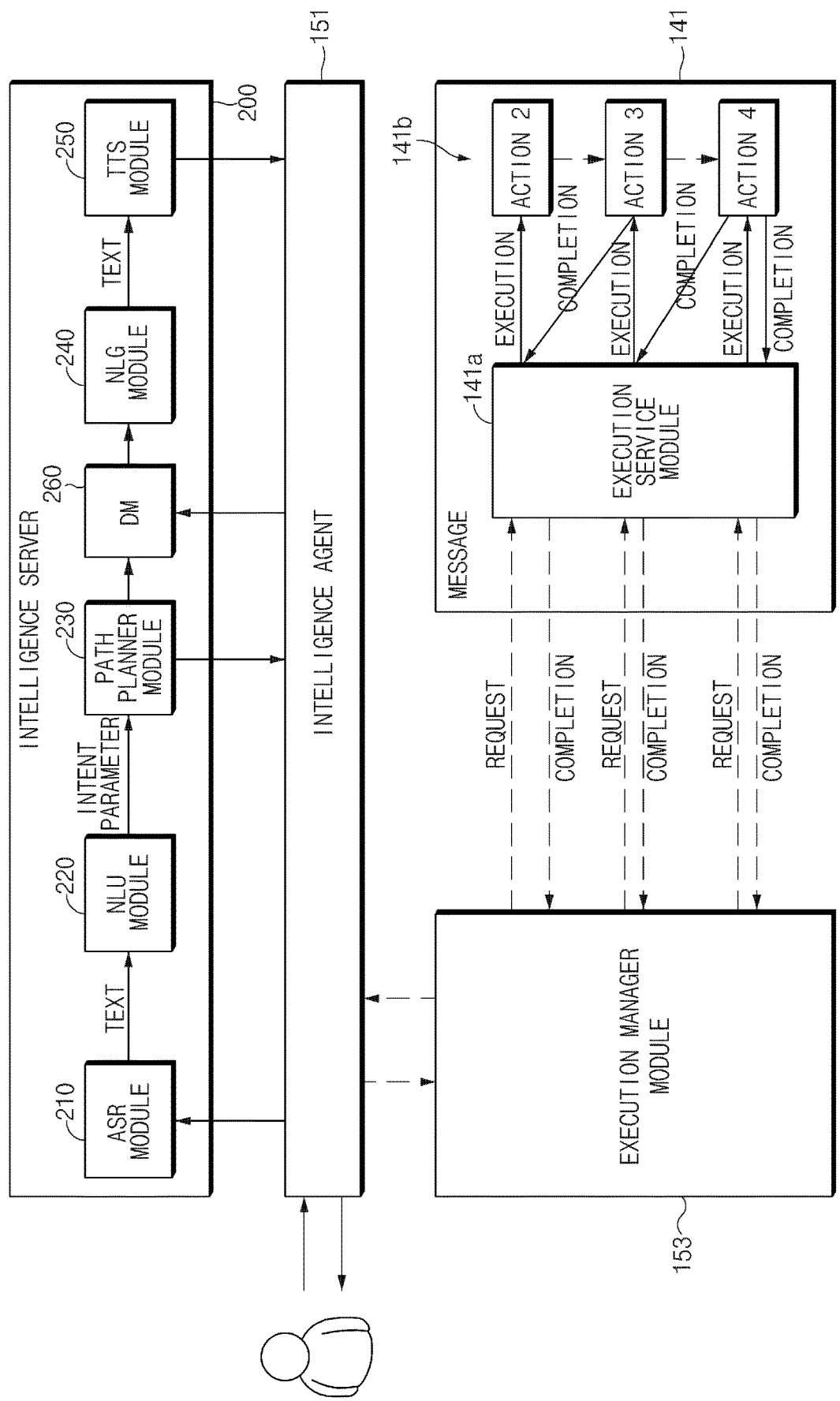

FIGS. 24A, 24B, and 24C are views illustrating a case where a portion of information is insufficient in a process for executing one app of a user terminal, according to an embodiment of the present disclosure.

Referring to FIG. 24A, if a user enters a user input "send a message saying that I'm a little late" in the user terminal 100, the intelligence agent 151 may receive a path rule corresponding to the user input, a portion of information of which is insufficient, from the intelligence server 200. The intelligence agent 151 may transmit a path rule to the execution manager module 153. The execution manager module 153 may transmit a signal for requesting for the first action of the first app 141 to the execution service module 141*a* depending on the first action corresponding to the path rule. For example, the first action 141*b* may include the execution of at least one of the message app 141 or the input of message contents. If the execution service module 141*a* recognizes that the first action 141*b* is completed, the execution service module 141*a* may transmit information (e.g., recipient information) about an insufficient parameter to the execution manager module 153 to enter a recipient. The execution manager module 153 may transmit the information about the insufficient parameter (or an empty parameter) to the intelligence agent 151.

The intelligence server 200 may receive a signal for requesting the additional information through the DM module 260. The NLG module 240 may generate text data (e.g., "please enter the recipient of the message") for requesting the information (e.g., recipient information) about the insufficient parameter. According to an embodiment, the TTS module 250 may change the generated text data to a voice signal. The text data or/and the voice signal generated through the NLG module 240 and the TTS module 250 may be transmitted to the user terminal 100.

Referring to FIG. 24B, the user may supplement the information about the insufficient parameter by entering the voice input of the user "mom" or "to mom" in the user terminal 100. To request the user input, the user terminal 100 may output a voice signal or may display the text data in a screen. The intelligence agent 151 may transmit the additionally entered voice input of the user to the intelligence server 200. The ASR module 210 may change the user input to the text data, and the NLU module 220 and the path planner module 230 may at least one of generate, update, or complete a path rule based on the text data. The intelligence agent 151 may receive the path rule. The intelligence agent 151 may transmit the path rule to the execution manager module 153. The execution manager module 153 may transmit a signal for requesting second and third actions of the first app 141 to the execution service module 141a depending on the second and third actions corresponding to the path rule. For example, the user terminal 100 may receive the recipient from the user (screen 2330 and screen 2340 of FIG. 23) and may generate the path rule to transmit the message to the recipient. The remaining three actions (second to fourth actions) 141b corresponding to the path rule may be sequentially executed.

Referring to FIG. 24C, the user may enter the information about the insufficient parameter by selecting (e.g., selecting by a touch) "mom" from a recipient list. The intelligence agent 151 may transmit the additionally entered user input to the intelligence server 200, but the user input may be received by not the ASR module 210 but the NLU module 220. As such, the path planner module 230 may generate the path rule in the same way as the recipient is entered by the voice. As such, the user terminal 100 may sequentially execute the remaining three actions (the second to fourth actions) 141b corresponding to the path rule in the same way as the recipient is entered through an utterance.

Figure 25:
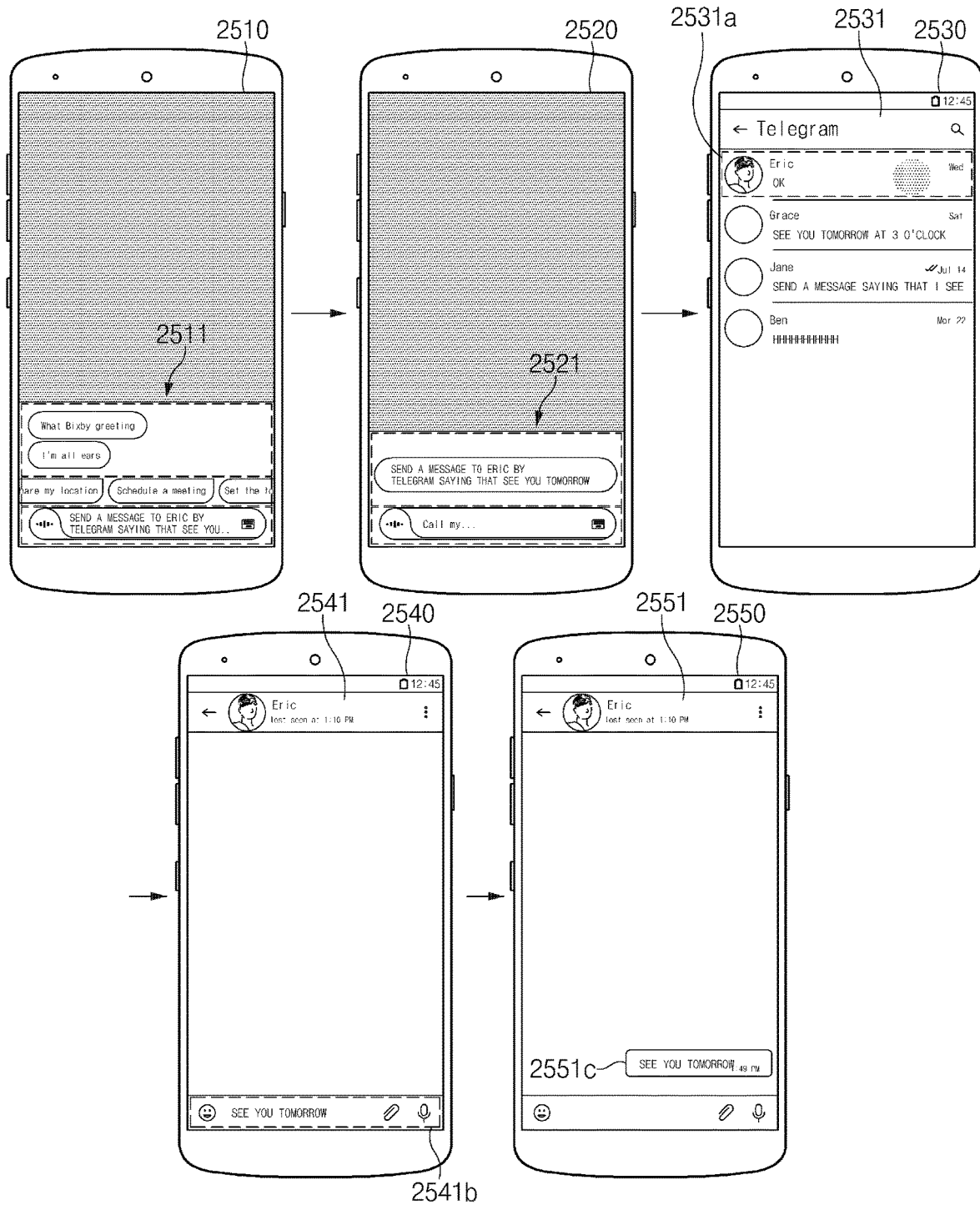
FIG. 25 is a view illustrating a case where an app, which is not stored in a rule database, is executed by a user terminal, according to an embodiment of the present disclosure.

FIG. 25 is a view illustrating a case where an app, which is not stored in a rule database, is executed by a user terminal, according to an embodiment of the present disclosure.

According to an embodiment, the intelligence agent 151 may execute an app (e.g., an unauthenticated app) that is not stored in the rule database in the user terminal 100. The app that is not authenticated in the user terminal 100 may not be controlled depending on a path rule. In other words, the unauthenticated app in the present disclosure may correspond to an app that does not support a voice input function according to various embodiments of the present disclosure. For example, the app that is not stored in the rule database may be an app (e.g., the 3rd party app), in which the user terminal 100 does not know the action corresponding to a user input entered by the user terminal 100.

For example, the user may enter "send a message to Eric by Telegram saying that see you tomorrow." For example, the Telegram may be an app that is not authenticated by the user terminal 100. According to various embodiments, for example, the authenticated app may be an app that the user arbitrarily downloads. As such, the user terminal 100 may control the execution of the unauthenticated app based on the name of the installed application, but an internal action performing the function of a corresponding app may not be controlled.

According to an embodiment, in screen 2510 and screen 2520, the user terminal 100 may receive the user input "send a message to Eric by Telegram saying that see you tomorrow" shown in a dialogue box area 2511 and a dialogue box area 2521.

According to an embodiment, the user terminal 100 may receive a path rule, which performs an app until the execution of the Telegram, through the intelligence server 200. After executing the Telegram depending on the path rule, the user terminal 100 may display a GUI 2531 of the Telegram on the display 120.

According to an embodiment, in screen 2530, screen 2540, and screen 2550, the user may directly select a dialogue box with Eric 2531a, may directly enter a message in a message input area 2541b in a dialogue box area 2541, and may directly transmit a message to display the transmitted message 2551c in a dialogue box area 2551.

Figure 26:
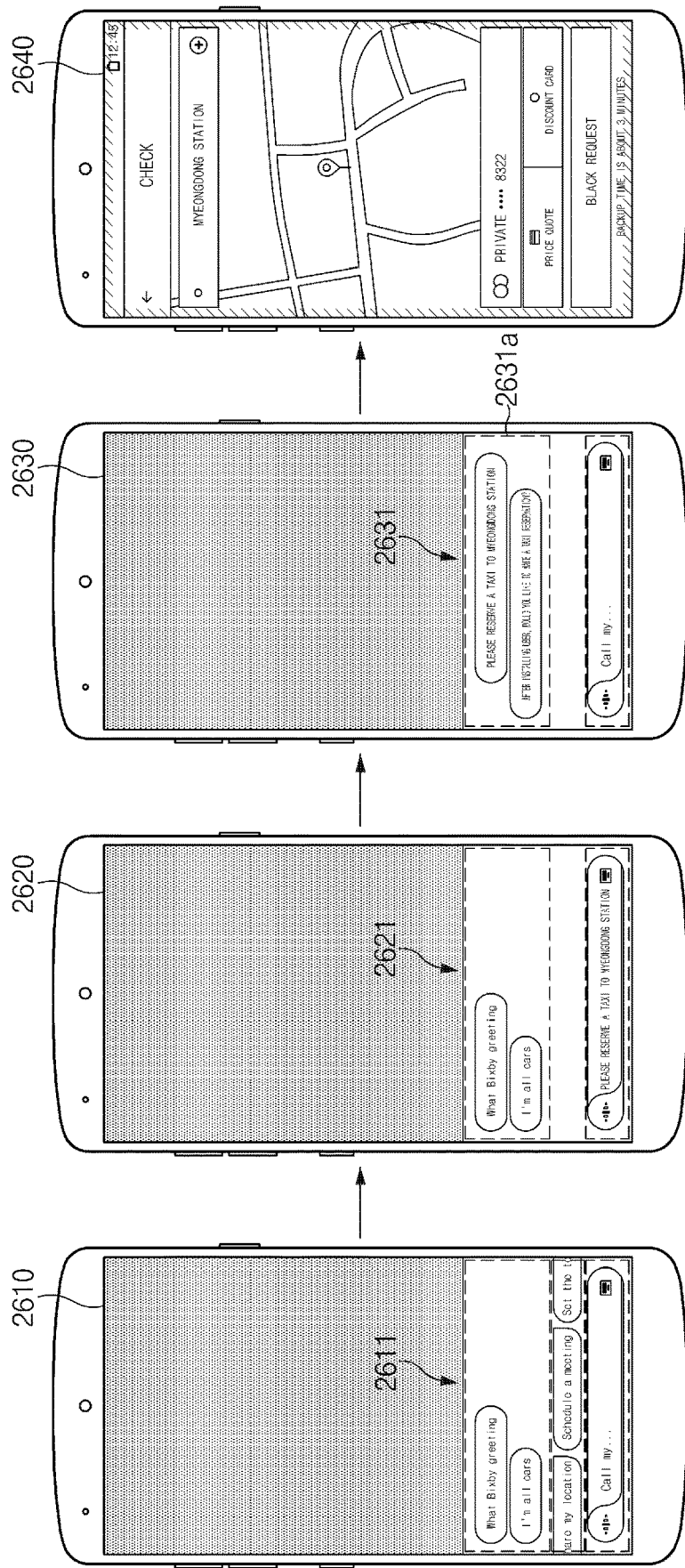
FIG. 26 is a view illustrating a case where an app is not installed in a user terminal, according to an embodiment of the present disclosure.

FIG. 26 is a view illustrating a case where an app is not installed in a user terminal, according to an embodiment of the present disclosure.

Referring to FIG. 26, a user may enter "please reserve a taxi to Myeongdong station." For example, an app capable of reserving a taxi may not be installed in the user terminal 100. The user terminal 100 may make a request for an additional input associated with an insufficient parameter to the user and may install an app for performing an additional action depending on a user input to perform a task.

According to an embodiment, in screen 2610 and screen 2620, the user terminal 100 may receive the user input of "please reserve a taxi to Myeongdong station" as shown in in a dialogue box area 2611 and a dialogue box area 2621.

According to an embodiment, in screen 2630, the user terminal 100 may display guidance information of "After installing Uber, would you like to make a taxi reservation?" in a dialogue area 2631a of in a dialogue box area 2631. As such, the user may cause the installation of an app, and the user terminal 100 may download the app and may launch the installed app. According to an embodiment, in screen 2640, the user terminal 100 may execute the remaining actions through the installed app.

Figure 27:
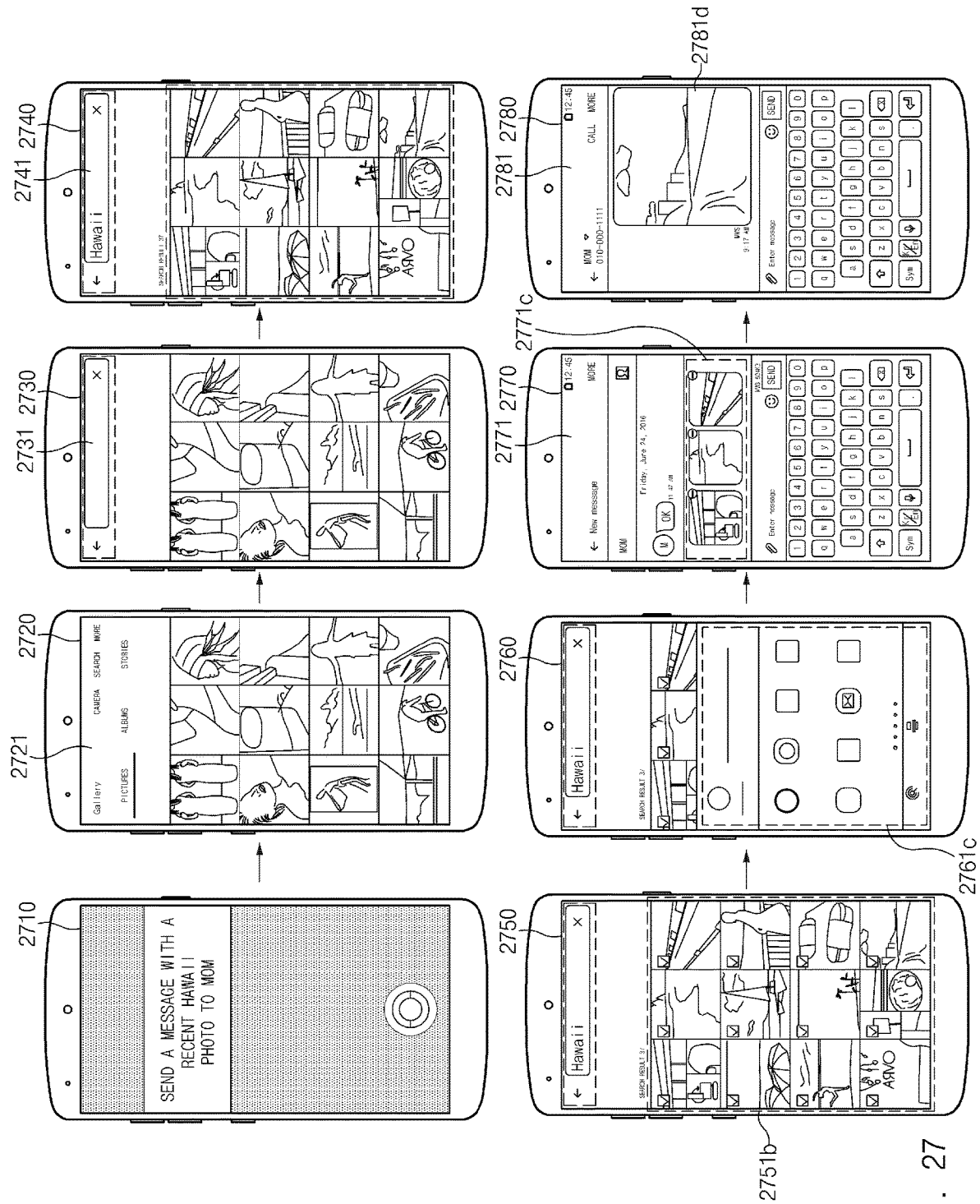
FIG. 27 is a view illustrating a case where a plurality of apps are executed by a user terminal, according to an embodiment of the present disclosure.

FIG. 27 is a view illustrating a case where a plurality of apps are executed by a user terminal, according to an embodiment of the present disclosure.

Referring to FIG. 27, a user may enter "send a message with a recent Hawaii photo to mom." The user input may be processed through the intelligence server 200. A path rule including information about states corresponding to an action of executing a gallery app, an action of executing a search function, an action of searching for a Hawaii photo, an action of selecting a found photo, an action of displaying a share screen, an action of executing a dialogue box with mom, and an action of transmitting the photo and information about a parameter utilized to execute the action may be generated. As such, the user terminal 100 may execute an action depending on the path rule.

According to an embodiment, in screen 2710, the user terminal 100 may receive the user's utterance of "send a message with a recent Hawaii photo to mom."

According to an embodiment, in screen 2720, the user terminal 100 may launch a gallery app and may display a GUI 2721 of the gallery app on the display 120.

According to an embodiment, in screen 2730, the user terminal 100 may display screen 2731, in which the search function of the gallery app is performed, on the display 120.

According to an embodiment, in screen 2740, the user terminal 100 may display screen 2741, in which Hawaii is found in a gallery app, on the display 120. According to an embodiment, in screen 2750, the user terminal 100 may select the found photo 2751b.

According to an embodiment, in screen 2760, the user terminal 100 may display share screen 2761*c* on the display 120. For example, the user terminal 100 may display an app capable of sharing the selected photo in the share screen 2761*c*.

According to an embodiment, in screen 2770, the user terminal 100 may launch the message app selected by the user and may enter the selected photo in an input box 2771*c*. For example, the user terminal 100 may execute a dialogue box with mom 2771 in the message app and may enter the selected Hawaii photo in the message input box 2771*c*.

According to an embodiment, in screen 2780, the user terminal 100 may transmit the entered photo and may display the transmitted photo 2781*d* in a dialogue box with mom 2781.

As such, the user terminal 100 may recognize a user voice as a text, may automatically execute the action of an app depending on a path rule corresponding to the user input, and may transmit the selected photo.

Figure 28:
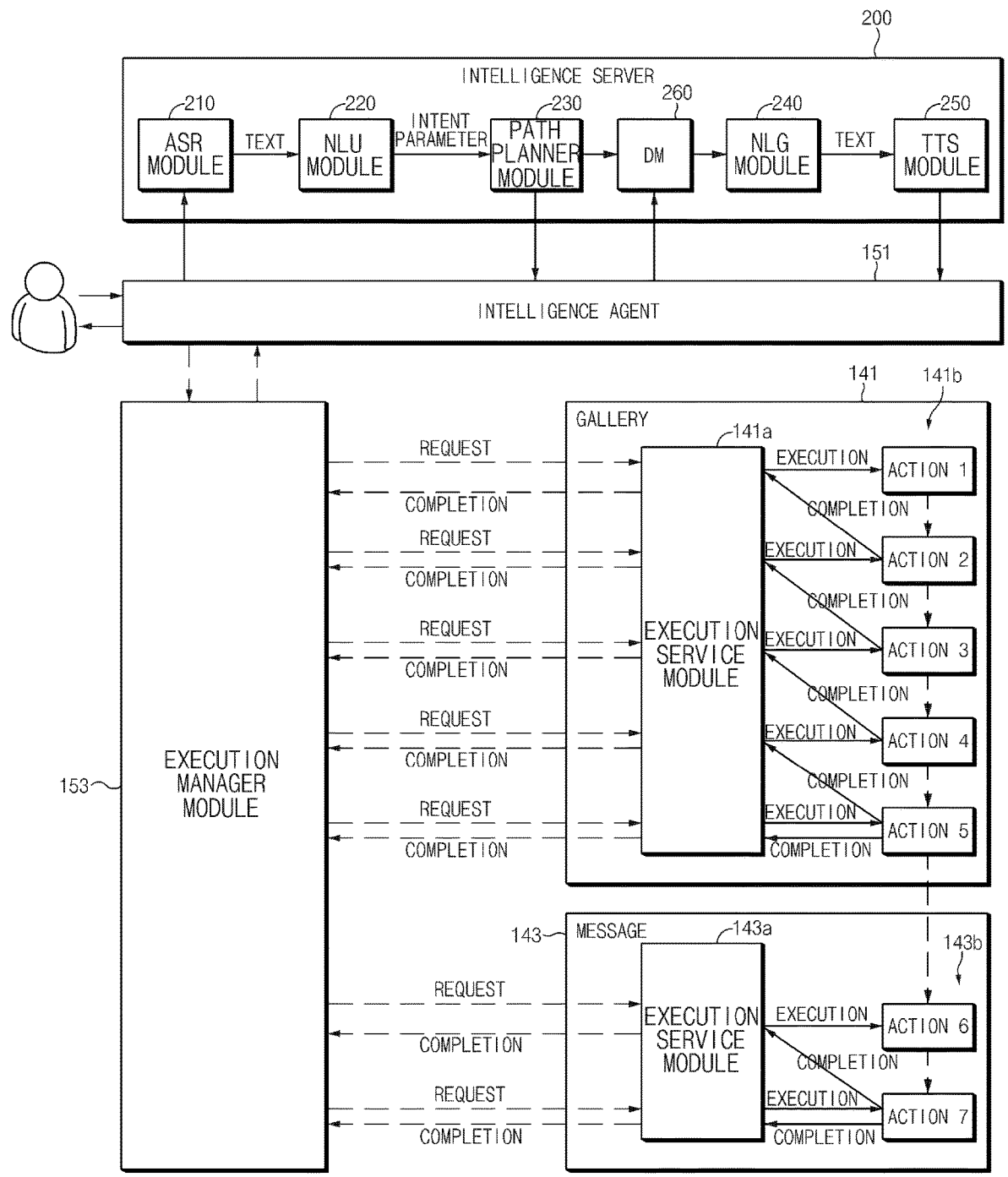
FIG. 28 is a view illustrating a case where a plurality of apps are executed by a user terminal, according to an embodiment of the present disclosure.

FIG. 28 is a view illustrating a case where a plurality of apps are executed by a user terminal, according to an embodiment of the present disclosure.

Referring to FIG. 28, if a user enters a user input "send a message with a recent Hawaii photo to mom" in the user terminal 100, the intelligence agent 151 may receive a path rule for executing two apps. The execution manager module 153 may receive the path rule. The intelligence agent 151 may execute the execution service module 141*a* of the first app 141 and the execution service module 143*a* of the second app 143 through the execution manager module 153 depending on seven actions (first to seventh actions) corresponding to the path rule and may sequentially transmit a signal for requesting for an action to the execution service module 141*a* of the first app 141 and the execution service module 143*b* of the second app 143. For example, if the execution of the last action (the fifth action) of the gallery app 141 is completed, the execution manager module 153 may transmit information (e.g., the selected Hawaii photo), which is utilized for the first action (the sixth action) of the message app 143, from the gallery app to the message app 143. The message app 143 may receive the information and may execute the first action. As such, the execution manager module 153 may cause the seven actions (the first to seventh actions) corresponding to the path rule to be executed in a plurality of apps.

Figure 29:
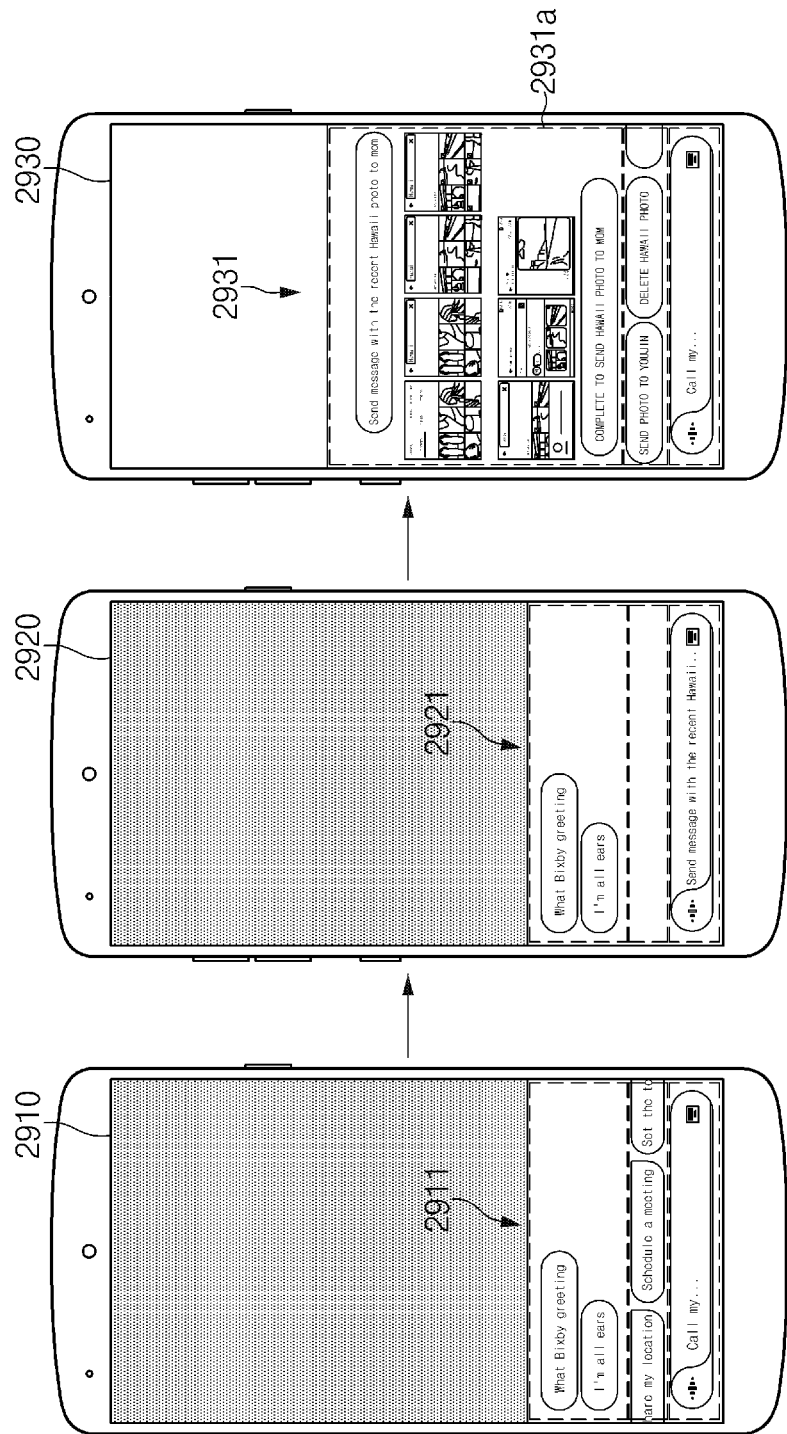
FIG. 29 is a view illustrating a case where an execution screen of another app is displayed by an integrated intelligent system service of a user terminal, according to an embodiment of the present disclosure.

FIG. 29 is a view illustrating a case where an execution screen of another app is displayed by an integrated intelligent system service of a user terminal, according to an embodiment of the present disclosure.

Referring to FIG. 29, the user terminal 100 may display the operating process of an app according to a path rule through an app operating in conjunction with the intelligence agent 151.

According to an embodiment, in screen 2910 and screen 2920, the user terminal 100 may receive user's utterance as shown in a dialogue box area 2911 and a dialogue box area 2921.

According to an embodiment, in screen 2930, the user terminal 100 may display the operating process of an app according to the path rule in a dialogue box area 2931*a* of a UI 2931 of the app operating in conjunction with the intelligence agent 151 in the form of an image. If the process ends, the user terminal 100 may display an end message in the dialogue box area 2931*a*.

Figure 30:
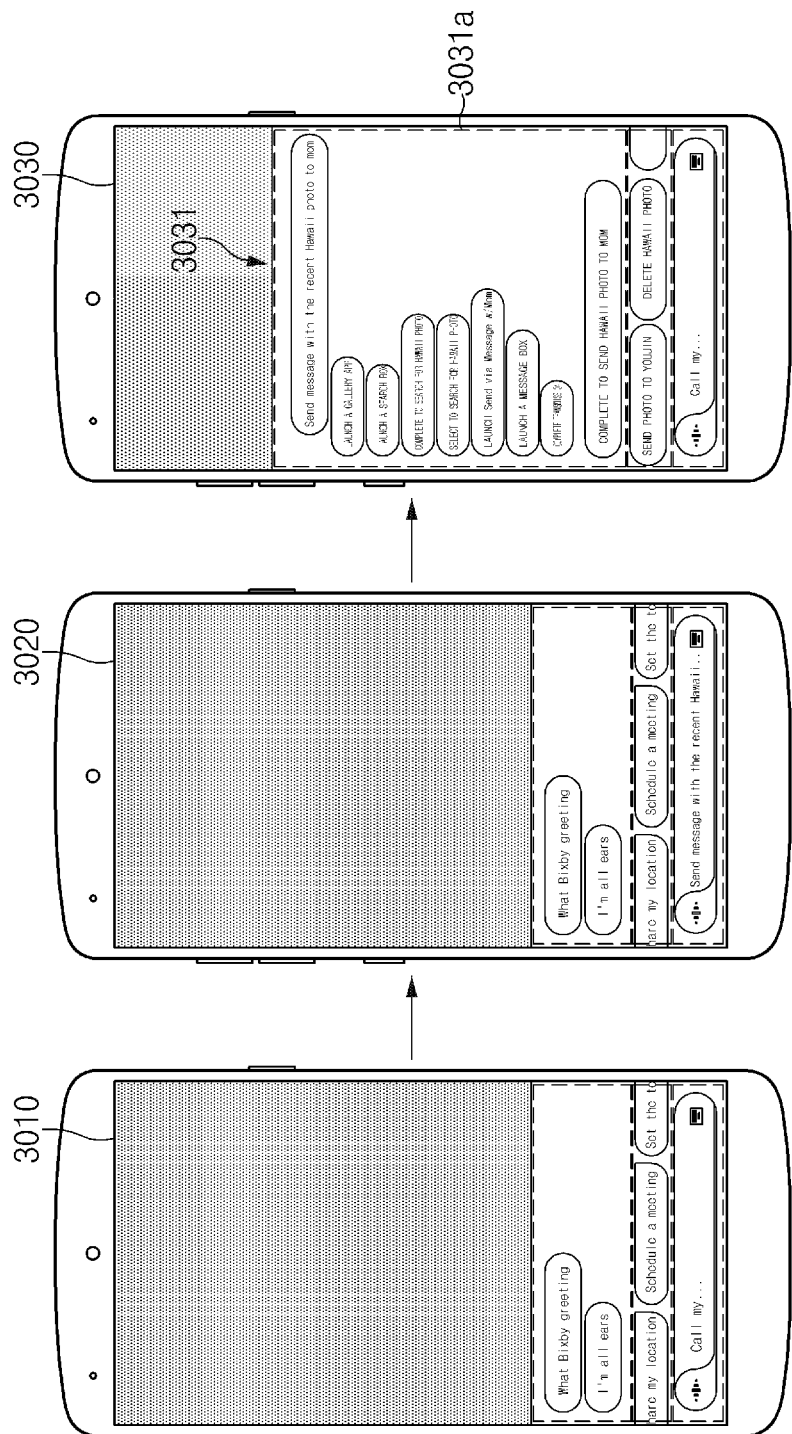
FIG. 30 is a view illustrating a case where an execution process of another app is displayed in the form of a text by an integrated intelligent system service of a user terminal, according to an embodiment of the present disclosure.

FIG. 30 is a view illustrating a case where an execution process of another app is displayed in the form of a text by an integrated intelligent system service of a user terminal, according to an embodiment of the present disclosure.

Referring to FIG. 30, the user terminal 100 may display the operating process of an app according to a path rule through an app operating in conjunction with the intelligence agent 151.

According to an embodiment, in screen 3010 and screen 3020, the user terminal 100 may receive user's utterance.

According to an embodiment, in screen 3030, the user terminal 100 may display the action of an app according to the path rule in a dialogue box area 3031*a* of a UI 3031 of the app operating in conjunction with the intelligence agent 151 in the form of a text. If the process ends, the user terminal 100 may display an end message in the dialogue box area 3031*a*.

Figure 31A:
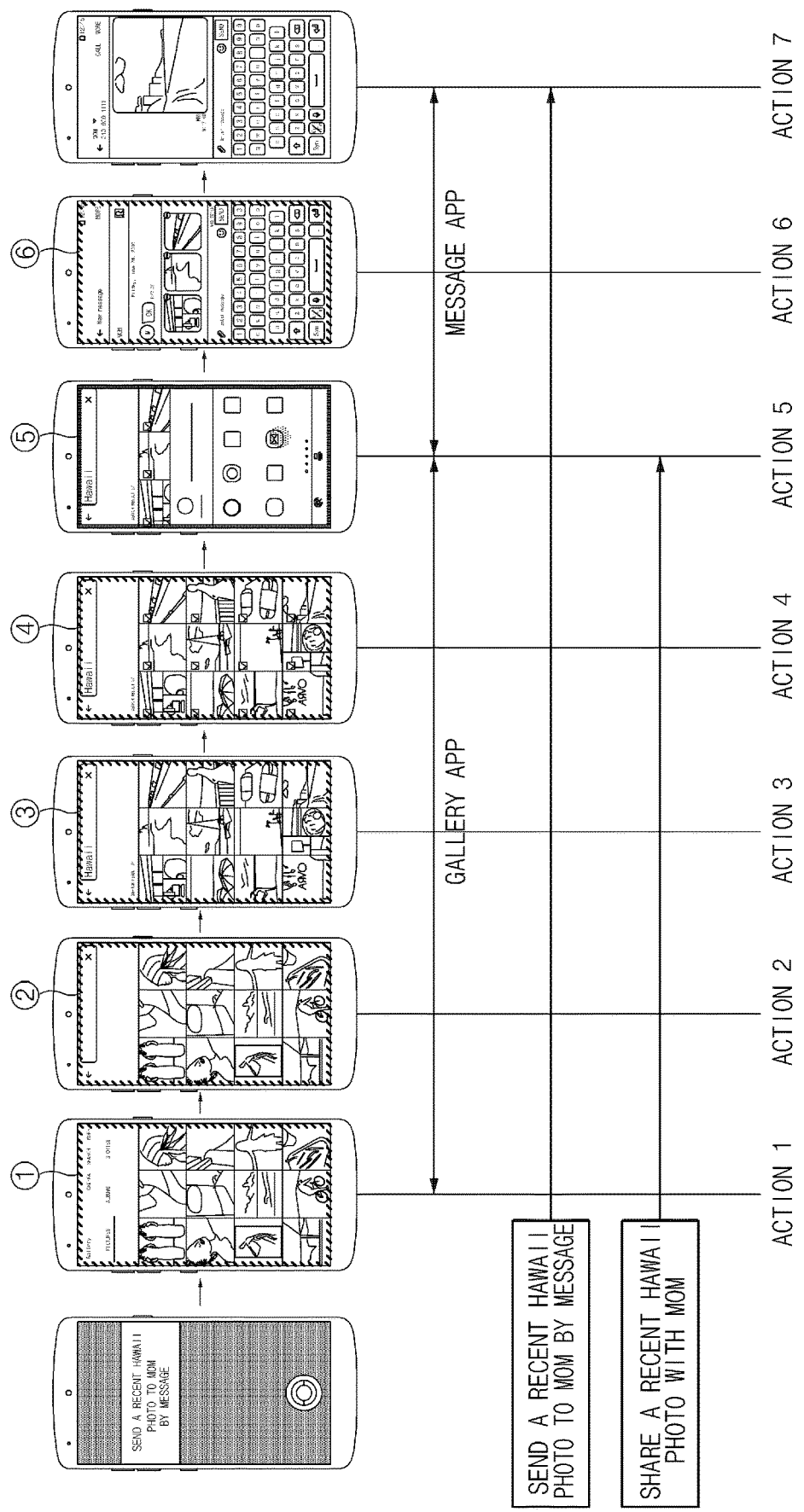
FIGS. 31A and 31B are views illustrating a case where various user inputs are entered in a process for executing a plurality of apps of a user terminal, according to an embodiment of the present disclosure.
Figure 31B:
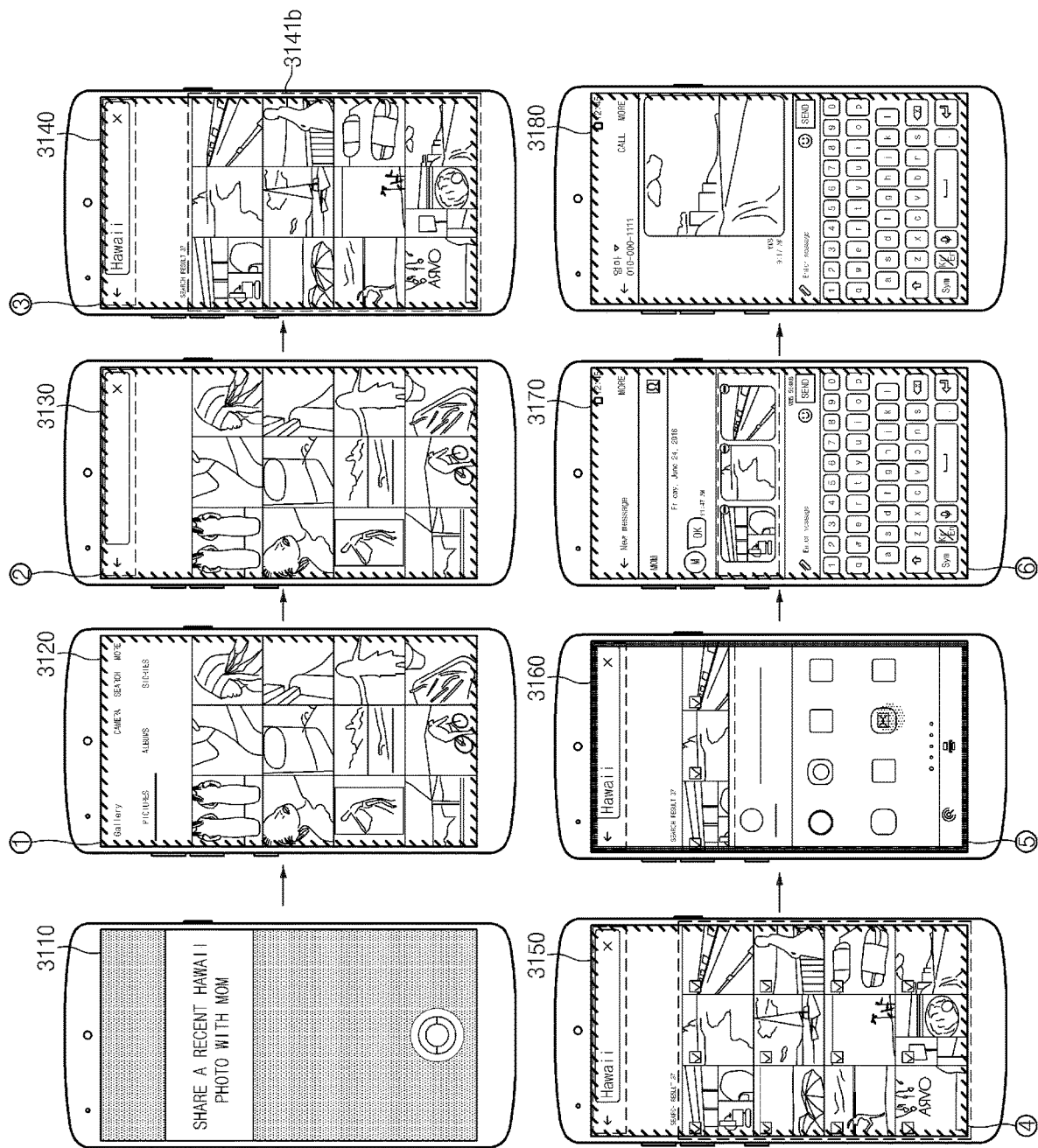

FIGS. 31A and 31B are views illustrating a case where various user inputs are entered in a process for executing a plurality of apps of a user terminal, according to an embodiment of the present disclosure.

Referring to FIG. 31A, a user may enter "share a recent Hawaii photo with mom." Information about whether to share the photo by any app may be insufficient in the user input. The user terminal 100 may make a request for an additional input to the user, with regard to whether to share the message with the user by any app. For example, the user terminal 100 may execute a first action of executing a gallery app, a second action of executing a search function the gallery app, a third action of searching for a photo from the gallery app, a fourth action of selecting a photo to be shared, and a fifth action, in which a share screen is displayed, depending on a path rule corresponding to the user input, in which a parameter is insufficient, and then may make a request for the additional input to the user.

According to an embodiment, the user may enter the additional input for the user terminal 100 to complete an action. For example, the user may enter an input (e.g., a touch or an utterance) for sharing a photo by using a message app. According to an embodiment, the user terminal 100 may execute the remaining actions depending on the additional input of the user. For example, if receiving the additional input for selecting an app to be shared from the user, the user terminal 100 may execute a dialogue box of a message app to execute a sixth action of entering the selected photo in a dialogue box and a seventh action of transmitting the entered photo.

Referring to FIG. 31B, a user may enter "share a recent Hawaii photo with mom." The user terminal 100 may execute the gallery app by using the path rule corresponding to the user input, in which a parameter is insufficient, and may execute the first action to the fifth action sequentially, in which the share screen is displayed, and may receive the additional input from the user to complete the execution of the action. For example, screens in which edge ①, edge ②, edge ③, edge ④, and edge ⑥ are displayed in FIG. 31B may indicate that the action of an app is automatically executed by an integrated intelligent system. In addition, a screen in which edge ⑤ is displayed may be in a state for receiving the additional input of the user.

According to an embodiment, in screen 3110, the user terminal 100 may receive the user's utterance from a UI for receiving a voice.

According to an embodiment, in screen 3120, screen 3130, screen 3140, and screen 3150 (screens in which edge ①, edge ②, edge ③, and edge ④ are displayed), the user terminal 100 may automatically execute the first to fourth actions by using an integrated intelligent system service.

According to an embodiment, in screen 3160 (a screen in which edge ⑤ is displayed), the user terminal 100 may execute the fifth action of displaying a screen for selecting the app to be shared on the display 120, and may maintain a state for receiving the user input.

According to an embodiment, in screen 3170 (a screen in which edge ⑥ is displayed), if receiving the additional input for selecting the app to be shared from the user, the user terminal 100 may automatically execute the sixth action.

According to an embodiment, in screen 3180, the user terminal 100 may automatically execute the seventh action of transmitting the photo.

Figure 32A:
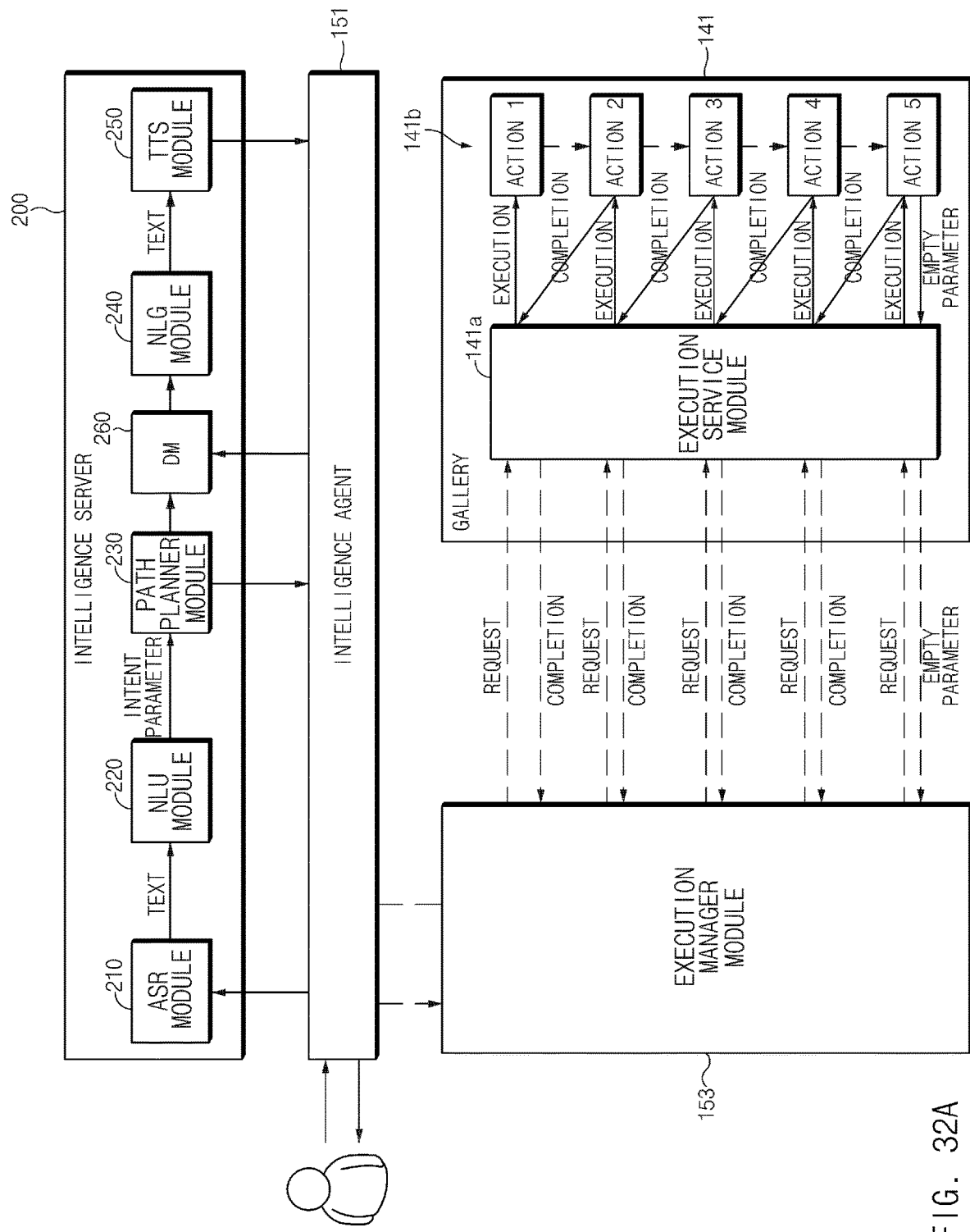
FIGS. 32A and 32B are views illustrating a case where insufficient information is entered in a process for executing a plurality of apps of a user terminal, according to an embodiment of the present disclosure.
Figure 32B:
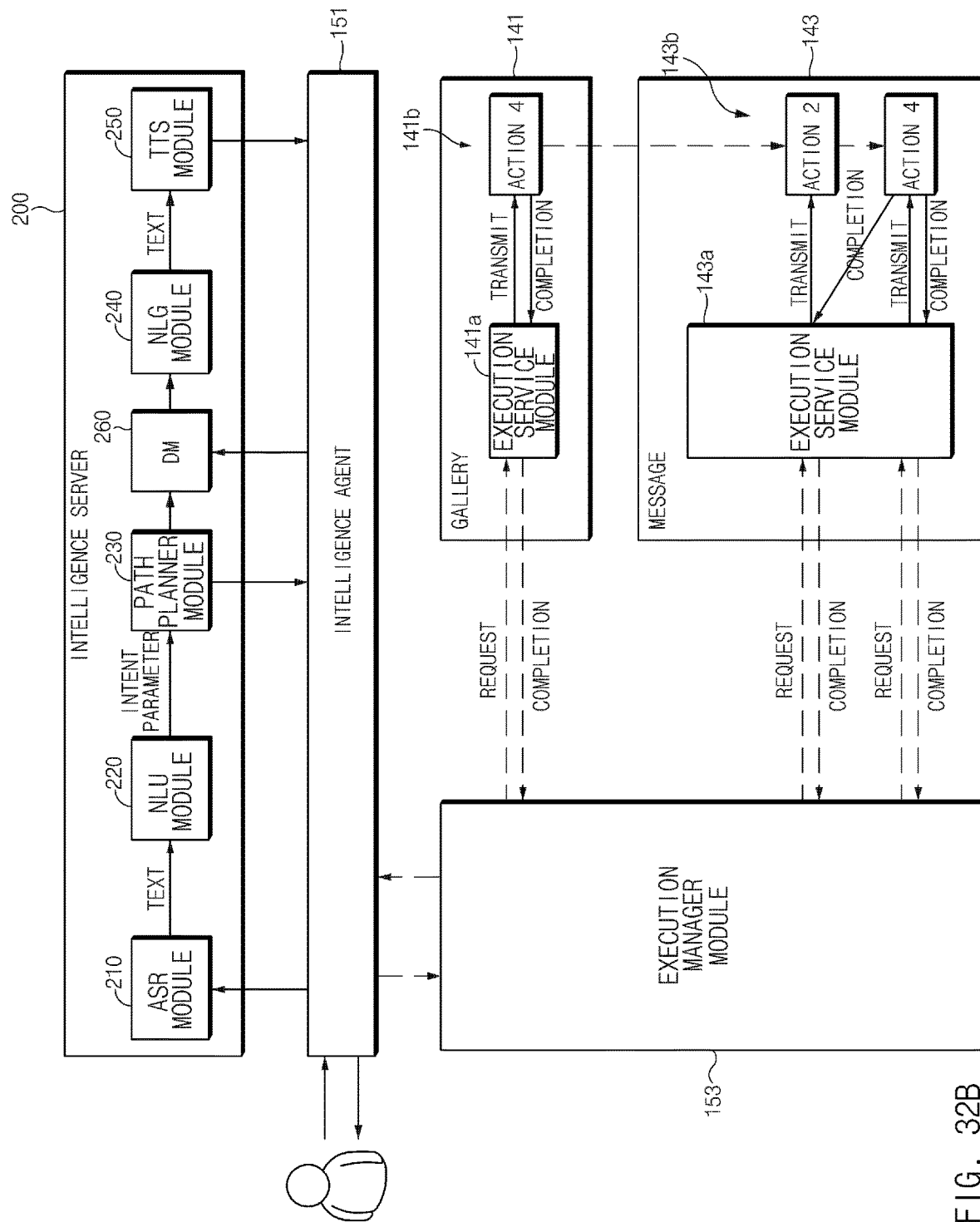

FIGS. 32A and 32B are views illustrating a case where insufficient information is entered in a process for executing a plurality of apps of a user terminal, according to an embodiment of the present disclosure.

Referring to FIG. 32A, if a user enters a user input "share a recent Hawaii photo with mom" in the user terminal 100, the intelligence agent 151 may receive a path rule corresponding to the user input, a portion of information of which is insufficient, from the intelligence server 200. The intelligence agent 151 may transmit a path rule to the execution manager module 153. The execution manager module 153 may sequentially execute first to fifth actions of the first app 141 depending on the path rule. For example, the first to fifth actions may be an action of executing a gallery app, an action of searching for a Hawaii photo, an action of displaying a search screen, an action of selecting the found photo, and an action of displaying a share screen, respectively. If the fifth action is completed, the execution service module 141a may transmit information about an insufficient parameter (or an empty parameter) to the execution manager module 153. The execution manager module 153 may make a request for an additional input to a user by using the information about the insufficient parameter.

Referring to FIG. 32B, the user may enter the information about the insufficient parameter by entering the user input "by a message" in the user terminal 100. The intelligence agent 151 may transmit the additionally entered user input to the intelligence server 200. The intelligence server 200 may generate the path rule by using the user input. The intelligence agent 151 may receive the path rule and may transmit the path rule to the execution manager module 153. The execution manager module 153 may sequentially transmit a signal for requesting the sixth and seventh actions of the second app 143 corresponding to the path rule. As such, the user terminal 100 may sequentially execute the remaining two actions (the sixth and seventh actions) corresponding to the path rule.

The user terminal 100 according to various embodiments of the present disclosure may recognize the user voice, may grasp an action for accomplishing the intent and purpose of the user, and may execute the app stepwise, thereby providing a user with the same UI as an UI operating by a touch.

In addition, the app may be operated stepwise by using only the processed user input in the case where the user input includes insufficient information, and the additional input may be received from the user such that the remaining actions are executed, thereby providing an effective service suitable for the user intent.

Figure 33:
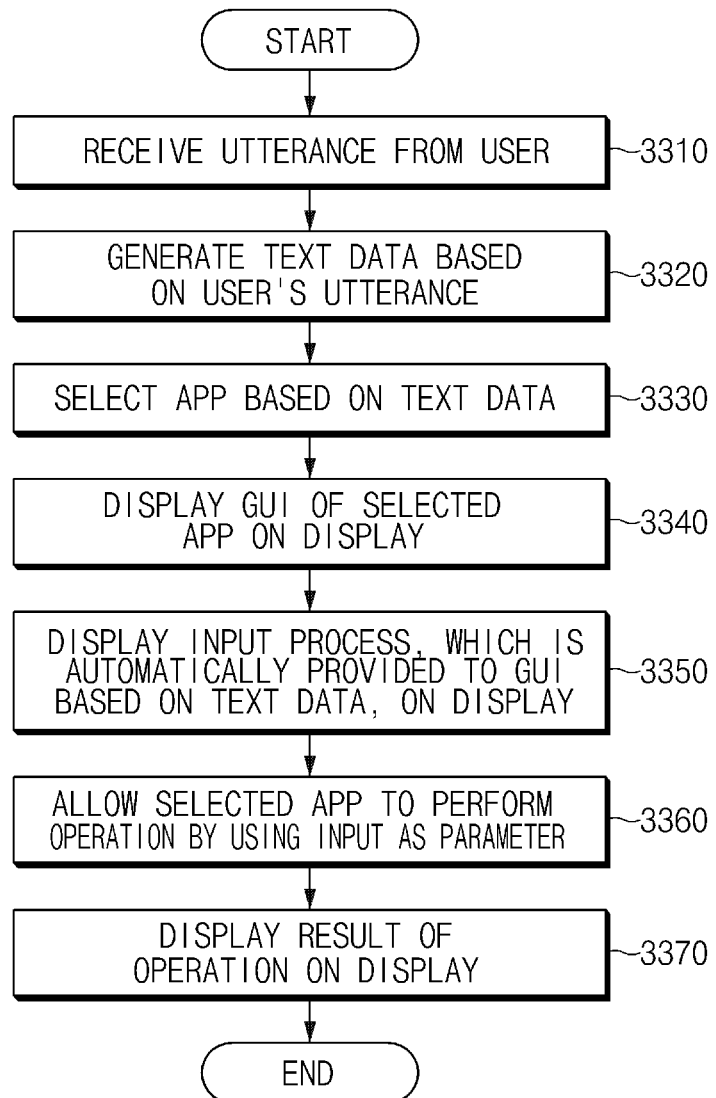
FIG. 33 is a flowchart illustrating a voice input processing method of a user terminal, according to an embodiment of the present disclosure.

FIG. 33 is a flowchart illustrating a voice input processing method of a user terminal, according to an embodiment of the present disclosure.

The flowchart illustrated in FIG. 33 may include operations that the above-described user terminal 100 processes. Therefore, details about the user terminal 100 given with reference to FIGS. 1 to 32B may be applied to the flowchart illustrated in FIG. 33 even though there are omitted contents below.

According to an embodiment, in operation 3310, the user terminal 100 may receive an utterance from a user through the microphone 111.

According to an embodiment, in operation 3320, the user terminal 100 may generate or receive text data based on the user's utterance. The user terminal 100 may change the user input to a text form through the intelligence server 200 and may grasp intent and a parameter based on the user input of the text form to generate a path rule. The user terminal 100 may receive text data and the path rule and may display the text data on the display 120.

According to an embodiment, in operation 3330, the user terminal 100 may select one app (or an application program) based at least partly on the text data. The user terminal 100 may select an app depending on the path rule generated based on the text data corresponding to the user's utterance.

According to an embodiment, in operation 3340, the user terminal 100 may present the GUI of the selected the apps 141 and 143 on the display 120.

According to an embodiment, in operation 3350, the user terminal 100 may display at least part of an input process, which is automatically provided to the GUI based on the text data, on the display 120. The user terminal 100 may display the execution process of the actions 141b and 143b of the apps 141 and 143 according to the path rule on the display 120.

According to an embodiment, in operation 3360, the user terminal 100 may require the user to enter at least one parameter such that the selected app performs an operation by using the user input as one parameter. The user terminal 100 may execute the actions 141b and 143b of the apps 141 and 143 by using the actions 141b and 143b of the apps 141 and 143 included in the path rule and a parameter utilized for the actions 141b and 143b.

According to an embodiment, in operation 3370, the user terminal 100 may display the result of the operation on the display 120. The user terminal 100 may display the result of the action 141b of the app 141 on the display 120. According to an embodiment, the user terminal 100 may sequentially display the result of the plurality of the actions 141b and 143b of the plurality of apps 141 and 143 on the display 120.

According to various embodiments, an electronic device may include a housing, a touchscreen display exposed through a first portion of the housing, a microphone disposed at a second portion of the housing, a speaker disposed at a third portion of the housing, a processor disposed inside the housing, and electrically connected to the display, the microphone, and the speaker, and a memory disposed inside the housing, and electrically connected to the processor. The memory may be configured to store a plurality of application programs, each of which includes a GUI. The memory may further store instructions that, when executed, cause the processor to cause the microphone to receive an utterance from a user, to generate or receive text data based on the utterance, to select one of the applications programs, based at least partly on the text data, to launch the selected application program, to present the GUI of the selected application program on the display, to display at least part of a sequence of automatically providing an input into the GUI on the display, based at least partly on the text data, to cause the selected application program to perform an operation that utilizes at least one parameter, using the input as the at least one parameter, and to display a result of the operation on the display.

According to various embodiments, the instructions may cause the processor to download at least one of the plurality of application programs from a server.

According to various embodiments, the instructions may be part of a software framework that provides an application programming interface to the plurality of application programs.

According to various embodiments, the instructions may further cause the processor to display, on the display, one or more identifiers, each of which represents a respective one of the plurality of application programs, based at least partly on the text data, to receive a selection of one of the identifiers from the user via the display or the microphone, and to select the one of the application programs, based on the received selection.

According to various embodiments, the identifiers may be in the form of at least one of an icon, a symbol, an image, or text.

According to various embodiments, when the text data lacks a parameter for the selected application program to perform the operation, the instructions may further cause the processor to place a cursor in an input area of the GUI for receiving the parameter, to receive text input for the parameter via the display, and to cause the application program to perform the operation, using the text input.

According to various embodiments, the instructions may further cause the processor to generate or receive intent of the utterance and the parameter for performing the intent based on the text data, to generate or receive a path rule including a sequence of the operation of the selected application program based on the intent and the parameter, if the one application program is selected, to select the one application program depending on the path rule, if the selected application program performs the operation, to perform the operation included in the path rule depending on the sequence of the path rule, and if the result of the operation is displayed on the display, to display the result of the operation included in the path rule on the display depending on the performed sequence.

According to various embodiments, the one path rule may include the operation of the selected application program and the parameter utilized to perform the operation.

According to various embodiments, an electronic device may include a housing, a touchscreen display exposed through a first portion of the housing, a microphone disposed at a second portion of the housing, a speaker disposed at a third portion of the housing, a processor disposed inside the housing, and electrically connected to the display, the microphone, and the speaker, and a memory disposed inside the housing, and electrically connected to the processor. The memory may be configured to store a first plurality of application programs and a second plurality of application programs, each of the first and second plurality of application programs including a GUI. The memory may further store instructions that, when executed, cause the processor to cause the microphone to receive an utterance from a user, to generate or receive text data based on the utterance, to select a first application program from the first plurality of application programs, based at least partly on the text data, to launch the selected first application program, to present the GUI of the selected first application program on the display, to cause the selected first application program to perform a first operation that utilizes at least one first parameter, based at least partly on the text data, while displaying at least part of a sequence of performing the first operation on the display, to display a result of the first operation on the display, after displaying the result, to display one or more identifiers on the display, based at least partly on the text data, each of the identifiers represents a respective one of the second plurality of application programs, to receive a selection of one of the identifiers from the user via the display or the microphone, to select a second application program from the second plurality of application programs, based on the received selection, and to cause the selected second application program to perform a second operation that utilizes at least one second parameter, using at least part of the result of the first operation.

According to various embodiments, the instructions may cause the processor to download at least one of the first or second plurality of application programs from a server.

According to various embodiments, the instructions may be part of a first part software framework that provides an application programming interface to the first and second pluralities of application programs.

According to various embodiments, the instructions may further cause the processor, after selecting the second application program, to present the GUI of the selected second application program on the display, to cause the selected second application program to perform the second operation, while displaying at least part of a sequence of performing the second operation on the display, and to display a result of the second operation on the display.

According to various embodiments, the identifiers may be in the form of at least one of an icon, a symbol, an image, or text.

According to various embodiments, when the text data lacks a first parameter for the first application program to perform the first operation, the instructions may further cause the processor to display an input area of the GUI of the first application program on the display for receiving the first parameter, to receive a first input for the first parameter via the display or the microphone, and to cause the first application program to perform the operation, using the first input.

According to various embodiments, when the text lacks a second parameter for the second application program to perform the second operation, the instructions may further cause the processor to display an input area of the GUI of the second application program on the display for receiving the second parameter, to receive a second input for the second parameter via the display or the microphone, and to cause the second application program to perform the operation, using the second input.

According to various embodiments, an electronic device may include a housing, a touchscreen display exposed through a first portion of the housing, a microphone disposed at a second portion of the housing, a speaker disposed at a third portion of the housing, a processor disposed inside the housing, and electrically connected to the display, the microphone, and the speaker, and a memory disposed inside the housing, and electrically connected to the processor. The memory may be configured to store a plurality of application programs, each of which includes a GUI. The memory may further store instructions that, when executed, cause the processor to cause the microphone to receive a verbal request from a user, to generate or receive text data based on the request, to select one of the applications programs, based at least partly on the text data, to determine a portion, but not the entirety, of an operation that can be performed automatically on the selected application program, using the text data, to launch the selected application program, to present the GUI of the selected application program on the display, to display at least part of a sequence of automatically performing the portion of the operation, based at least partly on the text data, without completing the operation, to receive a user input via the display or microphone, and to cause the application program to complete the operation, using the received user input.

According to various embodiments, the instructions may be part of a software framework that provides an application programming interface provided to the plurality of application programs. The instructions may further cause the processor to store user information in the memory and, when the text data lacks a parameter for the selected application program to perform the operation, to propose the parameter to be added to the operation based on the stored user information.

According to various embodiments, a voice input processing method may include receiving an utterance from a user via a microphone, generating or receiving text data based on the utterance, selecting one application program based at least partly on the text data, launching the selected application program, presenting a GUI of the selected application program on a display, displaying at least part of a sequence of automatically providing an input into the GUI on the display, based at least partly on the text data, causing the selected application program to perform an operation that utilizes at least one parameter, using the input as the at least one parameter, and displaying a result of the operation on the display.

According to various embodiments, a server that processes a voice input may be configured to receive an utterance of a user from an external electronic device, to generate text data based on the received utterance of the user, to generate intent of the utterance and a parameter for performing the intent based on the text data, to determine a path rule including a sequence of an operation of an application program of the external electronic device based on the intent and the parameter, and to transmit the path rule to the external electronic device. The path rule may include the operation of the application program of the external electronic device and the parameter for performing the operation.

FIG. 34 illustrates an electronic device in a network environment system, according to various embodiments of the present disclosure.

Referring to FIG. 34, according to various embodiments, an electronic device 3401, a first electronic device 3402, a second electronic device 3404, or a server 3406 may be connected each other over a network 3462 or a short range communication 3464. The electronic device 3401 may include a bus 3410, a processor 3420, a memory 3430, an input/output interface 3450, a display 3460, and a communication interface 3470. According to an embodiment, the electronic device 3401 may not include at least one of the above-described elements or may further include other element(s).

For example, the bus 3410 may interconnect the above-described elements 3420 to 3470 and may include a circuit for conveying communications (e.g., at least one of a control message or data) among the above-described elements.

The processor 3420 may include one or more of a CPU, an AP, or a communication processor (CP). For example, the processor 3420 may perform an arithmetic operation or data processing associated with at least one of control or communication of at least other elements of the electronic device 3401.

The memory 3430 may include at least one of a volatile or nonvolatile memory. For example, the memory 3430 may store instructions or data associated with at least one other element(s) of the electronic device 3401. According to an embodiment, the memory 3430 may store at least one of software or a program 3440. The program 3440 may include, for example, at least one of a kernel 3441, a middleware 3443, an application programming interface (API) 3445, or an application program (or "an application") 3447. At least part of the kernel 3441, the middleware 3443, or the API 3445 may be referred to as an "operating system (OS)."

For example, the kernel 3441 may control or manage system resources (e.g., the bus 3410, the processor 3420, the memory 3430, and the like) that are used to execute operations or functions of other programs (e.g., the middleware 3443, the API 3445, and the application program 3447). Furthermore, the kernel 3441 may provide an interface that allows the middleware 3443, the API 3445, or the application program 3447 to access discrete elements of the electronic device 3401 so as to control or manage system resources.

The middleware 3443 may perform, for example, a mediation role such that the API 3445 or the application program 3447 communicates with the kernel 3441 to exchange data.

Furthermore, the middleware 3443 may process task requests received from the application program 3447 according to a priority. For example, the middleware 3443 may assign the priority, which makes it possible to use a system resource (e.g., the bus 3410, the processor 3420, the memory 3430, or the like) of the electronic device 3401, to at least one of the application program 3447. For example, the middleware 3443 may process the one or more task requests according to the priority assigned to the at least one, which makes it possible to perform scheduling or load balancing on the one or more task requests.

The API 3445 may be, for example, an interface through which the application program 3447 controls a function provided by the kernel 3441 or the middleware 3443, and may include, for example, at least one interface or function (e.g., an instruction) for a file control, a window control, image processing, a character control, or the like.

The input/output interface 3450 may play a role, for example, of an interface which transmits an instruction or data input from a user or another external device, to other element(s) of the electronic device 3401. Furthermore, the input/output interface 3450 may output an instruction or data, received from other element(s) of the electronic device 3401, to a user or another external device.

The display 3460 may include, for example, a liquid crystal display (LCD), a light-emitting diode (LED) display, an organic LED (OLED) display, a microelectromechanical systems (MEMS) display, or an electronic paper display. The display 3460 may display, for example, various contents (e.g., a text, an image, a video, an icon, a symbol, and the like) to a user. The display 3460 may include a touch screen and may receive, for example, a touch, gesture, proximity, or hovering input using an electronic pen or a part of a user's body.

For example, the communication interface 3470 may establish communication between the electronic device 3401 and an external device (e.g., the first electronic device 3402, the second electronic device 3404, or the server 3406). For example, the communication interface 3470 may be connected to the network 3462 over wireless communication or wired communication to communicate with the external device (e.g., the second electronic device 3404 or the server 3406).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 3464. The short range communication 3464 may include at least one of Wi-Fi, Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 3401 may transfer the magnetic field signal to point of sale (POS), and the POS may detect the magnetic field signal using an MST reader. The POS may recover the data by converting the detected magnetic field signal to an electrical signal.

The GNSS may include at least one of, for example, a GPS, a global navigation satellite system (Glonass), a Beidou navigation satellite system (hereinafter referred to as "Beidou"), or a European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 3462 may include at least one of telecommunications networks, for example, a computer network (e.g., LAN or WAN), an Internet, or a telephone network.

Each of the first and second electronic devices 3402 and 3404 may be a device of which the type is different from or the same as that of the electronic device 3401. According to an embodiment, the server 3406 may include a group of one or more servers. According to various embodiments, all or a portion of operations that the electronic device 3401 will perform may be executed by another or plural electronic devices (e.g., the first electronic device 3402, the second electronic device 3404 or the server 3406). According to an embodiment, in the case where the electronic device 3401 executes any function or service automatically or in response to a request, the electronic device 3401 may not perform the function or the service internally, but, alternatively additionally, it may request at least a portion of a function associated with the electronic device 3401 from another device (e.g., the electronic device 3402 or 3404 or the server 3406). The other electronic device may execute the requested function or additional function and may transmit the execution result to the electronic device 3401. The electronic device 3401 may provide the requested function or service using the received result or may additionally process the received result to provide the requested function or service. To this end, for example, cloud computing, distributed computing, or client-server computing may be used.

Figure 35:
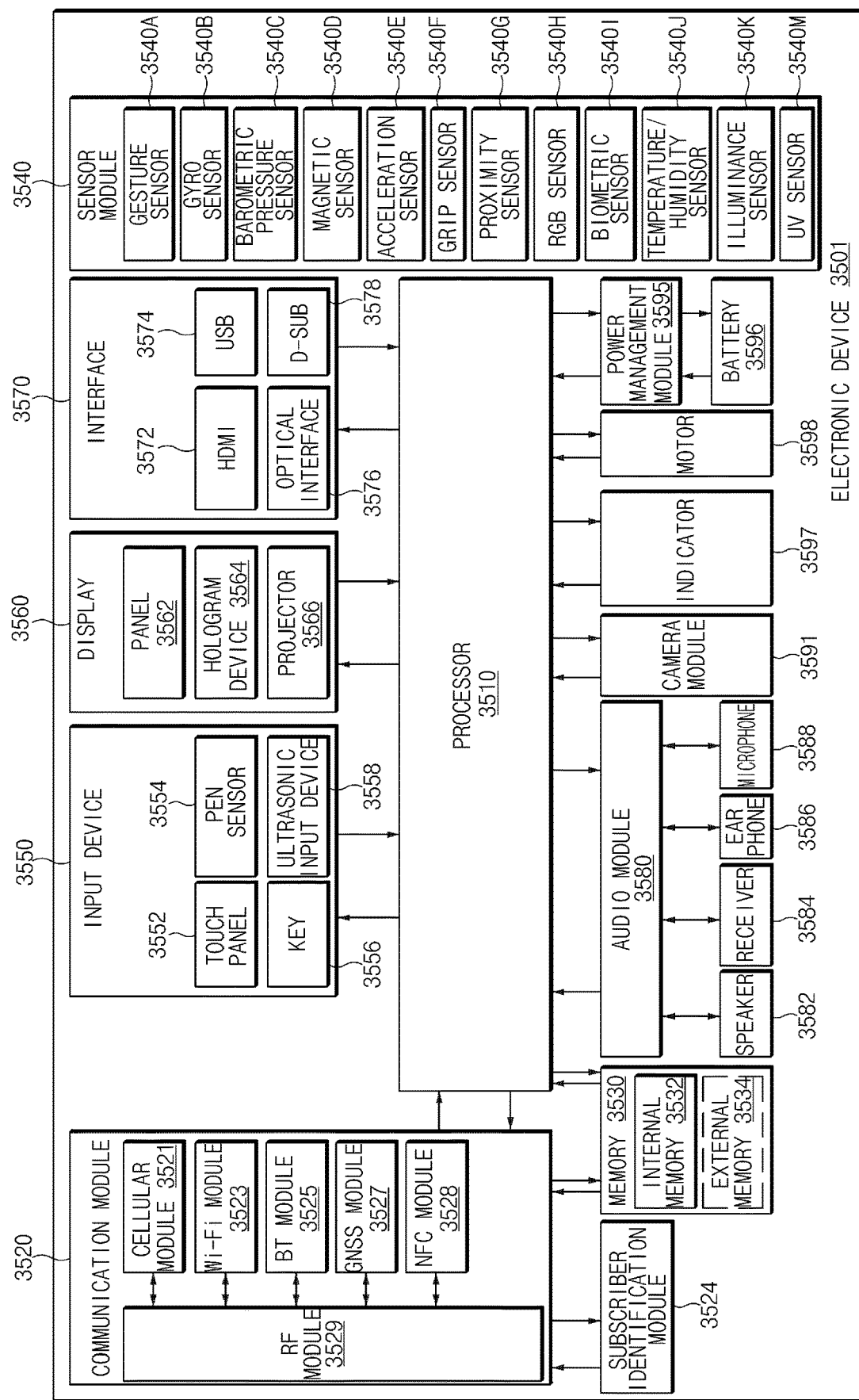
FIG. 35 illustrates a block diagram of an electronic device, according to various embodiments of the present disclosure.

FIG. 35 illustrates a block diagram of an electronic device, according to various embodiments of the present disclosure.

Referring to FIG. 35, an electronic device 3501 may include, for example, all or a part of the electronic device 3401 illustrated in FIG. 34. The electronic device 3501 may include one or more processors (e.g., an AP) 3510, a communication module 3520, a subscriber identification module 3524, a memory 3530, a sensor module 3540, an input device 3550, a display 3560, an interface 3570, an audio module 3580, a camera module 3591, a power management module 3595, a battery 3596, an indicator 3597, and a motor 3598.

The processor 3510 may drive, for example, an OS or an application to control a plurality of hardware or software elements connected to the processor 3510 and may process and compute a variety of data. For example, the processor 3510 may be implemented with a system on chip (SoC). According to an embodiment, the processor 3510 may further include at least one of a graphic processing unit (GPU) or an image signal processor. The processor 3510 may include at least a part (e.g., a cellular module 3521) of elements illustrated in FIG. 35. The processor 3510 may load an instruction or data, which is received from at least one of other elements (e.g., a nonvolatile memory), into a volatile memory and process the loaded instruction or data. The processor 3510 may store a variety of data in the nonvolatile memory.

The communication module 3520 may be configured the same as or similar to the communication interface 3470 of FIG. 34. The communication module 3520 may include the cellular module 3521, a Wi-Fi module 3523, a Bluetooth (BT) module 3525, a GNSS module 3527 (e.g., a GPS module, a Glonass module, a Beidou module, or a Galileo module), a near field communication (NFC) module 3528, and a radio frequency (RF) module 3529.

The cellular module 3521 may provide, for example, voice communication, video communication, a character service, an Internet service, or the like over a communication network. According to an embodiment, the cellular module 3521 may perform discrimination and authentication of the electronic device 3501 within a communication network by using the subscriber identification module (e.g., a subscriber identity module (SIM) card) 3524. According to an embodiment, the cellular module 3521 may perform at least a portion of functions that the processor 3510 provides. According to an embodiment, the cellular module 3521 may include a CP.

Each of the Wi-Fi module 3523, the BT module 3525, the GNSS module 3527, or the NFC module 3528 may include a processor for processing data exchanged through a corresponding module, for example. According to an embodiment, at least a part (e.g., two or more) of the cellular module 3521, the Wi-Fi module 3523, the BT module 3525, the GNSS module 3527, or the NFC module 3528 may be included within one Integrated Circuit (IC) or an IC package.

For example, the RF module 3529 may transmit and receive a communication signal (e.g., an RF signal). For example, the RF module 3529 may include a transceiver, a power amplifier module (PAM), a frequency filter, a low noise amplifier (LNA), an antenna, or the like. According to another embodiment, at least one of the cellular module 3521, the Wi-Fi module 3523, the BT module 3525, the GNSS module 3527, or the NFC module 3528 may transmit and receive an RF signal through a separate RF module.

The subscriber identification module 3524 may include, for example, at least one of a card or embedded SIM that includes a subscriber identification module and may include unique identify information (e.g., integrated circuit card identifier (ICCID)) or subscriber information (e.g., integrated mobile subscriber identity (IMSI)).

The memory 3530 (e.g., the memory 3430) may include an internal memory 3532 or an external memory 3534. For example, the internal memory 3532 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 3534 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 3534 may be at least one of operatively or physically connected to the electronic device 3501 through various interfaces.

The sensor module 3540 may measure, for example, a physical quantity or may detect an operation state of the electronic device 3501. The sensor module 3540 may convert the measured or detected information to an electric signal. For example, the sensor module 3540 may include at least one of a gesture sensor 3540A, a gyro sensor 3540B, a barometric pressure sensor 3540C, a magnetic sensor 3540D, an acceleration sensor 3540E, a grip sensor 3540F, the proximity sensor 3540G, a color sensor 3540H (e.g., red, green, blue (RGB) sensor), a biometric sensor 3540I, a temperature/humidity sensor 3540J, an illuminance sensor 3540K, or an UV sensor 3540M. Although not illustrated, additionally or generally, the sensor module 3540 may further include, for example, at least one of an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 3540 may further include a control circuit for controlling at least one or more sensors included therein. According to an embodiment, the electronic device 3501 may further include a processor that is a part of the processor 3510 or independent of the processor 3510 and is configured to control the sensor module 3540. The processor may control the sensor module 3540 while the processor 3510 remains at a sleep state.

The input device 3550 may include, for example, a touch panel 3552, a (digital) pen sensor 3554, a key 3556, or an ultrasonic input unit 3558. For example, the touch panel 3552 may use at least one of capacitive, resistive, infrared and ultrasonic detecting methods. Also, the touch panel 3552 may further include a control circuit. The touch panel 3552 may further include a tactile layer to provide a tactile reaction to a user.

The (digital) pen sensor 3554 may be, for example, a part of a touch panel or may include an additional sheet for recognition. The key 3556 may include, for example, a physical button, an optical key, a keypad, or the like. The ultrasonic input device 3558 may detect (or sense) an ultrasonic signal, which is generated from an input device, through a microphone (e.g., a microphone 3588) and may check data corresponding to the detected ultrasonic signal.

The display 3560 (e.g., the display 3460) may include a panel 3562, a hologram device 3564, or a projector 3566. The panel 3562 may be the same as or similar to the display 3460 illustrated in FIG. 34. The panel 3562 may be implemented, for example, to be flexible, transparent or wearable. The panel 3562 and the touch panel 3552 may be integrated into a single module. The hologram device 3564 may display a stereoscopic image in a space using a light interference phenomenon. The projector 3566 may project light onto a screen so as to display an image. For example, the screen may be arranged in the inside or the outside of the electronic device 3501. According to an embodiment, the display 3560 may further include a control circuit for controlling the panel 3562, the hologram device 3564, or the projector 3566.

The interface 3570 may include, for example, a HDMI 3572, a USB 3574, an optical interface 3576, or a D-sub-miniature (D-sub) 3578. The interface 3570 may be included, for example, in the communication interface 3470 illustrated in FIG. 34. Additionally, or generally, the interface 3570 may include, for example, a mobile high definition link (MHL) interface, a SD card/MMC interface, or an infrared data association (IrDA) standard interface.

The audio module 3580 may convert a sound and an electric signal in dual directions. At least part of the audio module 3580 may be included, for example, in the input/output interface 3450 illustrated in FIG. 34. The audio module 3580 may process, for example, sound information that is input or output through a speaker 3582, a receiver 3584, an earphone 3586, or the microphone 3588.

For example, the camera module 3591 may shoot a still image or a video. According to an embodiment, the camera module 3591 may include at least one or more image sensors (e.g., a front sensor or a rear sensor), a lens, an image signal processor (ISP), or a flash (e.g., an LED or a xenon lamp).

The power management module 3595 may manage, for example, power of the electronic device 3501. According to an embodiment, a power management integrated circuit (PMIC), a charger IC, or a battery or fuel gauge may be included in the power management module 3595. The PMIC may have at least one of a wired charging method or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 3596 and a voltage, current or temperature thereof while the battery is charged. The battery 3596 may include, for example, at least one of a rechargeable battery or a solar battery.

The indicator 3597 may display a specific state of the electronic device 3501 or a part thereof (e.g., the processor 3510), such as a booting state, a message state, a charging state, and the like. The motor 3598 may convert an electrical signal into a mechanical vibration and may generate the following effects: vibration, haptic, and the like. Although not illustrated, a processing device (e.g., a GPU) for supporting a mobile TV may be included in the electronic device 3501. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 36:
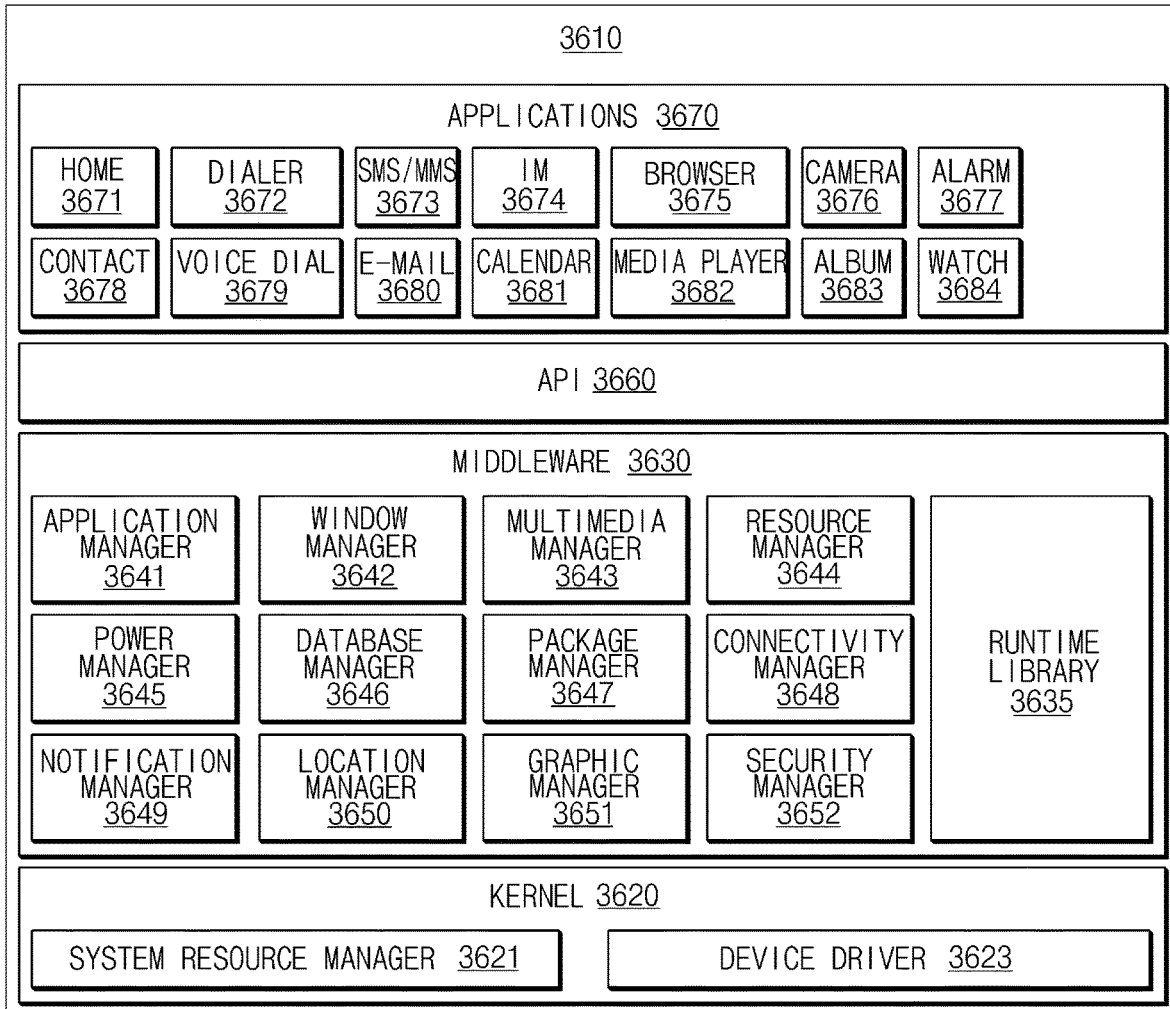
FIG. 36 illustrates a block diagram of a program module, according to various embodiments of the present disclosure.

FIG. 36 illustrates a block diagram of a program module, according to various embodiments of the present disclosure.

According to an embodiment, a program module 3610 (e.g., the program 3440) may include an OS to control resources associated with at least one of an electronic device (e.g., the electronic device 3401), or diverse applications (e.g., the application program 3447) driven on the OS. The OS may be, for example, Android, iOS, Windows, Symbian, or Tizen.

The program module 3610 may include at least one of a kernel 3620, a middleware 3630, an API 3660, or an application 3670. At least a portion of the program module 3610 may be preloaded on an electronic device or may be downloadable from an external electronic device (e.g., the first electronic device 3402, the second electronic device 3404, the server 3406, or the like).

The kernel 3620 (e.g., the kernel 3441) may include, for example, a system resource manager 3621 or a device driver 3623. The system resource manager 3621 may perform control, allocation, or retrieval of system resources. According to an embodiment, the system resource manager 3621 may include a process managing unit, a memory managing unit, or a file system managing unit. The device driver 3623 may include, for example, a display driver, a camera driver, a Bluetooth driver, a shared memory driver, a USB driver, a keypad driver, a Wi-Fi driver, an audio driver, or an inter-process communication (IPC) driver.

The middleware 3630 may provide, for example, a function that the application 3670 needs in common, or may provide diverse functions to the application 3670 through the API 3660 to allow the application 3670 to efficiently use limited system resources of the electronic device. According to an embodiment, the middleware 3630 (e.g., the middleware 3443) may include at least one of a runtime library 3635, an application manager 3641, a window manager 3642, a multimedia manager 3643, a resource manager 3644, a power manager 3645, a database manager 3646, a package manager 3647, a connectivity manager 3648, a notification manager 3649, a location manager 3650, a graphic manager 3651, a security manager 3652, or a payment manager.

The runtime library 3635 may include, for example, a library module that is used by a compiler to add a new function through a programming language while the application 3670 is being executed. The runtime library 3635 may perform input/output management, memory management, or capacities about arithmetic functions.

The application manager 3641 may manage, for example, a life cycle of at least one application of the application 3670. The window manager 3642 may manage a GUI resource that is used in a screen. The multimedia manager 3643 may identify a format utilized for playing diverse media files, and may perform encoding or decoding of media files by using a codec suitable for the format. The resource manager 3644 may manage resources such as a storage space, memory, or source code of at least one application of the application 3670.

The power manager 3645 may operate, for example, with a basic input/output system (BIOS) to manage a battery or power, and may provide power information for an operation of an electronic device. The database manager 3646 may generate, search for, or modify database that is to be used in at least one application of the application 3670. The package manager 3647 may install or update an application that is distributed in the form of package file.

The connectivity manager 3648 may manage, for example, wireless connection such as Wi-Fi or Bluetooth. The notification manager 3649 may display or notify an event such as arrival message, appointment, or proximity notification in a mode that does not disturb a user. The location manager 3650 may manage location information about an electronic device. The graphic manager 3651 may manage a graphic effect that is provided to a user, or manage a user interface relevant thereto. The security manager 3652 may provide a general security function utilized for system security, user authentication, or the like. According to an embodiment, in the case where an electronic device (e.g., the electronic device 3401) includes a telephony function, the middleware 3630 may further include a telephony manager for managing a voice or video call function of the electronic device.

The middleware 3630 may include a middleware module that combines diverse functions of the above-described elements. The middleware 3630 may provide a module specialized to each OS kind to provide differentiated functions. Additionally, the middleware 3630 may dynamically remove a part of the preexisting elements or may add new elements thereto.

The API 3660 (e.g., the API 3445) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 3670 (e.g., the application program 3447) may include, for example, one or more applications capable of providing functions for a home 3671, a dialer 3672, an SMS/multimedia messaging system (MMS) 3673, an instant message (IM) 3674, a browser 3675, a camera 3676, an alarm 3677, a contact 3678, a voice dial 3679, an e-mail 3680, a calendar 3681, a media player 3682, an album 3683, and a watch 3684 or for offering health care (e.g., measuring an exercise quantity, blood sugar, or the like) or environment information (e.g., information of barometric pressure, humidity, temperature, or the like).

According to an embodiment, the application 3670 may include an application (hereinafter referred to as "information exchanging application" for descriptive convenience) to support information exchange between an electronic device (e.g., the electronic device 3401) and an external electronic device (e.g., the first electronic device 3402 or the second electronic device 3404). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 3670 may include an application (e.g., a health care application of a mobile medical device) that is assigned in accordance with an attribute of an external electronic device. According to an embodiment, the application 3670 may include an application that is received from an external electronic device (e.g., the first electronic device 3402, the second electronic device 3404, or the server 3406). According to an embodiment, the application 3670 may include a preloaded application or a third party application that is downloadable from a server. The names of elements of the program module 3610 according to the embodiment may be modifiable depending on kinds of operating systems.

According to various embodiments, at least a portion of the program module 3610 may be implemented by software, firmware, hardware, or a combination of two or more thereof. At least a portion of the program module 3610 may be implemented (e.g., executed), for example, by the processor (e.g., the processor 3510). At least a portion of the program module 3610 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit," "logic," "logical block," "component" and "circuit." The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least part of an apparatus (e.g., modules or functions thereof) or a method (e.g., operations) according to various embodiments may be, for example, implemented by instructions stored in a non-transitory computer-readable storage media in the form of a program module. The instruction, when executed by a processor (e.g., the processor 3420), may cause the one or more processors to perform a function corresponding to the instruction. The non-transitory computer-readable storage media, for example, may be the memory 3430.

A non-transitory computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a RAM, or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
   a memory storing a rule database;
   a touchscreen display;
   a microphone;
   communication circuitry configured to establish a wireless communication connection between a server and the portable communication device; and
   a processor,
   wherein the processor is configured to:
      receive, via the microphone, a first user utterance,
      transmit utterance information corresponding to the first user utterance to the server via the communication circuitry,
      receive, from the server, first information corresponding to the utterance information,
      perform a first set of operations according to a first path rule corresponding to the first information from among a plurality of path rules stored in the rule database,
      identify at least one parameter necessary to perform a second set of operations subsequent to performing the first set of operations,
      display, via the touchscreen display, a first user interface to receive a user input identifying the at least one parameter according to the first path rule,
      receive, via the touchscreen display or the microphone, the user input, and
      perform the second set of operations using the at least one parameter identified by the user input according to the first path rule, the second set of operations being subsequent to the first set of operations in the first path rule, and
   wherein an application to perform the second set of operations is identified from the first path rule.

2. The portable communication device of claim 1, wherein the processor is further configured to identify the first path rule from the plurality of path rules based on the first information.

3. The portable communication device of claim 1, wherein the first path rule misses the at least one parameter used for the second set of operations.

4. The portable communication device of claim 1, wherein the first path rule includes at least one operation for receiving the user input, the at least one operation being performed between the first set of operations and the second set of operations.

5. The portable communication device of claim 1, wherein the processor is further configured to generate the plurality of path rules according to inputs from a user.

6. The portable communication device of claim 1,
   wherein the first set of operations are bound to a first application according to the first path rule, and
   wherein the second set of operations are bound to a second application according to the first path rule.

7. The portable communication device of claim 6, wherein the first user interface corresponds to an execution screen of the first application.

8. The portable communication device of claim 7, wherein the at least one parameter includes at least one image required for the second set of operations.

9. The portable communication device of claim 8, wherein the second set of operations includes transmitting the at least one image using the communication circuitry.

10. The portable communication device of claim 1, wherein the processor is further configured to:
  receive, via the microphone, a wakeup utterance,
  execute a voice agent application in response to receiving the wakeup utterance, and
  receive the first user utterance using the voice agent application.

11. A portable communication device comprising:
  a memory storing a rule database;
  a touchscreen display;
  a microphone; and
  a processor,
  wherein the processor is configured to:
    receive, via the microphone, a first user utterance,
    identify a first path rule corresponding to the first user utterance from among a plurality of path rules stored in the rule database,
    perform a first set of operations according to the first path rule,
    identify at least one parameter necessary to perform a second set of operations subsequent to performing the first set of operations,
    display, via the touchscreen display, a first user interface to receive a user input identifying the at least one parameter according to the first path rule,
    receive, via the touchscreen display or the microphone, the user input, and
    perform the second set of operations using the at least one parameter identified by the user input according to the first path rule, the second set of operations being subsequent to the first set of operations in the first path rule, and
    wherein an application to perform the second set of operations is identified from the first path rule.

12. The portable communication device of claim 11, wherein the processor is further configured to convert the first user utterance into text data and identify the first path rule using the text data.

13. The portable communication device of claim 11, wherein the first path rule misses the at least one parameter used for the second set of operations.

14. The portable communication device of claim 11, wherein the first path rule includes at least one operation for receiving the user input, the at least one operation being performed between the first set of operations and the second set of operations.

15. The portable communication device of claim 11, wherein the processor is further configured to generate the plurality of path rules according to inputs from a user.

16. The portable communication device of claim 11, wherein the first set of operations are bound to a first application according to the first path rule, and
  wherein the second set of operations are bound to a second application according to the first path rule.

17. The portable communication device of claim 16, wherein the first user interface corresponds to an execution screen of the first application.

18. The portable communication device of claim 17, wherein the at least one parameter includes at least one image required for the second set of operations.

19. The portable communication device of claim 18, wherein the second set of operations includes transmitting the at least one image using communication circuitry.

20. The portable communication device of claim 11, wherein the processor is further configured to:
  receive, via the microphone, a wakeup utterance,
  execute a voice agent application in response to receiving the wakeup utterance, and
  receive the first user utterance using the voice agent application.

* * * * *